(12) United States Patent
Yi et al.

(10) Patent No.: US 12,244,919 B2
(45) Date of Patent: Mar. 4, 2025

(54) VIDEO CAPTURING METHOD AND ELECTRONIC DEVICE

(71) Applicant: HONOR DEVICE CO., LTD., Shenzhen (CN)

(72) Inventors: Jie Yi, Shenzhen (CN); Long Wang, Shenzhen (CN); Zuochao Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 167 days.

(21) Appl. No.: 18/028,032

(22) PCT Filed: May 10, 2022

(86) PCT No.: PCT/CN2022/092060
§ 371 (c)(1),
(2) Date: Mar. 23, 2023

(87) PCT Pub. No.: WO2022/257687
PCT Pub. Date: Dec. 15, 2022

(65) Prior Publication Data
US 2023/0345110 A1  Oct. 26, 2023

(30) Foreign Application Priority Data

Jun. 7, 2021 (CN) .......................... 202110632875.3

(51) Int. Cl.
*H04N 23/63* (2023.01)
*H04N 5/77* (2006.01)
*H04N 23/667* (2023.01)

(52) U.S. Cl.
CPC ........... *H04N 23/632* (2023.01); *H04N 5/772* (2013.01); *H04N 23/667* (2023.01)

(58) Field of Classification Search
CPC .... H04N 23/632; H04N 5/772; H04N 23/667; H04N 23/631; H04N 23/633; H04N 23/90
See application file for complete search history.

(56) References Cited

U.S. PATENT DOCUMENTS 10,944,908 B2   3/2021  An et al.
12,015,841 B2 *  6/2024  Qiu ...................... H04N 23/631
(Continued)

FOREIGN PATENT DOCUMENTS

CN    103024272 A    4/2013
CN    105391965 A    3/2016
(Continued)

OTHER PUBLICATIONS

Anomymus;"Multicam Recording Dual Camera";Feb. 22, 2021;Retrieved from the internet,URL:https://apps.apple.com/gb/app/multicam-recording-dual-camera/id1487644864.

*Primary Examiner* — Hung H Lam
(74) *Attorney, Agent, or Firm* — WOMBLE BOND DICKINSON (US) LLP

(57) ABSTRACT

Disclosed are a video capturing method and an electronic device, through which the recording mode can be flexibly switched before or during video recording, and the layout after switching can be determined before switching, thereby facilitating accurate switching. In response to a first operation by a user on a first interface (2512), the electronic device displays, on the first interface (2512), a first option (2513) for indicating a first layout of a second preview image and a third preview image on a view-finding interface. In response to a selection operation by the user on the first option (2513), the electronic device displays a second interface, where the second interface includes the second preview image acquired by a second camera and the third preview (Continued)

image acquired by a third camera; the second preview image and the third preview image are displayed in the first layout.

20 Claims, 64 Drawing Sheets

(56) References Cited

U.S. PATENT DOCUMENTS

| | | | | |
|---|---|---|---|---|
| 12,088,957 | B2* | 9/2024 | Wang | H04N 9/8211 |
| 12,108,142 | B2* | 10/2024 | Mitsumori | H04N 23/73 |
| 12,120,424 | B2* | 10/2024 | Yang | H04N 5/2624 |
| 2006/0175549 | A1* | 8/2006 | Miller | G08B 13/19667 |
| | | | | 348/E5.09 |
| 2017/0034449 | A1 | 2/2017 | Eum et al. | |
| 2020/0244854 | A1 | 7/2020 | Lee et al. | |
| 2022/0159183 | A1 | 5/2022 | Li et al. | |

FOREIGN PATENT DOCUMENTS

| | | |
|---|---|---|
| CN | 105744161 A | 7/2016 |
| CN | 105959553 A | 9/2016 |
| CN | 106657774 A | 5/2017 |
| CN | 107820006 A | 3/2018 |
| CN | 108540711 A | 9/2018 |
| CN | 109729266 A | 5/2019 |
| CN | 110072070 A | 7/2019 |
| CN | 111726525 A | 9/2020 |
| CN | 113727015 A | 11/2021 |
| KR | 20180024761 A | 3/2018 |
| WO | 2021098070 A1 | 5/2021 |

* cited by examiner

The mobile phone displays an interface a, where the interface a is a view-finding interface for video recording being performed, and the interface a includes a preview image a acquired by a camera 1 and a preview image b acquired by a camera 2. The preview image a and the preview image b are displayed in a layout style 1 — S601

The mobile phone displays a plurality of mode options on the interface a in response to an operation 1 by a user on the interface a. The operation 1 is used for triggering the mobile phone to switch a recording mode; each mode option corresponds to one video recording mode; and each mode option includes an effect image corresponding to the recording mode — S602

The mobile phone displays an interface b in response to a selection operation by the user on a mode option a. The mode option a is one of the plurality of mode options, and the mode option a corresponds to a recording mode 2. The recording mode 2 is a recording mode in which a camera 3 and a camera 4 are used as preview cameras, and a preview image acquired by the camera 3 and a preview image acquired by the camera 4 are displayed in a layout style 2. The interface b is a view-finding interface for video recording being performed, and the interface b includes a preview image c acquired by the camera 3 and a preview image d acquired by the camera 4. The preview image c and the preview image d are displayed on the interface b in a layout style 2 — S603

The mobile phone generates a video file a in response to an operation 3 by the user on the interface b. The operation 3 is used for triggering the mobile phone to end video recording. The video file a includes a video stream a, a video stream b, a video stream c, and a video stream d. The video stream a includes a plurality of frames of preview images a, the video stream b includes a plurality of frames of preview images b, the video stream c includes a plurality of frames of preview images c, and the video stream d includes a plurality of frames of preview images d — S604

FIG. 6

CONT. FROM

TO FIG. 11(c)

```
┌─────────────────────────────────────────────────────────────┐
│ The mobile phone displays an interface c, where the interface c is a view-finding │
│ interface before video recording starts. The interface c includes a preview image │──S1501
│       acquired by a camera 1 and a preview image acquired by a camera 2. The     │
│  preview image acquired by the camera 1 and the preview image acquired by the    │
│                 camera 2 are displayed in a layout style 1                       │
└─────────────────────────────────────────────────────────────┘
                              │                                    ┌──S601
┌ ─ ─ ─ ─ ─ ─ ─ ─ ─ ─ ─ ─ ─ ─ ▼ ─ ─ ─ ─ ─ ─ ─ ─ ─ ─ ─ ─ ─ ─ ─ ─ ┐
│   The mobile phone displays the interface a in response to an operation 5 by the │
│   user on the interface c. The operation 5 is used for triggering the mobile phone│──S1502
│   to start video recording. The interface a is a view-finding interface for video │
│   recording being performed, and the interface a includes a preview image a      │
│   acquired by a camera 1 and a preview image b acquired by a camera 2. The       │
│      preview image a and the preview image b are displayed in a layout style 1   │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              ▼
┌─────────────────────────────────────────────────────────────┐
│   The mobile phone displays a plurality of mode options on the interface a in    │
│   response to an operation 1 by a user on the interface a. The operation 1 is used│
│   for triggering the mobile phone to switch a recording mode; each mode option   │──S602
│   corresponds to one video recording mode; and each mode option includes an      │
│              effect image corresponding to the recording mode                    │
└─────────────────────────────────────────────────────────────┘
                              ▼
┌─────────────────────────────────────────────────────────────┐
│ The mobile phone displays an interface b in response to a selection operation by │
│    the user on a mode option a. The mode option a is one of the plurality of mode│
│        options, and the mode option a corresponds to a recording mode 2. The     │
│    recording mode 2 is a recording mode in which a camera 3 and a camera 4 are   │──S603
│    used as preview cameras, and a preview image acquired by the camera 3 and a  │
│    preview image acquired by the camera 4 are displayed in a layout style 2. The│
│   interface b is a view-finding interface for video recording being performed, and│
│        the interface b includes a preview image c acquired by the camera 3 and a │
│          preview image d acquired by the camera 4. The preview image c and the   │
│           preview image d are displayed on the interface b in a layout style 2   │
└─────────────────────────────────────────────────────────────┘
                              ▼
┌─────────────────────────────────────────────────────────────┐
│    The mobile phone generates a video file a in response to an operation 3 by the│──S604
│     user on the interface b. The operation 3 is used for triggering the mobile phone│
│    to end video recording. The video file a includes a video stream a, a video  │
│    stream b, a video stream c, and a video stream d. The video stream a includes a│
│    plurality of frames of preview images a, the video stream b includes a plurality│
│    of frames of preview images b, the video stream c includes a plurality of frames│
│    of preview images c, and the video stream d includes a plurality of frames of │
│                              preview images d                                    │
└─────────────────────────────────────────────────────────────┘
```

FIG. 15

The mobile phone displays an interface d, where the interface d is a view-finding interface before video recording starts. The interface d includes a preview image acquired by a camera 5 and a preview image acquired by a camera 6. The preview image acquired by the camera 5 and the preview image acquired by the camera 6 are displayed in a layout style 3. — S1601

The mobile phone displays an interface e in response to an operation 5 by the user on the interface d. The operation 5 is used for triggering the mobile phone to start video recording. The interface e is a view-finding interface for video recording being performed, and the interface e includes a preview image e acquired by the camera 5 and a preview image f acquired by the camera 6. The preview image e and the preview image f are displayed in a layout style 3 — S1602

The mobile phone displays a plurality of mode options on the interface e in response to an operation 1 by the user on the interface e. The operation 1 is used for triggering the mobile phone to switch a recording mode; each mode option corresponds to one video recording mode; and each mode option includes an effect image corresponding to the recording mode — S1603

S601

The mobile phone displays an interface a in response to a selection operation by the user on a mode option b. The mode option b is one of the plurality of mode options, and the mode option b corresponds to a recording mode 1. The recording mode 1 is a recording mode in which a camera 1 and a camera 2 are used as preview cameras, and a preview image acquired by the camera 1 and a preview image acquired by the camera 2 are displayed in a layout style 1. The interface a is a view-finding interface for video recording being performed, and the interface a includes a preview image a acquired by a camera 1 and a preview image b acquired by a camera 2. The preview image a and the preview image b are displayed on the interface a in a layout style 1 — S1604

The mobile phone displays a plurality of mode options on the interface a in response to an operation 1 by a user on the interface a. The operation 1 is used for triggering the mobile phone to switch a recording mode; each mode option corresponds to one video recording mode; and each mode option includes an effect image corresponding to the recording mode — S602

CONT. FROM
FIG. 16A

The mobile phone displays an interface b in response to a selection operation by the user on a mode option a. The mode option a is one of the plurality of mode options, and the mode option a corresponds to a recording mode 2. The recording mode 2 is a recording mode in which a camera 3 and a camera 4 are used as preview cameras, and a preview image acquired by the camera 3 and a preview image acquired by the camera 4 are displayed in a layout style 2. The interface b is a view-finding interface for video recording being performed, and the interface b includes a preview image c acquired by the camera 3 and a preview image d acquired by the camera 4. The preview image c and the preview image d are displayed on the interface b in a layout style 2 ⟶ S603

S604

The mobile phone generates a video file a in response to an operation 3 by the user on the interface b. The operation 3 is used for triggering the mobile phone to end video recording. The video file a includes a video stream a, a video stream b, a video stream c, a video stream d, a video stream e, and a video stream f. The video stream a includes a plurality of frames of preview images a, the video stream b includes a plurality of frames of preview images b, the video stream c includes a plurality of frames of preview images c, the video stream d includes a plurality of frames of preview images d, the video stream e includes a plurality of frames of preview images e, and the video stream f includes a plurality of frames of preview images f ⟶ S1605

FIG. 16B

```
┌─────────────────────────────────────────────────────────────────┐
│  The mobile phone displays an interface f, where the interface f is a view-finding │
│  interface before video recording starts. The interface f includes a preview image │─── S2001
│  acquired by a camera 7. The preview image acquired by the camera 7 is displayed   │
│                         in a layout style 4                                         │
└─────────────────────────────────────────────────────────────────┘
                                    ▼
┌─────────────────────────────────────────────────────────────────┐
│  The mobile phone displays an interface g in response to an operation 5 by the     │
│  user on the interface f. The operation 5 is used for triggering the mobile phone to│─── S2002
│  start video recording. The interface g is a view-finding interface for video       │
│  recording being performed, and the interface g includes a preview image g          │
│  acquired by the camera 7. The preview image g is displayed in a layout style 4    │
└─────────────────────────────────────────────────────────────────┘
                                    ▼
┌─────────────────────────────────────────────────────────────────┐
│  The mobile phone displays a plurality of mode options on the interface g in       │
│  response to an operation 1 by the user on the interface g. The operation 1 is used │─── S2003
│  for triggering the mobile phone to switch a recording mode; each mode option      │
│  corresponds to one video recording mode; and each mode option includes an         │
│          effect image corresponding to the recording mode                          │─── S601
└─────────────────────────────────────────────────────────────────┘
                                    ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│  The mobile phone displays an interface a in response to a selection operation by the│
│  user on a mode option b. The mode option b is one of the plurality of mode options, │
│  and the mode option b corresponds to a recording mode 1. The recording mode 1 is   │─── S2004
│  a recording mode in which a camera 1 and a camera 2 are used as preview cameras,  │
│  and a preview image acquired by the camera 1 and a preview image acquired by the  │
│  camera 2 are displayed in a layout style 1. The interface a is a view-finding interface│
│  for video recording being performed, and the interface a includes a preview image a│
│  acquired by a camera 1 and a preview image b acquired by a camera 2. The preview  │
│  image a and the preview image b are displayed on the interface a in a layout style 1│
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                    ▼                              ─── S602
┌─────────────────────────────────────────────────────────────────┐
│  The mobile phone displays a plurality of mode options on the interface a in response to an│
│  operation 1 by a user on the interface a. The operation 1 is used for triggering the       │
│  phone to switch a recording mode; each mode option corresponds to one video recording     │
│  mode; and each mode option includes an effect image corresponding to the recording mode   │
└─────────────────────────────────────────────────────────────────┘
                                    ▼
┌─────────────────────────────────────────────────────────────────┐
│  The mobile phone displays an interface b in response to a selection operation by the      │
│  user on a mode option a. The mode option a is one of the plurality of mode options, and  │
│     the mode option a corresponds to a recording mode 2. The recording mode 2 is a        │
│  recording mode in which a camera 3 and a camera 4 are used as preview cameras, and a     │─── S603
│  preview image acquired by the camera 3 and a preview image acquired by the camera 4      │
│     are displayed in a layout style 2. The interface b is a view-finding interface for video│
│    recording being performed, and the interface b includes a preview image c acquired by  │
│        the camera 3 and a preview image d acquired by the camera 4. The preview image c   │
│          and the preview image d are displayed on the interface b in a layout style 2     │─── S604
└─────────────────────────────────────────────────────────────────┘
                                    ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│   The mobile phone generates a video file a in response to an operation 3 by the user    │
│     on the interface b. The operation 3 is used for triggering the mobile phone to end   │
│     video recording. The video file a includes a video stream a, a video stream b, a     │─── S2005
│  video stream c, a video stream d, and a video stream g. The video stream a includes    │
│  a plurality of frames of preview images a, the video stream b includes a plurality of  │
│     frames of preview images b, the video stream c includes a plurality of frames of    │
│       preview images c, the video stream d includes a plurality of frames of preview    │
│    images d, and the video stream g includes a plurality of frames of preview images g  │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 20

```
┌─────────────────────────────────────────────────────────────────────┐
│ The mobile phone displays an interface d, where the interface d is a view-finding │
│ interface before video recording starts. The interface d includes a preview image │──S2801
│        acquired by a camera 4. The preview image acquired by the camera 4 is       │
│                          displayed in a layout style 3                             │
└─────────────────────────────────────────────────────────────────────┘
                                      │
                                      ▼
┌─────────────────────────────────────────────────────────────────────┐
│     The mobile phone displays an interface e in response to an operation 5 by the  │
│      user on the interface d. The operation 5 is used for triggering the mobile phone │
│       to start video recording. The interface e is a view-finding interface for video │──S2802
│            recording being performed, and the interface e includes a control d and a  │
│      preview image d acquired by the camera 4. The control d is configured to trigger │
│       the mobile phone to switch between the front camera and the rear camera. The    │
│                     preview image d is displayed in a layout style 3                  │
└─────────────────────────────────────────────────────────────────────┘
                                      │                                    ──S2501
┌─────────────────────────────────────┼─────────────────────────────────────┐
│                                     ▼                                     │
│       The mobile phone displays an interface a in response to an operation 6 by the │
│        user on the control d. The interface a is a view-finding interface for video │──S2803
│           recording being performed, and the interface a includes a preview image a  │
│        acquired by a camera 1. The preview image a is displayed in a layout style 1  │
└───────────────────────────────────────────────────────────────────────────┘
                                      │
                                      ▼
┌─────────────────────────────────────────────────────────────────────┐
│       The mobile phone displays a plurality of mode options on the interface a in  │
│        response to an operation 1 by a user on the interface a. The operation 1 is used │
│       for triggering the mobile phone to switch a recording mode; each mode option │──S2502
│         corresponds to one video recording mode; and each mode option includes an  │
│                       effect image corresponding to the recording mode             │
└─────────────────────────────────────────────────────────────────────┘
                                      │
                                      ▼
┌─────────────────────────────────────────────────────────────────────┐
│         The mobile phone displays an interface b in response to a selection operation by │
│            the user on a mode option a. The mode option a is one of the plurality of mode │
│               options, and the mode option a corresponds to a recording mode 2. The      │
│          recording mode 2 is a recording mode in which a camera 2 and a camera 3 are     │──S2503
│          used as preview cameras, and a preview image acquired by the camera 2 and a     │
│             preview image acquired by the camera 3 are displayed in a layout style 2. The │
│            interface b is a view-finding interface for video recording being performed, and │
│                the interface b includes a preview image b acquired by the camera 2 and a  │
│           preview image c acquired by the camera 3. The preview image b and the preview  │
│                     image c are displayed on the interface b in a layout style 2          │
└─────────────────────────────────────────────────────────────────────┘
                                      │                                    ──S2504
┌─────────────────────────────────────┼─────────────────────────────────────┐
│                                     ▼                                     │
│      The mobile phone generates a video file a in response to an operation 3 by the user │
│        on the interface b. The operation 3 is used for triggering the mobile phone to end │
│         video recording. The video file a includes a video stream a, a video stream b, a  │──S2804
│         video stream c, and a video stream d. The video stream a includes a plurality of  │
│          frames of preview images a, the video stream b includes a plurality of frames of │
│          preview images b, the video stream c includes a plurality of frames of preview   │
│       images c, and the video stream d includes a plurality of frames of preview images d │
└───────────────────────────────────────────────────────────────────────────┘
```

FIG. 28

CONT. FROM
FIG. 30A

The mobile phone displays a plurality of mode options on the interface a in response to an operation 1 by a user on the interface a. The operation 1 is used for triggering the mobile phone to switch a recording mode; each mode option corresponds to one video recording mode; and each mode option includes an effect image corresponding to the recording mode ⟵ S2502

The mobile phone displays an interface b in response to a selection operation by the user on a mode option a. The mode option a is one of the plurality of mode options, and the mode option a corresponds to a recording mode 2. The recording mode 2 is a recording mode in which a camera 2 and a camera 3 are used as preview cameras, and a preview image acquired by the camera 2 and a preview image acquired by the camera 3 are displayed in a layout style 2. The interface b is a view-finding interface for video recording being performed, and the interface b includes a preview image b acquired by the camera 2 and a preview image c acquired by the camera 3. The preview image b and the preview image c are displayed on the interface b in a layout style 2 ⟵ S2503

S2504

The mobile phone generates a video file a in response to an operation 3 by the user on the interface b. The operation 3 is used for triggering the mobile phone to end video recording. The video file a includes a video stream a, a video stream b, a video stream c, a video stream d, and a video stream g. The video stream a includes a plurality of frames of preview images a, the video stream b includes a plurality of frames of preview images b, the video stream c includes a plurality of frames of preview images c, the video stream d includes a plurality of frames of preview images d, and the video stream g includes a plurality of frames of preview images g ⟵ S3005

FIG. 30B

```
┌─────────────────────────────────────────────────────────────┐
│ The mobile phone displays an interface d, where the interface d is a view- │
│   finding interface before video recording starts. The interface d includes a │──S3511
│    preview image acquired by a camera 4 and a preview image acquired by a   │
│ camera 5. The preview image acquired by the camera 4 and the preview image  │
│        acquired by the camera 5 are displayed in a layout style 3.          │
└─────────────────────────────────────────────────────────────┘
                                  ↓
┌─────────────────────────────────────────────────────────────┐
│ The mobile phone displays an interface e in response to an operation 5 by the │
│      user on the interface d. The operation 5 is used for triggering the mobile │
│    phone to start video recording. The interface e is a view-finding interface for │──S3512
│ video recording being performed, and the interface e includes a preview image │
│    d acquired by the camera 4 and a preview image e acquired by the camera 5. │
│  The preview image d and the preview image e are displayed in a layout style 3 │
└─────────────────────────────────────────────────────────────┘
                                  ↓
┌─────────────────────────────────────────────────────────────┐
│   The mobile phone displays a plurality of mode options on the interface e in │
│     response to an operation 1 by the user on the interface e. The operation 1 is │──S3513
│  used for triggering the mobile phone to switch a recording mode; each mode │
│         option corresponds to one video recording mode; and each mode option │
│             includes an effect image corresponding to the recording mode      │
└─────────────────────────────────────────────────────────────┘
                                                                          ──S3301
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
│  The mobile phone displays an interface a in response to a selection operation │
│    by the user on a mode option b. The mode option b is one of the plurality of │
│   mode options, and the mode option b corresponds to a recording mode 1. The │
│  recording mode 1 is a recording mode in which a camera 1 and a camera 2 are │──S3514
│   used as preview cameras, and a preview image acquired by the camera 1 and a │
│     preview image acquired by the camera 2 are displayed in a layout style 1. The │
│       interface a is a view-finding interface for video recording being performed, │
│     and the interface a includes a preview image a acquired by a camera 1 and a │
│         preview image b acquired by a camera 2. The preview image a and the │
│            preview image b are displayed on the interface a in a layout style 1 │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
                                  │
                             TO FIG. 35b-2
```

FIG. 35b-1

CONT. FROM
FIG. 37A

The mobile phone displays a plurality of mode options on the interface a in response to an operation 1 by a user on the interface a. The operation 1 is used for triggering the mobile phone to switch a recording mode; each mode option corresponds to one video recording mode; and each mode option includes an effect image corresponding to the recording mode ⸺S3302

The mobile phone displays an interface b in response to a selection operation by the user on a mode option a. The mode option a is one of the plurality of mode options, and the mode option a corresponds to a recording mode 2. The recording mode 2 is a recording mode in which a camera 3 is used as a preview camera, and a preview image acquired by the camera 3 is displayed in a layout style 2. The interface b is a view-finding interface for video recording being performed, and the interface b includes a preview image c acquired by the camera 3. The preview image c is displayed in a layout style 2 ⸺S3303

⸺S3304

The mobile phone generates a video file a in response to an operation 3 by the user on the interface b. The operation 3 is used for triggering the mobile phone to end video recording. The video file a includes a video stream a, a video stream b, a video stream c, and a video stream f. The video stream a includes a plurality of frames of preview images a, the video stream b includes a plurality of frames of preview images b, the video stream c includes a plurality of frames of preview images c, and the video stream f includes a plurality of frames of preview images f ⸺S3705

FIG. 37B

CONT. FROM

VIDEO CAPTURING METHOD AND ELECTRONIC DEVICE

CROSS-REFERENCE TO RELATED APPLICATIONS

This application is a national stage of International Application No. PCT/CN2022/092060, filed on May 10, 2022, which claims priority to Chinese Patent Application No. 202110632875.3, filed on Jun. 7, 2021. The disclosures of both of the aforementioned applications are hereby incorporated by reference in their entireties.

TECHNICAL FIELD

This application relates to the field of photographing technologies, and in particular, to a video capturing method and an electronic device.

BACKGROUND

At present, electronic devices such as mobile phones can not only provide a picture capturing function, but also provide a video recording function. In addition, in order to meet users' requirement of simultaneously recording a plurality of pictures, some electronic devices further provide a dual-lens video recording function. Dual-lens video recording means that two cameras are used as preview cameras to acquire images at the same time point.

In the prior art, the user needs to switch to the corresponding dual-lens recording mode before starting the dual-lens video recording, for example, switch from a recording mode of one front camera and one rear camera to a recording mode of two different rear cameras before starting video recording. In addition, in the foregoing process of switching the recording mode, after the switching is completed, the real-time preview displayed on the view-finding interface of the mobile phone will change, so that the recording effect of the current recording mode can be shown to the user.

However, the inventor found in the process of implementing the embodiments of this application that at least the following technical problems exist in the prior art: On the one hand, the electronic device can only switch to the corresponding dual-lens recording mode before recording, but cannot perform switching after the recording starts, which greatly limits the flexibility of dual-lens video recording. On the other hand, the electronic device can only show the recording effect through real-time preview after switching to the corresponding dual-lens recording mode. Consequently, it is difficult for the user to prejudge the recording effects of various recording modes before switching, which is not conducive to accurate selection of the recording mode.

SUMMARY

This application provides a video capturing method and an electronic device, through which the recording mode can be flexibly switched before or during video recording, and the layout after switching can be determined before switching, thereby facilitating accurate switching.

According to a first aspect, an embodiment of this application provides a video capturing method, applicable to an electronic device. The electronic device displays a first interface. The first interface is a view-finding interface for video recording by the electronic device, the first interface includes a first preview image acquired by a first camera, and the first preview image is displayed on the first interface in a full screen layout. In other words, before switching, the recording mode is a recording mode in which a single camera is used for video recording, for example, a front single-camera mode or a rear single-camera mode. The electronic device displays a plurality of options on the first interface in response to a first operation by a user on the first interface, where the plurality of options include a first option, and the first option is configured to indicate a first layout of a second preview image acquired by a second camera and a third preview image acquired by a third camera on the view-finding interface. The second camera is a front camera, and the third camera is a rear camera; or the second camera is a rear camera, and the third camera is a front camera. The second camera may be the same as the first camera, or the third camera may be the same as the first camera; or both the second camera and the third camera are different from the first camera. In other words, the first operation by the user may trigger the display of the plurality of options for the user to select. The electronic device displays a second interface in response to a selection operation by the user on the first option. The second interface is a view-finding interface for video recording by the electronic device, the second interface includes the second preview image acquired by the second camera and the third preview image acquired by the third camera, and the second preview image and the third preview image are displayed on the second interface in the first layout. In other words, in response to the user's selection of the first option, the mobile phone can switch to a recording mode in which one front camera and one rear camera are used for video recording.

Based on the above, by using the video capturing method provided in this embodiment of this application, a recording mode in which a single camera is used for video recording can be flexibly switched to a recording mode in which one front camera and one rear camera are used for video recording. In addition, the first layout of images acquired by one front camera and one rear camera can be determined from the first option, thereby facilitating accurately prejudging the layout after switching according to the options. In this way, the flexibility and accuracy of switching recording modes can be improved.

In a possible design manner of the first aspect, the first layout includes a split-screen layout or a picture-in-picture layout.

In other words, by using the method in this embodiment, a recording mode in which the layout is a full screen layout can be switched to a recording mode in which the layout is a split-screen layout or picture-in-picture layout.

It should be understood that, it is also switchable between the split-screen layout and the picture-in-picture layout. In other words, in a possible design manner, a recording mode in which the layout is a picture-in-picture layout may alternatively be switched to a recording mode in which the layout is a split-screen layout. Alternatively, a recording mode in which the layout is a split-screen layout may alternatively be switched to a recording mode in which the layout is a picture-in-picture layout, for example, switching from a front-rear dual-lens mode (in which a split-screen layout is used) to a picture-in-picture dual-lens mode (in which a picture-in-picture layout is used).

In a possible design manner of the first aspect, after the displaying, by the electronic device in response to a selection operation by the user on the first option, a second interface, the method further includes: displaying, by the electronic device, the plurality of options on the second interface in response to a first operation by the user on the second interface. The plurality of options include a second option, and the second option is configured to indicate a second layout of a fourth preview image acquired by a fourth camera and a fifth preview image acquired by a fifth camera on the view-finding interface. The fourth camera and the fifth camera are two different rear cameras. The fourth camera may be the same as any one of the foregoing cameras (such as the first camera and the second camera), or may be different from any one of the foregoing cameras. The fifth camera may also be the same as any one of the foregoing cameras (such as the first camera and the second camera), or may be different from any one of the foregoing cameras. The electronic device displays a third interface in response to a selection operation by the user on the second option. The third interface is a view-finding interface for video recording by the electronic device, the third interface includes the fourth preview image acquired by the fourth camera and the fifth preview image acquired by the fifth camera, and the fourth preview image and the fifth preview image are displayed on the third interface in the second layout.

In other words, by using the method in this embodiment, on the basis of switching from single-camera video recording to a recording mode in which one front camera and one rear camera are used for video recording, a recording mode in which two rear cameras are used for video recording can be further switched to. In this way, a plurality of times of switching between recording modes can be realized. Similarly, the display layout after switching can be determined according to the second layout indicated by the second option before switching. In this way, accurate switching is facilitated.

In a possible design manner of the first aspect, the second layout is a split-screen layout.

In other words, by using the method in this embodiment, a recording mode in which two rear cameras are used and the layout is a split-screen layout can be switched to, for example, switch to a rear-rear dual-lens mode.

In a possible design manner of the first aspect, after the displaying, by the electronic device in response to a selection operation by the user on the first option, a second interface, the method further includes: displaying, by the electronic device in response to a first operation by the user on the second interface, the plurality of options on the second interface, where the plurality of options include a third option, the third option is configured to indicate a third layout of a sixth preview image acquired by a sixth camera on the view-finding interface, and the third layout is a full screen layout. The sixth camera may be the same as any one of the foregoing cameras (such as the first camera and the second camera), or may be different from any one of the foregoing cameras. The electronic device displays a third interface in response to a selection operation by the user on the third option, where the third interface is a view-finding interface for video recording by the electronic device, the third interface includes the sixth preview image acquired by the sixth camera, and the sixth preview image is displayed on the third interface in the full screen layout.

In other words, by using the method in this embodiment, on the basis of switching from single-camera video recording to a recording mode in which one front camera and one rear camera are used for video recording, a recording mode in which one camera is used and the layout is a full screen layout can be switched to. For example, a front single-camera mode can be switched to a front-rear dual-lens mode, and then can be switched to a rear single-camera mode. In this way, a plurality of times of switching between recording modes can be realized. Similarly, the display layout after switching can be determined according to the third layout indicated by the third option before switching. In this way, accurate switching is facilitated.

In a possible design manner of the first aspect, before the displaying, by the electronic device, a first interface, the method further includes: displaying, by the electronic device, a fourth interface, where the fourth interface is a view-finding interface for video recording by the electronic device, the fourth interface includes a seventh preview image acquired by a seventh camera and an eighth preview image acquired by an eighth camera, and the seventh preview image and the eighth preview image are displayed on the fourth interface in a fourth layout. The seventh camera is a front camera, and the eighth camera is a rear camera; or the seventh camera is a rear camera, and the eighth camera is a front camera. The seventh camera may be the same as any one of the foregoing cameras (such as the first camera and the second camera), or may be different from any one of the foregoing cameras. The eighth camera may also be the same as any one of the foregoing cameras (such as the first camera and the second camera), or may be different from any one of the foregoing cameras. The electronic device displays the plurality of options on the fourth interface in response to a first operation by the user on the fourth interface where the plurality of options include a fourth option, the fourth option is configured to indicate a fifth layout of the first preview image acquired by the first camera on the view-finding interface, and the fifth layout is a full screen layout. The displaying, by the electronic device, a first interface includes: displaying, by the electronic device in response to a selection operation by the user on the fourth option, the first interface.

In other words, by using the method in this embodiment, first, a recording mode in which one front camera and one rear camera are used for video recording is switched to a recording mode in which a single camera is used for video recording in a full screen layout, and then the recording mode in which a single camera is used for video recording in a full screen layout is switched to a recording mode in which one front camera and one rear camera are used for video recording. In this way, a plurality of times of switching between recording modes can be realized. Similarly, the display layout after switching can be determined according to the fifth layout indicated by the fourth option before switching. In this way, accurate switching is facilitated.

It should be noted that, there is more than one recording mode in which one front camera and one rear camera are used for video recording, for example, including a front-rear dual-lens mode and a picture-in-picture dual-lens mode. Therefore, before and after the recording mode in which a single camera is used for video recording, the recording modes in which one front camera and one rear camera are used for video recording may be the same. For example, the switching process may be switching from the front-rear dual-lens mode to the rear single-camera mode, and then switching back to the front-rear dual-lens mode. Alternatively, the recording modes in which one front camera and one rear camera are used for video recording may be different. For example, the switching process may be switching from the front-rear dual-lens mode to the rear single-camera mode, and then switching to the picture-in-picture dual-lens mode.

In a possible design manner of the first aspect, the fourth layout is a split-screen layout or a picture-in-picture layout.

In other words, by using the method in this embodiment, a recording mode in which one front camera and one rear camera are used and the layout is a split-screen layout or picture-in-picture layout can be switched to a recording mode in which a single camera is used and the layout is a full screen layout.

In a possible design manner of the first aspect, before the displaying, by the electronic device, a first interface, the method further includes: displaying, by the electronic device, a fourth interface, where the fourth interface is a view-finding interface for video recording by the electronic device, the fourth interface includes a ninth preview image acquired by a ninth camera and a tenth preview image acquired by a tenth camera, and the ninth preview image and the tenth preview image are displayed on the fourth interface in a sixth layout. The ninth camera and the tenth camera are two different rear cameras. The ninth camera may be the same as any one of the foregoing cameras (such as the first camera and the second camera), or may be different from any one of the foregoing cameras. The tenth camera may also be the same as any one of the foregoing cameras (such as the first camera and the second camera), or may be different from any one of the foregoing cameras. The electronic device displays the plurality of options on the fourth interface in response to a first operation by the user on the fourth interface where the plurality of options include a fourth option, the fourth option is configured to indicate a fifth layout of the first preview image acquired by the first camera on the view-finding interface, and the fifth layout is a full screen layout. The displaying, by the electronic device, a first interface includes: displaying, by the electronic device in response to a selection operation by the user on the fourth option, the first interface.

In other words, by using the method in this embodiment, first, a recording mode in which two rear cameras are used for video recording is switched to a recording mode in which a single camera is used for video recording in a full screen layout, and then the recording mode in which a single camera is used for video recording in a full screen layout is switched to a recording mode in which one front camera and one rear camera are used for video recording. In this way, a plurality of times of switching between recording modes can be realized. Similarly, the display layout after switching can be determined according to the fifth layout indicated by the fourth option before switching. In this way, accurate switching is facilitated.

In a possible design manner of the first aspect, the sixth layout is a split-screen layout.

In other words, by using the method in this embodiment, the recording mode in which two rear cameras are used for video recording in a split-screen layout can be switched to the recording mode in which a single camera is used and the layout is a full screen layout.

In a possible design manner of the first aspect, before the displaying, by the electronic device, a fourth interface, the method further includes: displaying, by the electronic device, a fifth interface, where the fifth interface is an interface displayed by the electronic device in response to starting of a camera application. By default, the interface displayed by the electronic device in response to starting of the camera application is a photographing function interface. When the camera application is started from the backend, the interface displayed on the electronic device in response to starting of the camera application is a function interface that was running when the foreground was exited last time, such as a video recording interface. The fifth interface includes a first control (such as a function tab of multi-lens video recording), and the first control is configured to trigger the electronic device to switch to multi-lens video recording. In other words, on the interface displayed on the electronic device by starting the camera application, switching to multi-lens video recording can be triggered, that is, entering into an interface of dual-lens video recording. The interface of dual-lens video recording may be a view-finding interface of any dual-lens video recording mode. Generally, in response to a click/tap operation by the user on the first control, the electronic device displays a view-finding interface of a front-rear dual-lens mode by default, but this is not limited thereto. For example, the foregoing fourth interface may alternatively be displayed. That is, the electronic device displays the fourth interface in response to a click/tap operation by the user on the first control. It should be understood that, during actual implementation, there may further be one or more times of switching having been performed between the fifth interface and the fourth interface.

In other words, by using the method in this embodiment, the multi-lens video recording can be entered through an independent multi-lens video recording tab in the camera application, thereby entering the view-finding interface of the dual-lens video recording mode, for example, entering the front-rear dual-lens mode, the rear-rear dual-lens mode, or the picture-in-picture dual-lens mode.

In a possible design manner of the first aspect, the recording mode switching function is provided in the common video recording function of the camera application, so that the recording mode of dual-lens video recording can be directly switched to in common video recording. In this case, the interface displayed by the electronic device by enabling the common video recording function (that is, the single-lens video recording function) of the camera application can be regarded as the foregoing first interface. It should be understood that, during actual implementation, one or more times of switching may also be performed between the common video recording function interface and the first interface.

In other words, by using the method in this embodiment, the dual-lens video recording function can be integrated into the common video recording function, and the electronic device can also trigger switching between recording modes in response to a first operation by the user on the interface of the common video recording function. In other words, the switching between recording modes can be triggered directly in the common video recording interface without adding an independent multi-lens video recording function to the camera application.

In a possible design manner of the first aspect, the view-finding interface for video recording by the electronic device is a view-finding interface for video recording before the electronic device starts video recording; or the view-finding interface for video recording by the electronic device is a view-finding interface for video recording being performed by the electronic device. The view-finding interface for video recording by the electronic device may be the first interface, the second interface, the third interface, the fourth interface, or the like.

In other words, by using the method in this embodiment, the foregoing switching between recording modes can be completed before the video recording starts, and the foregoing switching between recording modes can alternatively be completed during the video recording. If the switching is completed before the video recording starts, the video recording can be started after a satisfactory recording mode is switched to in advance. After the switching is completed in the recording process, a video obtained by combination of video streams acquired in a plurality of recording modes can be obtained through recording, thereby providing a new manner of video recording and improving the diversity of video content.

In a possible design manner of the first aspect, the view-finding interface for video recording by the electronic device includes a second control, and the first operation is a click/tap operation or a long press operation by the user on the second control. Alternatively, the first operation is a first preset gesture inputted by the user on the view-finding interface for video recording by the electronic device. The first preset gesture may be a gesture of sliding upward from a preset position of the current view-finding interface. Similarly, the view-finding interface for video recording by the electronic device may be the foregoing first interface, second interface, third interface, fourth interface, or the like.

In other words, by using the method in this embodiment, the display of the plurality of options can be triggered by the first control or the first preset gesture. In this way, the plurality of options are displayed only when there is a need for switching, thereby avoiding an impact on the preview.

In a possible design manner of the first aspect, the view-finding interface for video recording by the electronic device includes a second control, and the electronic device hides the plurality of options in response to a third operation by the user on the second control in a case that the plurality of options are displayed. In other words, in a case that the plurality of options are not displayed and in a case that the plurality of options are displayed, functions of the second control are different, so that different functions can be realized in different cases, thereby facilitating the simplification of interface elements. Alternatively, the electronic device hides the plurality of options in response to a second preset gesture inputted by the user on the view-finding interface for video recording by the electronic device in a case that the plurality of options are displayed. The second preset gesture is opposite to the first preset gesture. For example, if the first preset gesture is a gesture of sliding upward from the preset position of the current view-finding interface, the second preset gesture may be a gesture of sliding downward from the preset position of the current view-finding interface. Alternatively, in a case that the plurality of options are displayed, the electronic device may automatically hide the plurality of options if no operation by the user is received within a preset duration starting from displaying the plurality of options. This hiding method is especially friendly to users that are not familiar with the functions. Similarly, the view-finding interface for video recording by the electronic device may be the foregoing first interface, second interface, third interface, fourth interface, or the like.

In other words, by using the method in this embodiment, the plurality of options can be hidden in a case that the plurality of options are displayed, to avoid an impact on the preview.

In a possible design manner of the first aspect, the view-finding interface for video recording by the electronic device further includes a first identifier, and the first identifier is used for indicating a layout currently adopted by the electronic device. The first identifier and the second control may be the same interface element, so that the interface elements can be further simplified. Similarly, the view-finding interface for video recording by the electronic device may be the foregoing first interface, second interface, third interface, fourth interface, or the like.

In other words, by using the method in this embodiment, the first identifier can be used to determine that it is still the layout currently adopted.

In a possible design manner of the first aspect, in a case that the layout currently adopted by the electronic device is a full screen layout, the view-finding interface for video recording by the electronic device further includes a third control, where the third control is configured to trigger the electronic device to between the front and rear cameras. Layouts adopted for the front single-camera mode or the rear single-camera mode are both full screen layouts. Similarly, the view-finding interface for video recording by the electronic device may be the foregoing first interface, second interface, third interface, fourth interface, or the like.

In other words, by using the method in this embodiment, in the single-lens video recording mode, the front and rear cameras can be flexibly switched through the third control.

In a possible design manner of the first aspect, in a case that the layout currently adopted by the electronic device is a split-screen layout or a picture-in-picture layout, and preview cameras currently adopted by the electronic device include one front camera and one rear camera (for example, a front-rear dual-lens mode or a picture-in-picture mode), the view-finding interface for video recording by the electronic device further includes a fourth control. The fourth control is configured to trigger the electronic device to switch between two front cameras or two rear cameras for video recording. The form of the fourth control may be the same as that of the third control. Similarly, the view-finding interface for video recording by the electronic device may be the foregoing first interface, second interface, third interface, fourth interface, or the like.

In other words, by using the method in this embodiment, in modes such as the front-rear dual-lens mode or the picture-in-picture mode, one front camera and one rear camera can be flexibly switched to two front cameras or two rear cameras through the fourth control. Therefore, the flexibility of cameras switching is improved.

In a possible design manner of the first aspect, in a case that the preview cameras currently adopted by the electronic device include a rear camera (such as a front-rear dual-lens mode, a picture-in-picture mode, a rear-rear dual-lens mode, or a front single-camera mode), the view-finding interface for video recording by the electronic device further includes a fifth control. The fifth control is configured to trigger the electronic device to switch from the currently adopted rear camera to another rear camera included in the electronic device.

In other words, by using the method in this embodiment, switching between the rear cameras can be flexibly implemented through the fifth control.

In a possible design manner of the first aspect, each option includes an effect image of a layout indicated by the option. The effect image may be a pre-configured image, so that the power consumption during switching can be reduced. Alternatively, the effect image may be a real-time image acquired by the corresponding camera, so that the recording layout and the real view-finding effect can be viewed from the options.

According to a second aspect, an embodiment of this application further provides an electronic device, where the electronic device includes a plurality of cameras, and the electronic device further includes a display screen, a memory, and one or more processors. The plurality of cameras, the display screen, and the memory are coupled to the processor. The memory is configured to store computer program code. The computer program code includes computer instructions. The computer instructions, when executed by the processor, cause the electronic device to perform the method according to the first aspect and any possible design manner thereof.

According to a third aspect, an embodiment of this application provides a chip system, where the chip system is applicable to an electronic device including a display screen and a memory. The chip system includes one or more interface circuits and one or more processors, where the interface circuit and the processor are interconnected by a line; the interface circuit is configured to receive a signal from the memory of the electronic device and transmit the signal to the processor, and the signal includes computer instructions stored in the memory; and when the processor executes the computer instructions, the electronic device performs the method according to the first aspect and any possible design manner thereof.

According to a fourth aspect, this application provides a computer storage medium, where the computer storage medium includes computer instructions, and the computer instructions, when run on an electronic device, cause the electronic device to perform the method according to the first aspect and any possible design manner thereof.

According to a fifth aspect, this application provides a computer program product, where the computer program product, when run on a computer, cause the computer to perform the method described in the first aspect and any possible design manner thereof.

It may be understood that, for beneficial effects that can be achieved by the electronic device described in the second aspect, the chip system described in the third aspect, the computer storage medium described in the fourth aspect, and the computer program product described in the fifth aspect provided above, reference may be made to the beneficial effects in the first aspect and any one of the possible designs thereof, and details are not described herein again.

BRIEF DESCRIPTION OF DRAWINGS

FIG. 6 is a flowchart of a video capturing method according to an embodiment of this application;

FIG. 15 is another flowchart of a video capturing method according to an embodiment of this application;

FIG. 16A and FIG. 16B are another flowchart of a video capturing method according to an embodiment of this application;

FIG. 20 is another flowchart of a video capturing method according to an embodiment of this application;

FIG. 28 is another flowchart of a video capturing method according to an embodiment of this application;

FIG. 30A and FIG. 30B are another flowchart of a video capturing method according to an embodiment of this application;

FIG. 35b-1 and FIG. 35b-2 are another flowchart of a video capturing method according to an embodiment of this application;

FIG. 37A and FIG. 37B are another flowchart of a video capturing method according to an embodiment of this application;

DESCRIPTION OF EMBODIMENTS

The terms "first" and "second" mentioned below are used merely for the purpose of description, and shall not be construed as indicating or implying relative importance or implying a quantity of indicated technical features. Therefore, a feature limited by "first" or "second" may explicitly or implicitly include one or more of the features. In the description of the embodiments, unless otherwise stated, "a plurality of" means two or more.

The following describes implementations in the embodiments in detail with reference to the accompanying drawings. In order to facilitate the understanding of the effects of the embodiments of this application, an example in which the electronic device is a mobile phone is used below to describe the conventional video capturing solution and its defects in detail.

In the conventional technology, in the camera application of the mobile phone, function options such as "PORTRAIT", "PHOTO", "VIDEO RECORDING" and "MORE" are provided. In response to the user's triggering of the "MORE" function option, the mobile phone may display a "MORE" function interface 101 shown in FIG. 1. The "MORE" function interface 101 includes a dual-lens video recording control 102. The mobile phone can receive the user's click/tap operation on the dual-lens video recording control 102. In response to the click/tap operation, the mobile phone may display a view-finding interface 201 shown in FIG. 2(a). The view-finding interface 201 includes a preview image a202 acquired by a camera a (such as a rear telephoto camera) and a preview image b203 acquired by a camera b (such as a rear wide-angle camera). In addition, the preview image a202 and the preview image b203 are displayed in a top-bottom split-screen layout.

Figure 2A:
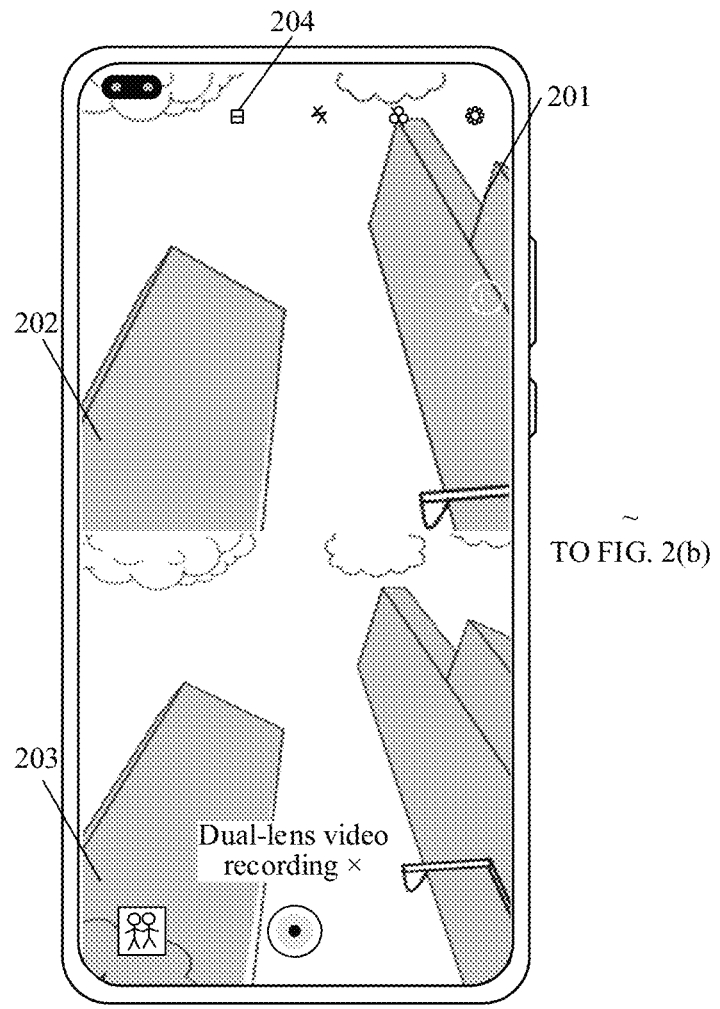
FIG. 2(a), FIG. 2(b), and FIG. 2(c) are a schematic diagram of a view-finding interface for dual-lens video recording in a portrait form according to an embodiment of this application.

The view-finding interface 201 shown in FIG. 2(a) further includes a mode identifier 204. The mode identifier 204 can be used for indicating the current recording mode in which the preview images acquired by the two rear cameras (such as a rear wide-angle camera and a rear telephoto camera) are displayed in a top-bottom layout (which is referred to as a rear-rear dual-lens mode in the embodiments below). In addition, the mode identifier 204 can further be used for triggering the mobile phone to switch between recording modes. The mobile phone can receive the user's click/tap operation on the mode identifier 204, and in response to the user's click/tap operation on the mode identifier 204, the mobile phone can display a view-finding interface 205 shown in FIG. 2(b). The view-finding interface 205 includes a preview image a206 acquired by the camera a (such as a rear main camera) and a preview image b207 acquired by a camera b (such as a front camera). In addition, the preview image a206 and the preview image b207 are displayed in a top-bottom split-screen layout.

Figure 2B:
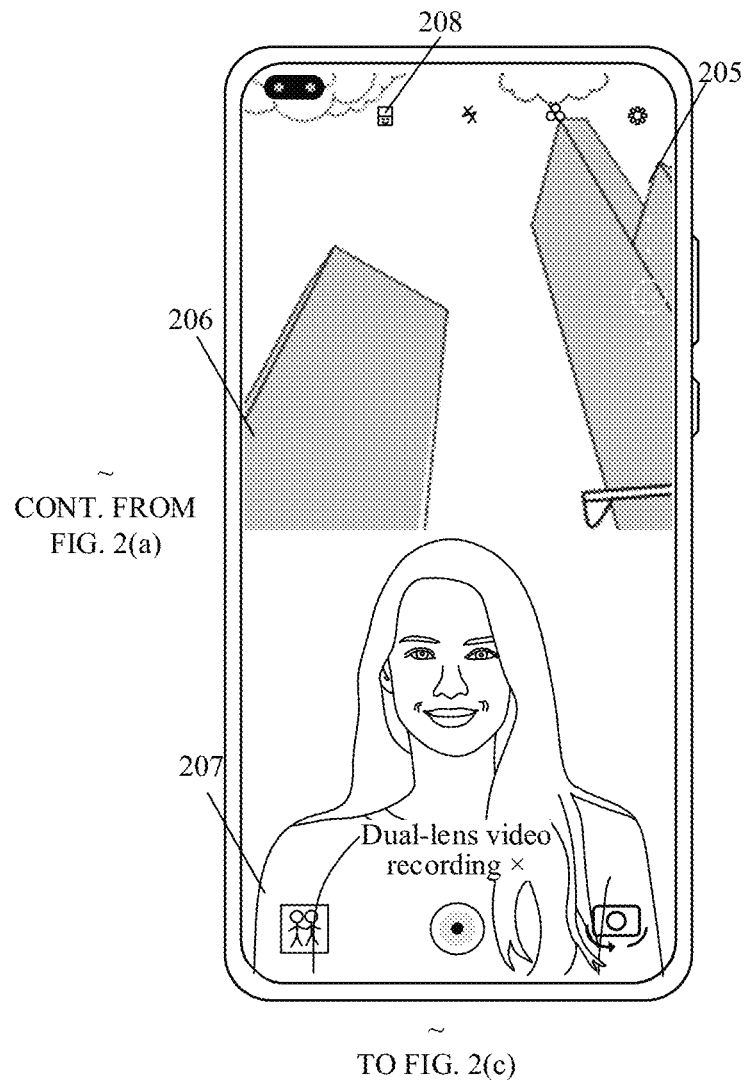

The view-finding interface 205 shown in FIG. 2(b) further includes a mode identifier 208. The mode identifier 208 can be used for indicating the current recording mode in which the preview images acquired by one front camera and one rear camera (such as a rear main camera and a front camera) are displayed in a top-bottom layout (which is referred to as a front-rear dual-lens mode in the embodiments below). Similarly, the mode identifier 208 can also be used for triggering the mobile phone to switch between recording modes. The mobile phone can receive the user's click/tap operation on the mode identifier 208. In response to the user's click/tap operation on the mode identifier 208, the mobile phone can display a view-finding interface 209 shown in FIG. 2(c). The view-finding interface 209 includes a preview image a210 acquired by the camera a (such as a rear main camera) and a preview image b211 acquired by a camera b (such as a front camera). In addition, the preview image a210 and the preview image b211 are displayed in a picture-in-picture layout.

Figure 2C:
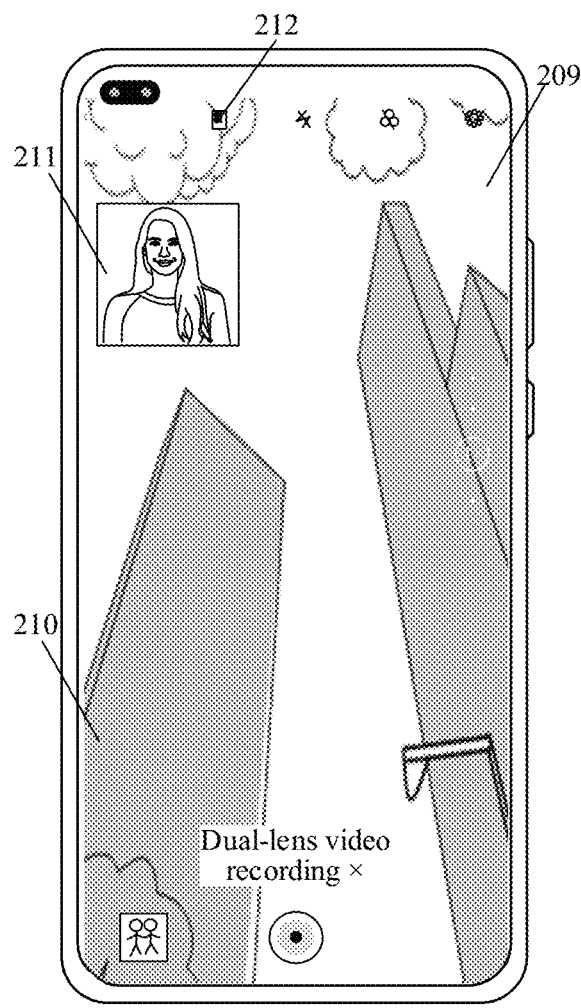

The view-finding interface 209 shown in FIG. 2(c) further includes a mode identifier 212. The mode identifier 212 can be used for indicating the current recording mode in which the preview images acquired by one front camera and one rear camera (such as a rear main camera and a front camera) are displayed in a portrait picture-in-picture layout (which is referred to as a picture-in-picture dual-lens mode in the embodiments below). Similarly, the mode identifier 212 can also be used for triggering the mobile phone to switch between recording modes.

In the foregoing conventional technology, the mobile phone can only display the recording effect of the recording mode after switching through the content of the preview images acquired by the two cameras on the view-finding interface after switching and the display layout of the preview images. Before switching, the user cannot prejudge the recording effect. Especially for users using this infrequently, the defect is particularly prominent. For example, after the first switch above, the mobile phone can only show front-rear dual-lens mode through the image content of the preview image a206 and the preview image b207 on the view-finding interface 205 after switching, and the display layout of the preview image a206 and the preview image b207. In another example, after the second switch above, the mobile phone can only show the recording effect of the picture-in-picture dual-lens mode through the image content of the preview image a210 and the preview image b211 on the view-finding interface 209 after switching, and the display layout of the preview image a210 and the preview image b211.

Figure 3:
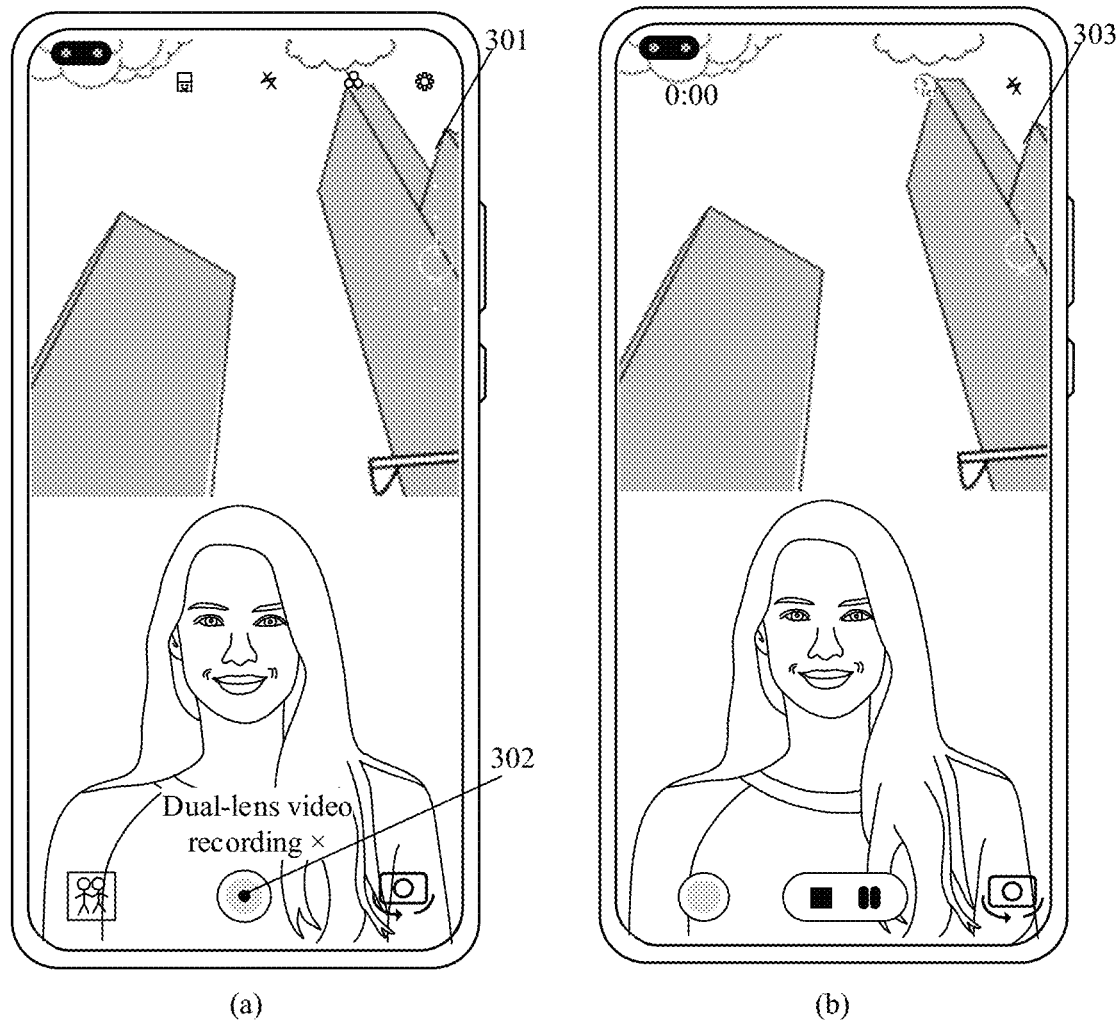
FIG. 3 is another schematic diagram of a view-finding interface for dual-lens video recording in a portrait form according to an embodiment of this application.

Further, the view-finding interface after switching further includes a recording control, which is configured to trigger the mobile phone to start dual-lens video recording. A view-finding interface 301 shown in (a) of FIG. 3 includes a recording control 302, and the recording control 302 is configured to trigger the mobile phone to start dual-lens video recording. The mobile phone can receive the user's click/tap operation on the recording control 302. In response to the user's click/tap operation on the recording control 302, the mobile phone may display a view-finding interface 303 shown in (b) of FIG. 3, and enter into dual-lens video recording at this time.

In the foregoing conventional technology, the view-finding interface 303 during recording includes no mode identifier, and the function of mode switching is no longer provided. Therefore, it is impossible to flexibly switch the recording mode in the recording process.

It is to be noted herein that, the portrait scenario is used to illustrate the defects in the conventional technical means above. In the landscape scenario, similar defects also exist. It should be understood that, in the landscape scenario, the recording mode of the dual-lens video recording further includes one or more of a front-rear dual-lens mode, a rear-rear dual-lens mode, and a picture-in-picture dual-lens mode.

Figure 4:
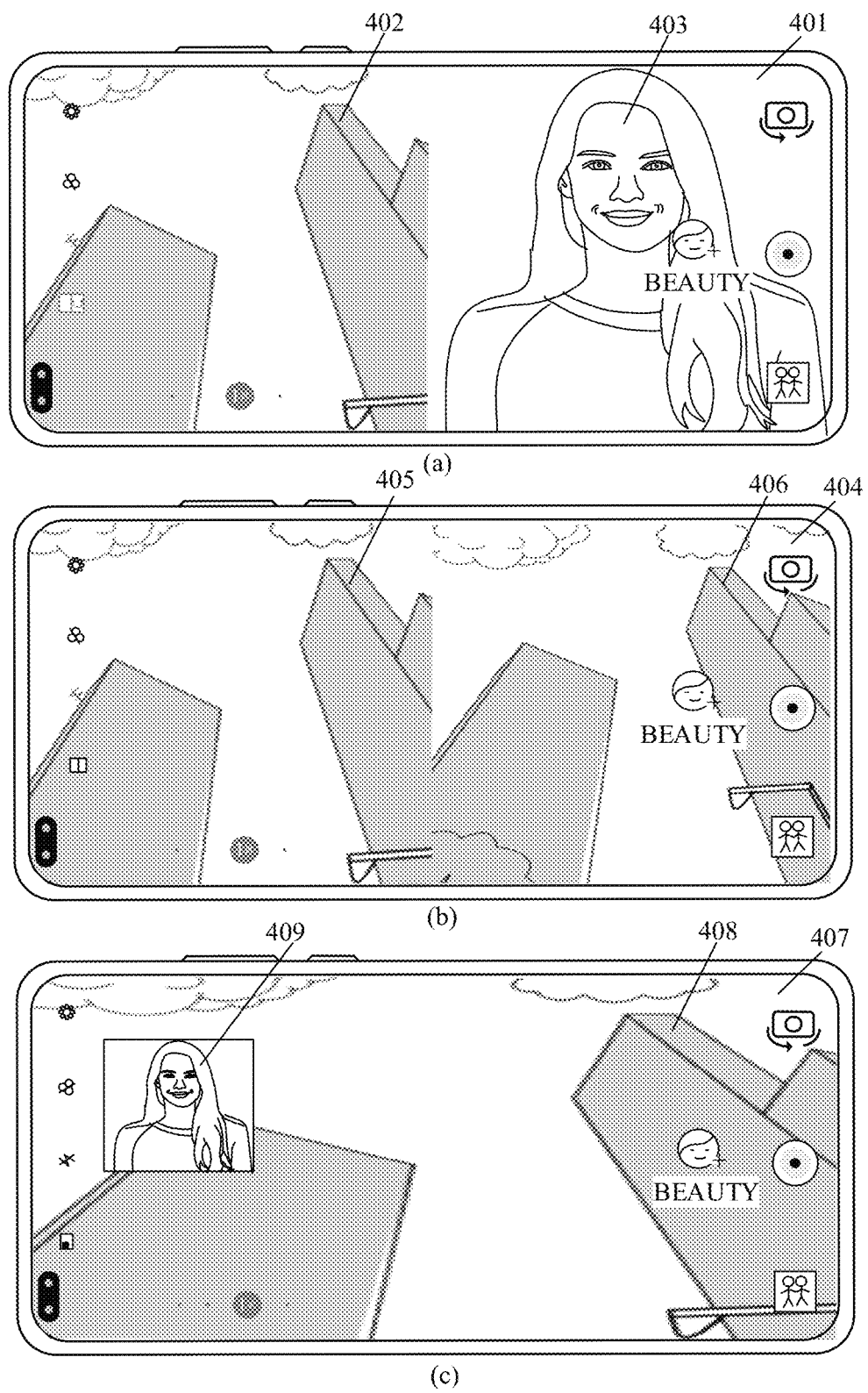
FIG. 4 is a schematic diagram of a view-finding interface for dual-lens video recording in a landscape form according to an embodiment of this application.

For example, a view-finding interface 401 shown in (a) of FIG. 4 corresponds to the front-rear dual-lens mode. The difference from the portrait scenario is that in the front-rear dual-lens mode in the landscape scenario, a preview image a402 and a preview image b403 on the view-finding interface 401 are displayed in a left-right split-screen layout.

In another example, a view-finding interface 404 shown in (b) of FIG. 4 corresponds to the rear-rear dual-lens mode. The difference from the portrait scenario is that in the rear-rear dual-lens mode in the landscape scenario, a preview image a405 and a preview image b406 on the view-finding interface 404 are displayed in a left-right split-screen layout.

In another example, a view-finding interface 407 shown in (c) of FIG. 4 corresponds to the picture-in-picture dual-lens mode. The difference from the portrait scenario is that in the picture-in-picture dual-lens mode in the landscape scenario, a preview image a408 and a preview image b409 on the view-finding interface 407 are displayed in a horizontal picture-in-picture layout.

It should be understood that, the solution of this application can be applied to the foregoing landscape scenario and portrait scenario, but in the following embodiments, the solution of this application will be mainly described in conjunction with the portrait scenario. For the specific implementation of the landscape scenario, reference may be made to the relevant instructions of the portrait scenario.

So far, it is to be noted that, only three recording modes of dual-lens video recording including the front-rear dual-lens mode, the rear-rear dual-lens mode, and the portrait picture-in-picture mode are described above. However, in the solution of this application, the recording modes of dual-lens video recording may not be limited thereto. For example, in a case that there are a plurality of rear cameras, the recording modes of dual-lens video recording may include a mode of a combination of any two rear cameras (for example, a mode of combination of a rear main camera and a rear telephoto camera). Alternatively, the recording modes may include a mode in which the front camera is combined with each rear camera respectively, and the like. In the following embodiments, three recording modes of dual-lens video recording including the front-rear dual-lens mode, the rear-rear dual-lens mode, and the portrait picture-in-picture mode will be mainly used for description.

An embodiment of this application provides a video capturing method. The method is applied to an electronic device including a plurality of cameras, and the electronic device can provide a dual-lens video recording function. The electronic device may display a plurality of mode options (which may also be also referred to as options for short) for the user to select before video recording starts or during video recording, and each mode option corresponds to one recording mode of dual-lens video recording. Subsequently, in response to the user's selection operation on a mode option, the electronic device can flexibly switch the recording mode before video recording starts or during video recording.

Moreover, the layout effect of the corresponding recording mode, for example, the effect of the split-screen layout or the picture-in-picture layout, is displayed in each mode option. In this way, before switching the recording mode, the electronic device can show the corresponding layout effect to the user. Therefore, it is more beneficial for the user to accurately select a recording mode for switching.

For example, the electronic device in the embodiments of this application may be a device including the foregoing foldable screen, such as a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)\ virtual reality (virtual reality, VR) device. A specific form of the electronic device is not particularly limited in the embodiments of this application.

The following describes implementations in the embodiments of this application in detail with reference to the accompanying drawings.

Figure 5:
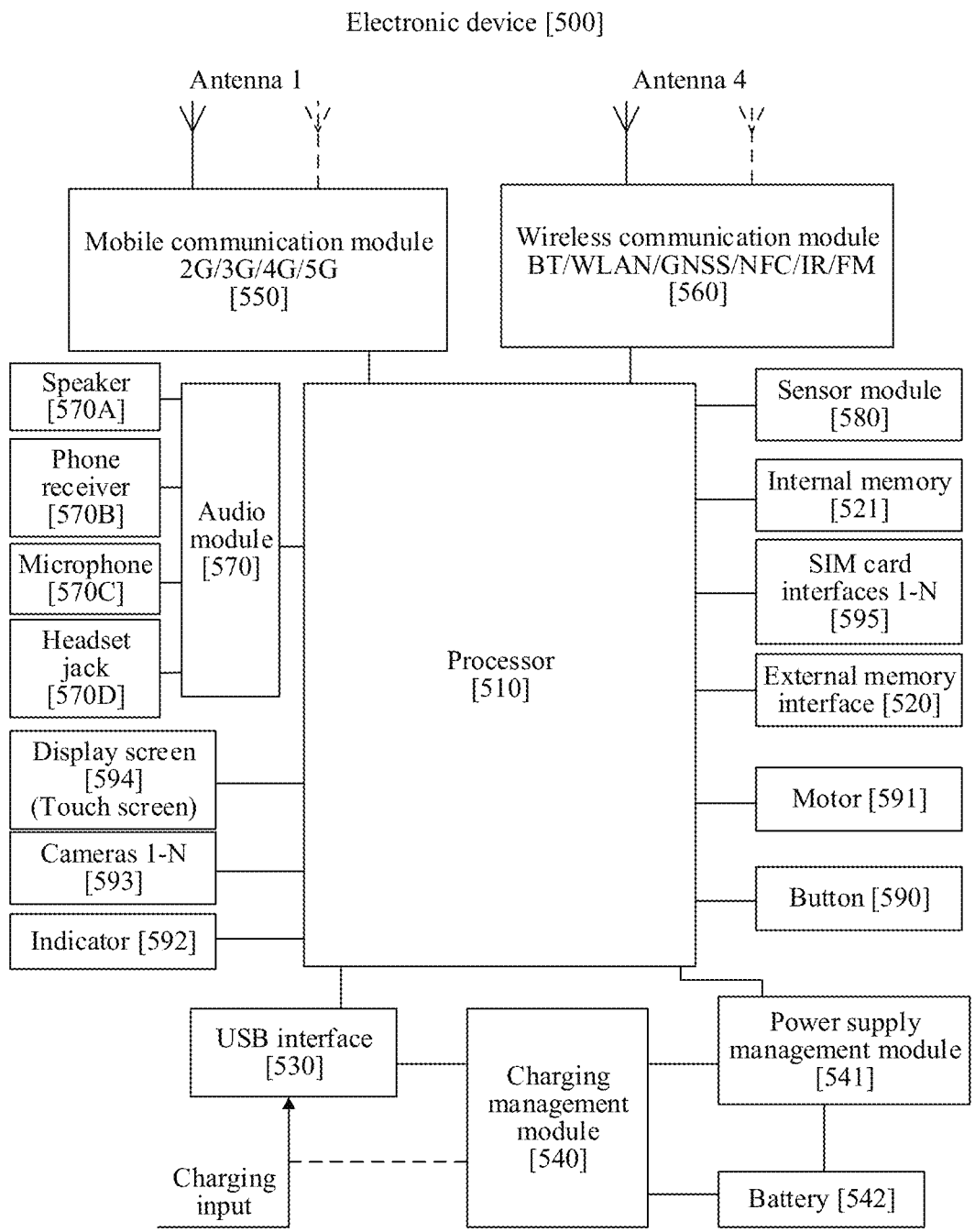
FIG. 5 is a schematic diagram of a hardware structure of an electronic device according to an embodiment of this application.

FIG. 5 is a schematic structural diagram of an electronic device 500 according to an embodiment of this application. As shown in FIG. 5, the electronic device may include a processor 510, an external memory interface 520, an internal memory 521, a universal serial bus (universal serial bus, USB) interface 530, a charging management module 540, a power management module 541, a battery 542, an antenna 1, an antenna 2, a mobile communication module 550, a wireless communication module 560, and an audio module 570, a speaker 570A, a telephone receiver 570B, a microphone 570C, a headset jack 570D, a sensor module 580, a button 590, a motor 591, an indicator 592, a camera 593, a display screen 594, a subscriber identity module (subscriber identity module, SIM) card interface 595, and the like.

It may be understood that the schematic structure in this embodiment constitutes no specific limitation on the electronic device. In some other embodiments, the electronic device may include more or fewer components than those shown in the figure, or some components may be combined, or some components may be split, or a different component deployment may be used. The components in the portrait may be implemented by hardware, software, or a combination of software and hardware.

The processor 510 may include one or more processing units. For example, the processor 510 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be separate devices, or may be integrated into one or more processors.

A memory may also be disposed in the processor 510, configured to store instructions and data. In some embodiments, the memory in the processor 510 is a cache. The memory may store an instruction or data that has just been used or cyclically used by the processor 510. If the processor 510 needs to use the instruction or the data again, the processor may directly invoke the instruction or the data from the memory, to avoid repeated access and reduce a waiting time of the processor 510, thereby improving system efficiency.

In some embodiments, the processor 510 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that a schematic interface connection relationship between the modules in this embodiment is merely an example for description, and constitutes no limitation on the structure of the electronic device. In some other embodiments, the electronic device may alternatively use an interface connection manner different from that in the foregoing embodiment, or use a combination of a plurality of interface connection manners.

The charging management module 540 is configured to receive charging input from the charger. The charger may be a wireless charger, or may be a wired charger. The power management module 541 is configured to be connected to the battery 542, the charging management module 540, and the processor 510. The power management module 541 receives an input of the battery 542 and/or the charging management module 540, to supply power to the processor 510, the internal memory 521, an external memory, a display screen 594, the camera 593, the wireless communication module 560, and the like.

A wireless communication function of the electronic device may be implemented by using the antenna 1, the antenna 2, the mobile communication module 550, the wireless communication module 560, the modem processor, the baseband processor, and the like.

The mobile communication module 550 may provide a solution to wireless communication such as 2G/3G/4G/5G applied to the electronic device. The mobile communication module 550 may include at least one filter, a switch, a power amplifier, a low noise amplifier (low noise amplifier, LNA), and the like.

The wireless communication module 560 may provide a solution to wireless communication applied to the electronic device, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology.

The electronic device implements a display function by using the GPU, the display screen 594, the application processor, and the like. The GPU is a microprocessor for image processing, and is connected to the display screen 594 and the application processor. The GPU is configured to perform mathematical and geometric calculation, and is configured to render an image. The processor 510 may include one or more GPUs that execute a program instruction to generate or change display information.

The display screen 594 is configured to display an image, a video, and the like. The display screen 594 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, and quantum dot light emitting diodes (quantum dot light emitting diodes, QLED).

The electronic device may implement a photographing function by using the ISP, the camera 593, the video codec, the GPU, the display screen 594, the application processor, and the like. The ISP is configured to process data fed back by the camera 593. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may alternatively perform algorithm optimization on noise, luminance, and complexion of the image. The ISP may further optimize parameters such as exposure and a color temperature of a photographing scene. In some embodiments, the ISP may be arranged in the camera 593.

The camera 593 is configured to capture a static image or a video. An optical image is generated for an object by using the lens and is projected onto the photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard image signal in an RGB format, a YUV format, or the like. In some embodiments, the electronic device may include one or N cameras 593, and N is a positive integer greater than 1.

The NPU is a neural-network (neural-network, NN) computing processor, quickly processes input information by referring to a structure of a biological neural network (for example, a transmission mode between neurons in a human brain), and may further continuously perform self-learning. Applications such as intelligent cognition of the electronic device may be implemented by using the NPU, for example, image recognition, facial recognition, voice recognition, and text understanding.

The external memory interface 520 may be configured to connect to an external storage card, for example, a micro SD card, to expand a storage capability of the electronic device. The external storage card communicates with the processor

510 by using the external memory interface 520, to implement a data storage function. For example, a file such as a music or a video is stored in the external storage card.

The internal memory 521 may be configured to store computer-executable program code. The executable program code includes an instruction. The processor 510 runs the instruction stored in the internal memory 521, to perform various function applications and data processing of the electronic device. For example, the processor 510 may display different content on the display screen 584 in response to the user's operation of expanding the display screen 594 by executing instructions stored in the internal memory 521. The internal memory 521 may include a program storage area and a data storage area. The program storage area may store an operating system, an application required by at least one function (such as a voice playing function and an image playing function), and the like. The data storage region may store data (for example, audio data and an address book) created during use of the electronic device. In addition, the internal memory 521 may include a high-speed random access memory, and may also include a non-volatile memory, for example, at least one magnetic disk storage device, a flash memory device, or a universal flash storage (universal flash storage, UFS).

The electronic device may implement an audio function such as music playback, recording, and the like by using the audio module 570, the speaker 570A, the phone receiver 570B, the microphone 570C, the headset jack 570D, the application processor, and the like. The audio function is, for example, music playback and sound recording.

The key 590 includes a start key, a volume key, and the like. The key 590 may be a mechanical key, or a touch-type key. The electronic device may receive a key input, and generate a key signal input related to user setting and function control of the electronic device. The motor 591 may generate a vibration prompt. The motor 591 may be used for an incoming call vibration prompt and a touch vibration feedback. The indicator 592 may be an indicator light that may be configured to indicate a charging state and a power change, or may be configured to indicate a message, a missed call, a notification, and the like. The SIM card interface 595 is configured to connect to a SIM card. The SIM card may be inserted into the SIM card interface 595 or plugged from the SIM card interface 595, to come into contact with or be separated from the electronic device. The electronic device may support one or N SIM card interfaces. N is a positive integer greater than 1.

The methods in the following embodiments can all be implemented in the electronic device 500 having the foregoing hardware structure. The method in this embodiment of this application is described by using an example in which the electronic device 500 is a mobile phone.

In the video capturing method provided in this embodiment of this application, after entering the video recording function, before video recording starts or during video recording, the mobile phone can flexibly switch between a plurality of recording modes according to the user's selection operation. There is at least one time of switching. In this embodiment of this application, the at least one time of switching is divided into the following cases:

Case 1: The at least one time of switching includes switching from one recording mode of dual-lens video recording to another recording mode of dual-lens video recording, for example, switching from the front-rear dual-lens mode to the picture-in-picture dual-lens mode.

Case 2: The at least one time of switching includes switching from single-lens video recording (for example, front camera video recording) to a recording mode of dual-lens video recording, for example, switching from front camera video recording to the front-rear dual-lens mode. It should be understood that, the single-lens video recording is compared with dual-lens video recording, and the single-lens video recording refers to a scenario in which only one camera is used as a preview camera for video recording at the same time point.

Case 3: The at least one time of switching includes switching from a recording mode of dual-lens video recording to single-lens video recording, for example, switching from the front-rear dual-lens mode to front camera video recording.

Case 4: The at least one time of switching includes switching from a recording mode of single-lens video recording to another recording mode of single-lens video recording, for example, switching from front camera video recording to rear camera video recording.

In the following embodiments, the solution of this application will be described mainly by using the scenario of video recording being performed, and for the above three cases respectively.

Corresponding to Case 1, an embodiment of this application provides a video capturing method. The method is applied to a mobile phone, and the mobile phone includes a plurality of cameras and can provide a dual-lens video recording function. Specifically, as shown in FIG. 6, the method includes S601 to S604.

S601: The mobile phone displays an interface a, where the interface a is a view-finding interface for video recording being performed, and the interface a includes a preview image a acquired by a camera 1 and a preview image b acquired by a camera 2. The preview image a and the preview image b are displayed in a layout style 1.

Figure 7A:
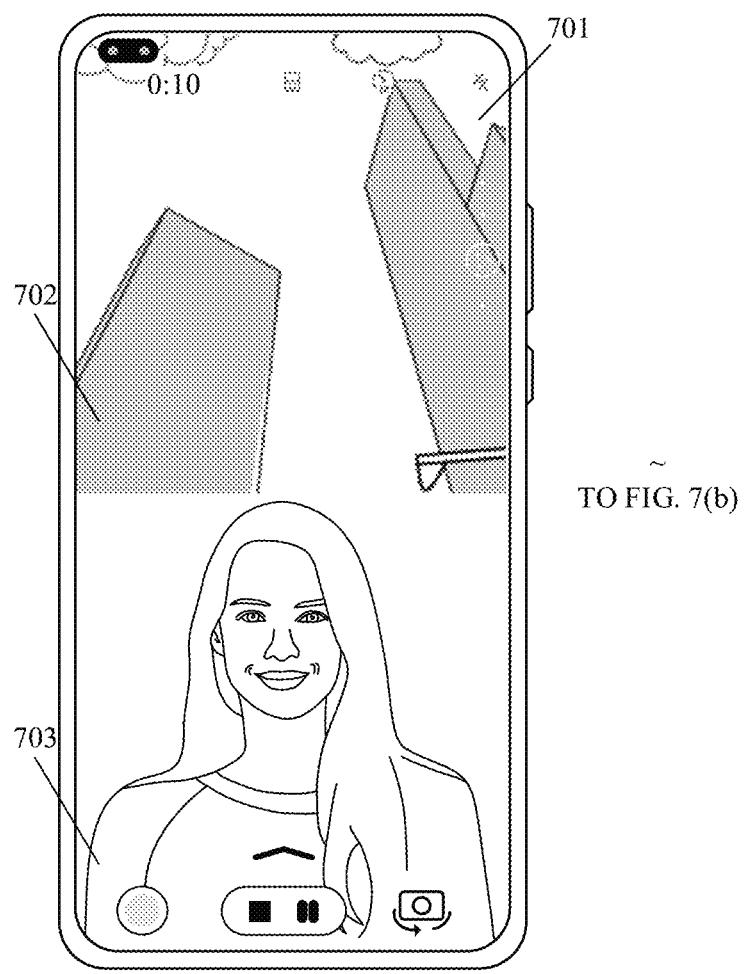
FIG. 7(a), FIG. 7(b), and FIG. 7(c) are another schematic diagram of a view-finding interface for dual-lens video recording in a portrait form according to an embodiment of this application.
Figure 7B:
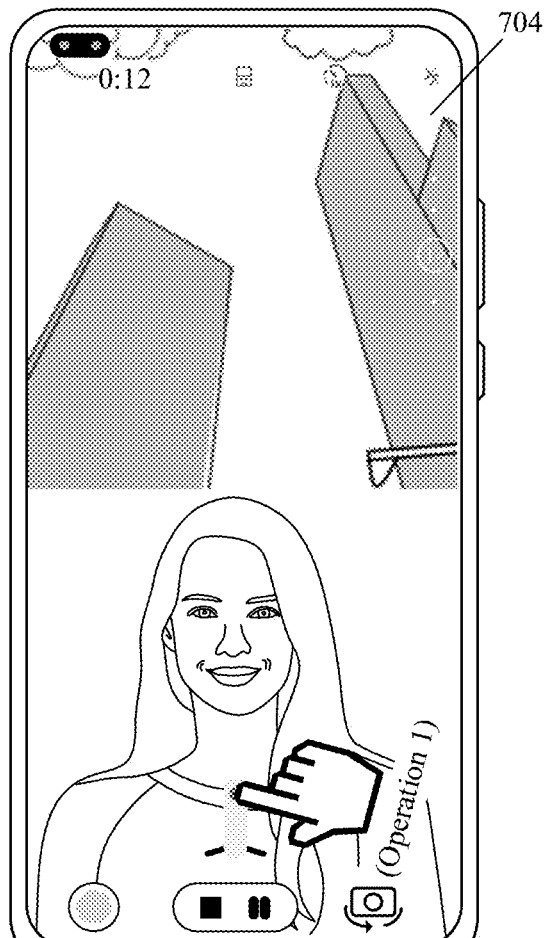

For example, the mobile phone may display an interface a701 shown in FIG. 7(*a*). The interface a701 is a view-finding interface for video recording being performed, and the interface a701 includes a preview image a702 acquired by the rear main camera and a preview image b703 acquired by the front camera. That is, the camera 1 is the rear main camera, and the camera 2 is the front camera.

The camera 1 and the camera 2 are preview cameras to which the recording mode 1 currently adopted is applicable. The preview image a acquired by the camera 1 and the preview image b acquired by the camera 2 are laid out in a layout style applicable to the currently adopted recording mode.

For example, the front-rear dual-lens mode is currently adopted, and the preview cameras to which the front-rear dual-lens mode is applicable are a front camera and a rear camera, then the camera 1 may be the rear camera (for example, the rear main camera), and the camera 2 may be the front camera, or, the camera 1 may be the front camera, and the camera 2 can be the rear camera (for example, the rear main camera). The layout style applicable to the front-rear dual-lens mode is a top-bottom split-screen layout, then the preview image a and the preview image b are displayed on the interface a in the top-bottom split-screen layout (as shown in FIG. 7(*a*)).

In another example, the picture-in-picture dual-lens mode is currently adopted, and the preview cameras to which the picture-in-picture dual-lens mode is applicable are a front camera and a rear camera, then the camera 1 may be the rear camera (for example, the rear main camera), and the camera 2 may be the front camera, or, the camera 1 may be the front camera, and the camera 2 can be the rear camera (for example, the rear main camera). The layout style applicable to the picture-in-picture dual-lens mode is a picture-in-picture layout, then the preview image a and the preview image b are displayed on the interface a in the picture-in-picture layout. Generally, a preview image acquired by the front camera is displayed in a small window in the picture-in-picture layout, and a preview image acquired by the rear camera is displayed in a large window in the picture-in-picture layout.

The interface a in the examples of the foregoing front-rear dual-lens mode and the picture-in-picture dual-lens mode may also be referred to as a second interface, the camera 1 may also be referred to as a second camera, the preview image a may also be referred to as a second preview image, the camera 2 may also be referred to as a third camera, the preview image b may also be referred to as a third preview image, and the top-bottom split-screen layout may also be referred to as a first layout.

S602: The mobile phone displays a plurality of mode options on the interface a in response to an operation 1 by a user on the interface a. The operation 1 is used for triggering the mobile phone to switch a recording mode; each mode option corresponds to one video recording mode; and each mode option includes an effect image corresponding to the recording mode.

The operation 1 may also be referred to as a first operation, and the mode option may be referred to as an option for short, which are the same throughout the text.

Before S602, the mobile phone receives the user's operation 1 on interface a. The operation 1 may be a preset gesture 1 on the interface a. For example, the operation 1 is a slide-upward gesture on an interface a704 shown in FIG. 7(b). The preset gesture 1 may also be referred to as a first preset gesture. Alternatively, the interface a includes a control a, and in a case that the plurality of mode options are not displayed on the interface a, the control a can be configured to trigger the mobile phone to display the plurality of mode options. The operation 1 may be a user's trigger operation (such as a click/tap operation or a long press operation) on the control a. The control a may also be referred to as a second control.

An example in which the operation 1 is a click/tap operation by the user on the control a is used. For example, the interface a705 shown in FIG. 7(c) includes a control a706, and the control a706 is configured to trigger the mobile phone to display the plurality of mode options. An operation a may be a user's click/tap operation on the control a706.

In some embodiments, the control a may alternatively be used as a mode identifier to indicate the current recording mode, and may further indicate the layout adopted in the current recording mode. For example, the control a706 shown in FIG. 7(c) may also indicate that the current recording mode is the front-rear dual-lens mode, and indicate that the adopted layout is a top-bottom split-screen layout. In this way, the same interface element can be used for both triggering the mobile phone to display the plurality of mode options and indicating the recording mode. Therefore, the interface elements can be simplified. The mode identifier may also be referred to as a first identifier.

Figure 7C:
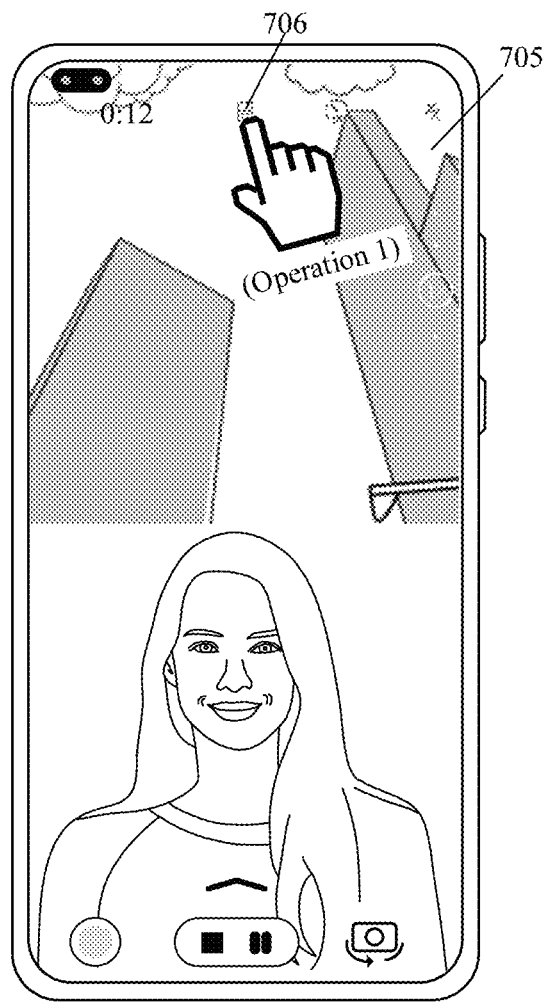
Figure 8:
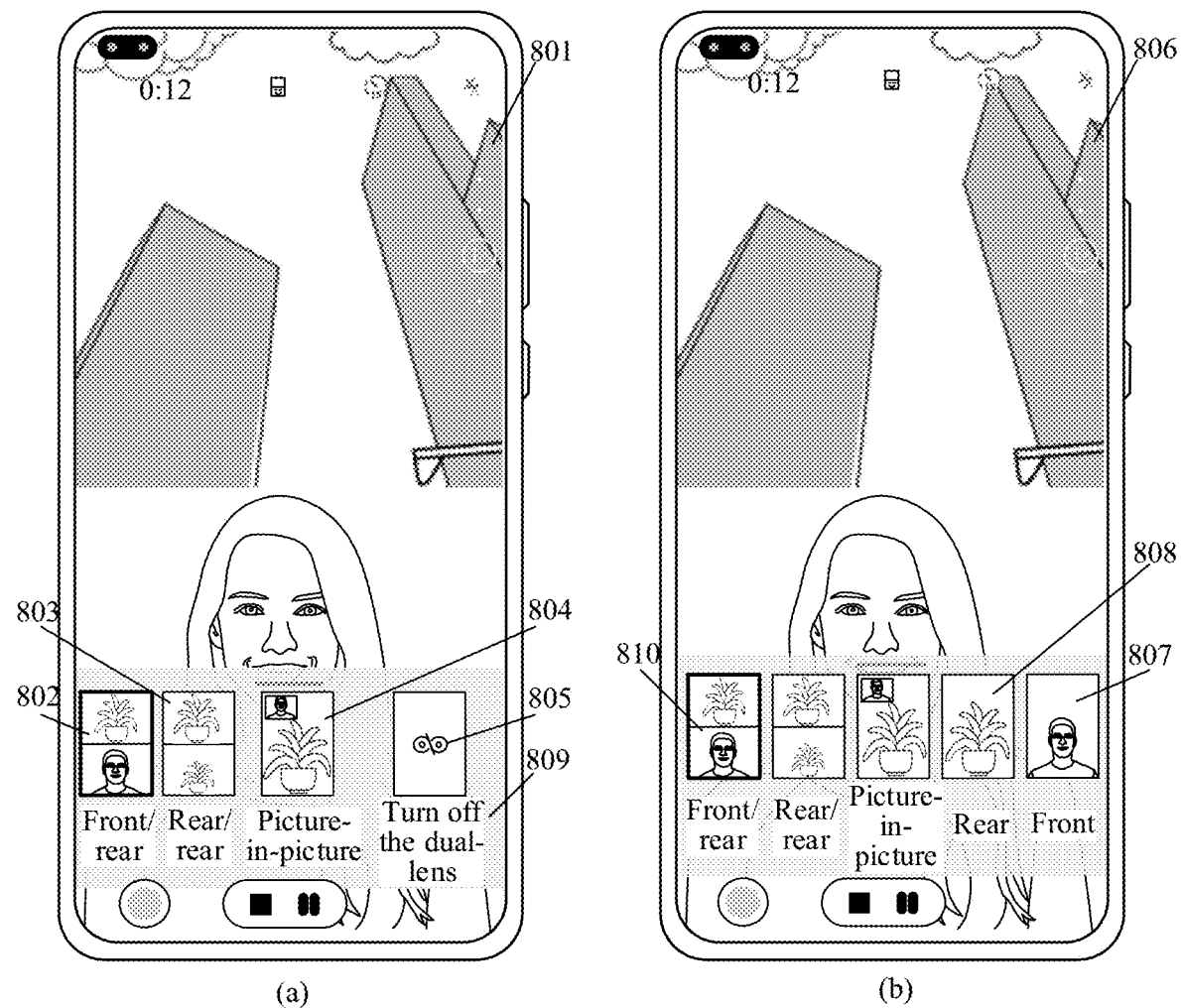
FIG. 8 is another schematic diagram of a view-finding interface for dual-lens video recording in a portrait form according to an embodiment of this application.

In S602, for example, the mobile phone may display an interface a801 shown in (a) of FIG. 8 in response to the user's click/tap operation on the control a706 on the interface a705 shown in FIG. 7(c). The interface a801 includes three mode options, which are a mode option 802, a mode option 803, and a mode option 804 respectively. The mode option 802 corresponds to the front-rear dual-lens mode, the mode option 803 corresponds to the rear-rear dual-lens mode, and the mode option 804 corresponds to the picture-in-picture dual-lens mode.

Each mode option corresponds to one recording mode, which can indicate the layout adopted in the corresponding recording mode. For example, a mode option (for example, the mode option 803) corresponding to the rear-rear dual-lens mode may indicate the top-bottom split-screen layout of the preview images acquired by the two rear cameras on the view-finding interface. The mode option corresponding to the rear-rear dual-lens mode may also be referred to as a second option, the two rear cameras may also be referred to as a fourth camera and a fifth camera, the preview image acquired by the fourth camera may also be referred to as a fourth preview image, the preview image acquired by the fifth camera may also be referred to as a fifth preview image, and the top-bottom split-screen layout adopted in the front-rear dual-lens mode may also be referred to as a second layout.

The mode option is used for the user to select the recording mode after switching. Each mode option corresponds to one recording mode. In a case that the current recording mode is a recording mode of dual-lens video recording, the mobile phone may also display an entry a on the interface a in response to an operation 1, and the entry a is configured to trigger the mobile phone to switch to single-lens video recording. In this way, flexible switching from dual-lens video recording to single-lens video recording can be further realized.

In some embodiments, the entry a is an option for turning off the dual lens. For example, an interface a801 shown in (a) of FIG. 8 further includes an option 805 for turning off the dual lens, and the option 805 for turning off the dual lens is used for triggering the mobile phone to switch to single-lens video recording.

In some other embodiments, the mode options include mode options for recording modes of dual-lens video recording and mode options for recording modes of single-lens video recording. The entry a is a mode option corresponding to a recording mode of single-lens video recording. The recording modes of single-lens video recording includes a front single-lens mode and a rear single-lens mode. For example, an interface a806 shown in (b) of FIG. 8 not only includes mode options for recording modes of dual-lens video recording such as the front-rear dual-lens mode and the front-rear dual-lens mode, but also includes a mode option 807 and a mode option 808. The mode option 807 corresponds to the front single-lens mode of the single-lens video recording, and the mode option 808 corresponds to the rear single-lens mode of the single-lens video recording. In this way, accurately switching to the front single-lens mode or the rear single-lens mode can be facilitated.

The plurality of mode options may be displayed in a window a on the interface a. Specifically, in response to the operation 1, the mobile phone displays the window a on the interface a, and the window a includes the plurality of mode options. In this way, it is convenient to distinguish mode options from preview images (such as the preview image a and the preview image b). For example, the mode option 802, mode option 803, and mode option 804 are displayed on a window a809. Alternatively, the plurality of mode options may be directly displayed on the interface a. In this way, the rendering process in the display process can be reduced, thereby improving the display efficiency.

On the interface a, the mode option in the plurality of mode options that corresponds to the current recording mode is highlighted. For example, the current recording mode is the front-rear dual-lens mode. On the interface a801 shown in (a) of FIG. 8, the mode option 802 corresponding to the front-rear dual-lens mode is highlighted. On the interface a806 shown in (b) of FIG. 8, the mode option 810 corresponding to the front-rear dual-lens mode is highlighted.

So far, it is to be noted that, the quantities and positions of the plurality of mode options shown in (a) of FIG. 8 and (b) of FIG. 8 are exemplary, and are not limited thereto in actual implementation. For example, the plurality of mode options may alternatively be arranged vertically on the right edge of the interface a. In another example, if there are two front cameras, a mode option for a recording mode combining the two front cameras is further included.

Each mode option includes an effect image to display the recording effect of the corresponding recording mode. Therefore, it is beneficial to prejudging the recording effect.

In some embodiments, the effect images are pre-configured images, and different recording modes are vividly represented by using different pre-configured images. In this embodiment, the recording effect is represented by a pre-configured image, which can reduce computer resources required for displaying mode options, thereby reducing power consumption.

For example, a plant image is used for representing an image acquired by a rear camera, and a face image is used for representing an image acquired by a front camera. In the mode option 802 shown in (a) of FIG. 8, the plant image and the face image are displayed in a top-bottom layout to represent the recording effect of the front-rear dual-lens mode. In the mode option 804 shown in (a) of FIG. 8, the plant image and the face image are displayed in a picture-in-picture layout to represent the recording effect of the picture-in-picture dual-lens mode. Further, plant images of different sizes are used for representing images acquired by different rear cameras. In the mode option 803 shown in (a) of FIG. 8, plant images of two different sizes are displayed in a top-bottom layout to represent the recording effect of the rear-rear dual-lens mode.

In some other embodiments, the effect image of each recording mode may be a real-time image acquired by a preview camera used for recording corresponding to the mode option. Specifically, in response to an operation 1, the mobile phone starts at least two cameras to which a plurality of recording modes are applicable. The mobile phone acquires real-time images acquired by the at least two cameras. The mobile phone cuts the real-time image according to the size of the effect image, and obtains the effect image of each recording mode according to the processed image. In this way, the effect image can represent the real-time recording effect. Therefore, the authenticity of the recording effect is improved.

Figure 9:
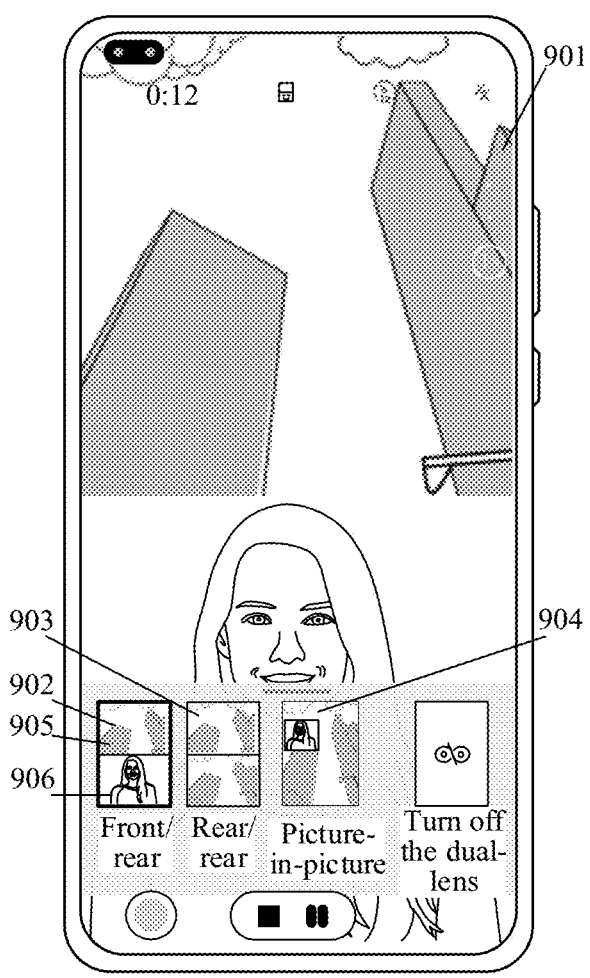
FIG. 9 is another schematic diagram of a view-finding interface for dual-lens video recording in a portrait form according to an embodiment of this application.

For example, an interface a901 shown in FIG. 9 includes a mode option 902, a mode option 903, and a mode option 904. The mode option 902 includes a real-time image 905 acquired by the rear main camera and a real-time image 906 acquired by the front camera, and the real-time image 905 and the real-time image 906 are displayed in a top-bottom layout to represent the recording effect of the front-rear dual-lens mode. Similarly, the mode option 903 includes the real-time images acquired by the two rear cameras (such as the rear wide-angle camera and the rear telephoto camera) respectively, and the real-time images acquired by the two rear cameras are displayed in a top-bottom layout to represent the recording effect of the rear-rear dual-lens mode. The mode option 904 includes the real-time image acquired by the rear main camera and the real-time image acquired by the front camera, and the two real-time images are displayed in a picture-in-picture layout to represent the recording effect of the picture-in-picture dual-lens mode.

Figure 10:
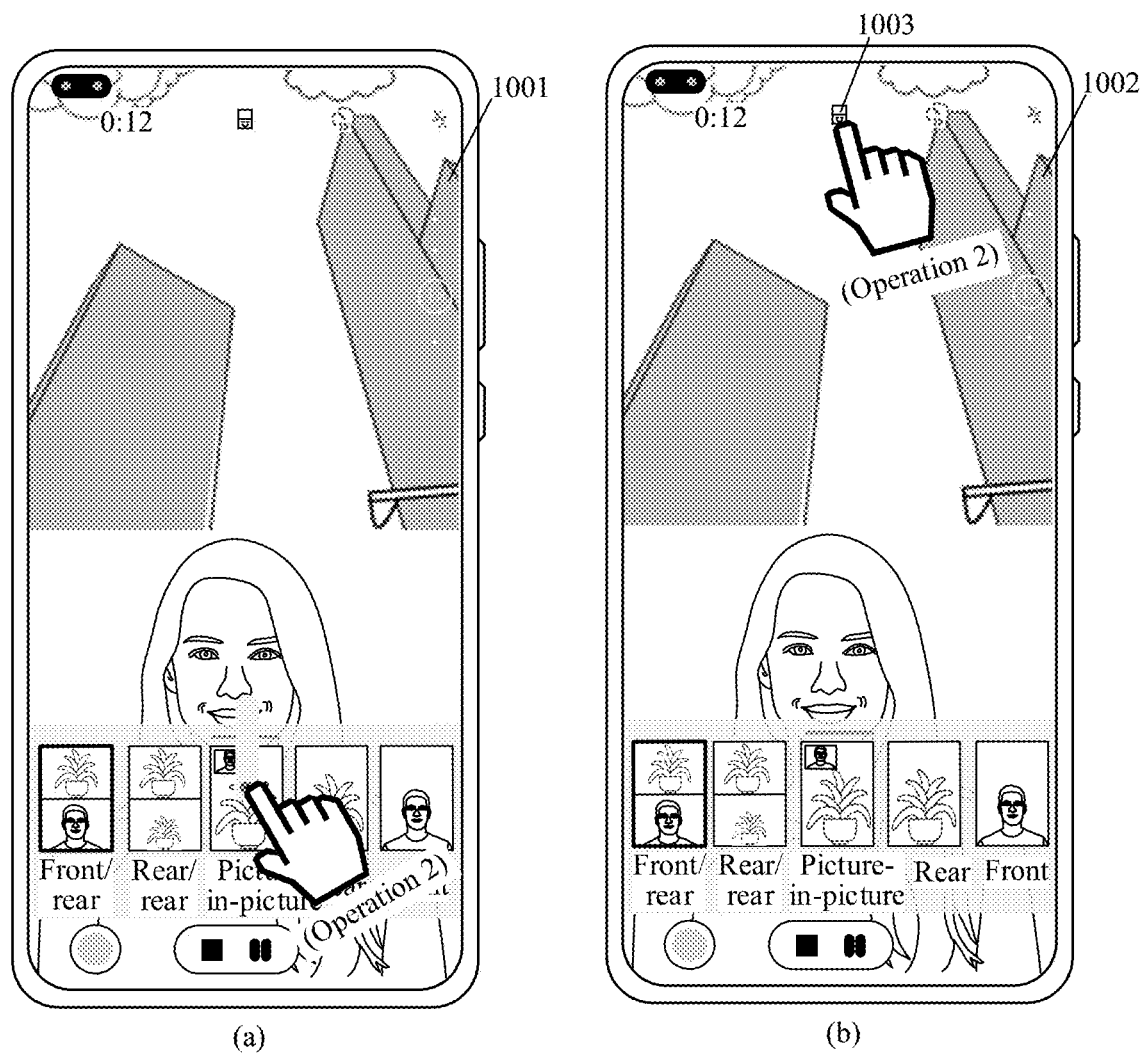
FIG. 10 is another schematic diagram of a view-finding interface for dual-lens video recording in a portrait form according to an embodiment of this application.

It should be noted that, effect images of corresponding recording modes are all displayed in the mode options shown in FIG. 8 to FIG. 10. In some other embodiments, the effect image may alternatively not be included in the mode option, provided that the mode option can indicate the display layout adopted in the corresponding recording mode. For example, the form of the mode option may be similar to that of the mode identifier, different graphics are used to represent different cameras, and the arrangement of different images represents the layout of preview images acquired by the cameras.

In the following embodiments, in order to reduce the power consumption in the video recording process, the solution of this application is mainly described in the manner in which the effect image is a pre-configured image.

In some embodiments, before the mobile phone displays the plurality of mode options, a mode identifier (which may alternatively be a control a) on the interface a is grayed out, and when the mobile phone displays the plurality of mode options, the mode identifier (which may alternatively be the control a) on the interface a is highlighted. For example, the plurality of mode options are not displayed on the interface a705 shown in FIG. 7(*c*). In this case, the mode identifier (for example, a control a706) is grayed out. A plurality of mode options are displayed on the interface a801 shown in (a) of FIG. 8, and in this case, the mode identifier is highlighted. In this way, the display of the mode identifiers matches the display of the mode options.

In some embodiments, in a case that a plurality of mode options are displayed on the current view-finding interface, the mobile phone can hide the plurality of mode options according to user operations, so as to flexibly turn off the display of the plurality of mode options and avoid blocking the preview image. Specifically, the mobile phone may receive the user's operation 2 on the current view-finding interface, and the operation 2 is used for triggering the mobile phone to hide the plurality of mode options. In response to the operation 2, the mobile phone hides a plurality of mode options in the current view-finding interface. The mobile phone can hide a plurality of mode options by closing the window a.

The operation 2 may be a preset gesture 2 inputted by the user on the current view-finding interface. For example, operation 2 may be a slide-downward gesture on an interface a1001 shown in (a) of FIG. 10. The preset gesture 2 may also be referred to as a second preset gesture.

Alternatively, the current view-finding interface includes a control a, and the control a is configured to trigger the mobile phone to close the window a in a case that the plurality of mode options are displayed on the current view-finding interface. The mobile phone hides the plurality of mode options in response to the user's trigger operation (such as a click/tap operation or a long press operation) on the control a. For example, the operation 2 may be a user's click/tap operation on a control a1003 on the interface a1002 shown in (b) of FIG. 10. In a case that the plurality of mode options are displayed on the current view-finding interface, the user's trigger operation on the control a may also be referred to as a third operation.

In some other embodiments, in a case that the plurality of mode options are displayed on the current view-finding interface, the mobile phone hides the plurality of mode options if no operation by the user is received within a preset duration starting from displaying the plurality of mode options. In this way, in a case that the user performs no operation for a long time, the plurality of mode options can be hidden to avoid an impact on the preview.

S603: The mobile phone displays an interface b in response to a selection operation by the user on a mode option a. The mode option a is one of the plurality of mode options, and the mode option a corresponds to a recording mode 2. The recording mode 2 is a recording mode in which a camera 3 and a camera 4 are used as preview cameras, and a preview image acquired by the camera 3 and a preview image acquired by the camera 4 are displayed in a layout style 2. The interface b is a view-finding interface for video recording being performed, and the interface b includes a preview image c acquired by the camera 3 and a preview image d acquired by the camera 4. The preview image c and the preview image d are displayed on the interface b in a layout style 2.

Before S603, the mobile phone may receive a selection operation by the user on a mode option a. The selection operation may be a click/tap operation, a long press operation, or a preset gesture 3. For example, the selection operation is a gesture of circling the mode option a.

For example, an example in which the selection operation is a click/tap operation on mode option a is used. The mobile phone may receive the user's click/tap operation on a mode option 1102 on the interface a1101 shown in FIG. 11(a), that is, the mode option a is the mode option 1102. The mode option 1102 corresponds to the picture-in-picture dual-lens mode, that is, the recording mode 2 is the picture-in-picture dual-lens mode. The picture-in-picture dual-lens mode is a recording mode in which the rear main camera and the front camera are used as preview cameras, and a preview image acquired by the rear main camera and a preview image acquired by the front camera are displayed in a picture-in-picture layout. That is: the camera 3 is the rear main camera, the camera 4 is the front camera, and the layout style 2 is a picture-in-picture layout.

It is to be noted that, the camera 3 may be the same as the camera 1, or may be different from the camera 1; and/or the camera 4 may be the same as the camera 2, or may be different from the camera 2.

For example, the current recording mode is the front-rear dual-lens mode, the camera 1 is the rear main camera, and the camera 2 is the front camera. The recording mode 2 is the picture-in-picture dual-lens mode, the camera 3 is the rear main camera, and the camera 4 is the front camera. Obviously, the camera 1 is the same as the camera 3, which are both rear main cameras, and the camera 2 is the same as the camera 4, which are both front cameras.

In another example, the current recording mode is the front-rear dual-lens mode, the camera 1 is the rear main camera, and the camera 2 is the front camera. The recording mode 2 is the rear-rear dual-lens mode, the camera 3 is a rear wide-angle camera, and the camera 4 is a rear telephoto camera. Obviously, the camera 1 is different from the camera 3, and the camera 2 is different from the camera 4.

In some embodiments, the recording mode corresponding to each mode option, as well as the preview cameras and layout style of each recording mode are recorded in the mobile phone. After the mobile phone receives the user's selection operation on the mode option a, information such as the corresponding recording mode, preview cameras, and layout style can be found.

Figure 11A:
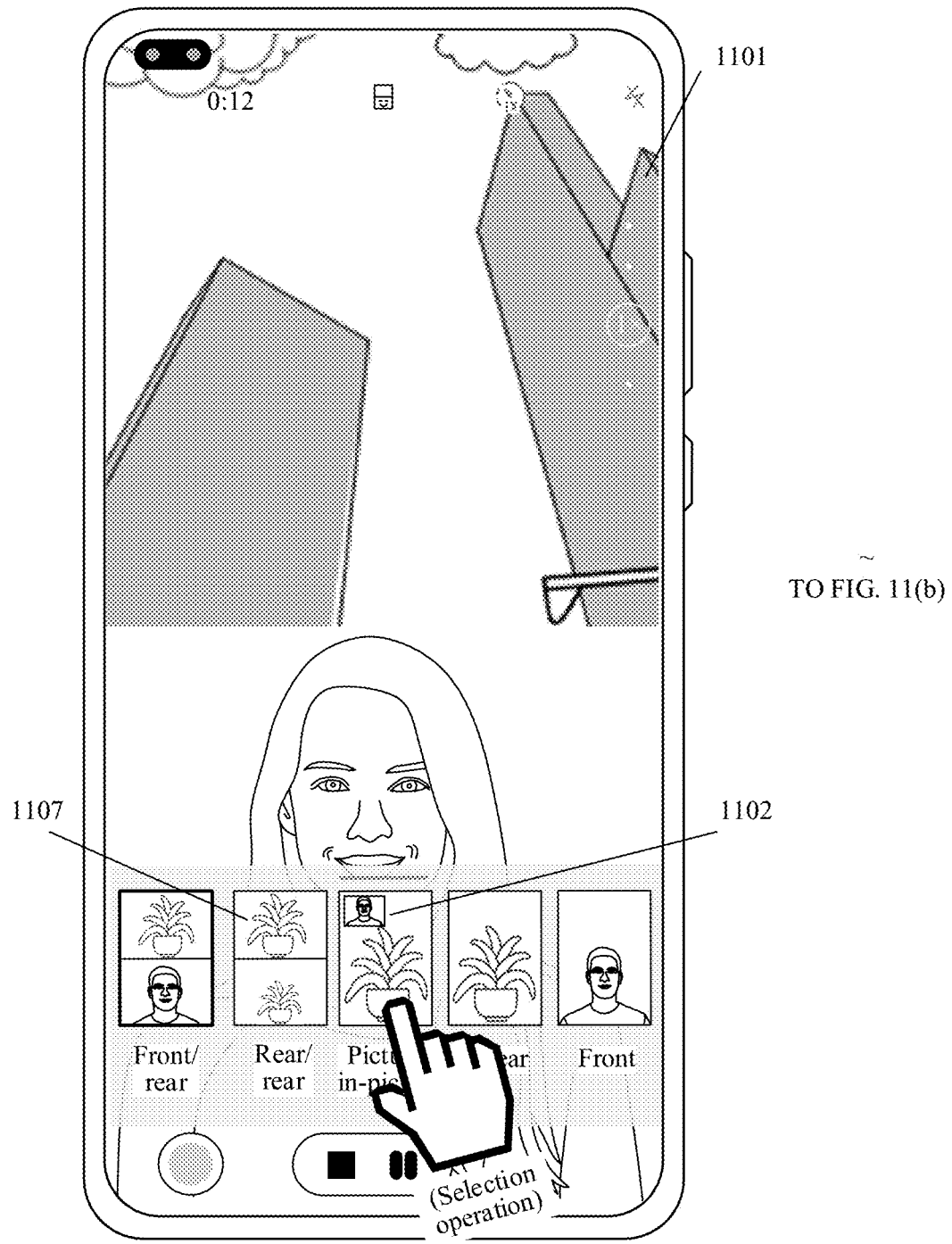
FIG. 11(a), FIG. 11(b), and FIG. 11(c) are another schematic diagram of a view-finding interface for dual-lens video recording in a portrait form according to an embodiment of this applications.
Figures 11A, 11B:
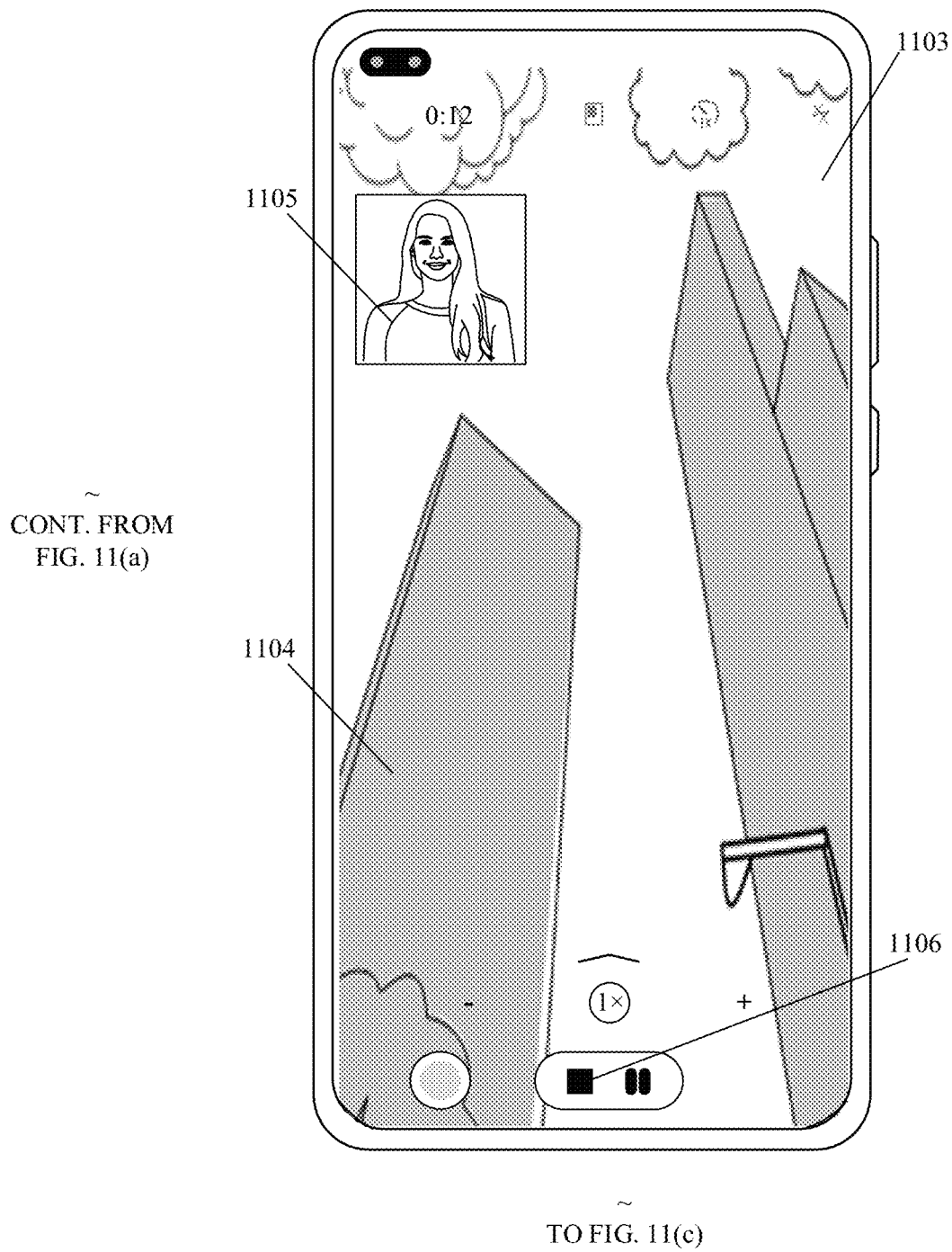

In S603, for example, the mode option a is a mode option 1102 on an interface b1101 shown in FIG. 11(a). The mode option 1102 corresponds to the picture-in-picture dual-lens mode, then the camera 3 is the rear main camera, the camera 4 is the front camera, and the layout style 2 is the picture-in-picture layout. Therefore, the mobile phone may display the interface b1103 shown in FIG. 11(b) in response to the user's click/tap operation on the mode option 1102. The interface b1103 includes a preview image c1104 acquired by the rear main camera and a preview image d1105 acquired by the front camera. The preview image c1104 and the preview image d1105 are displayed on the interface b in a picture-in-picture layout.

Figure 11C:
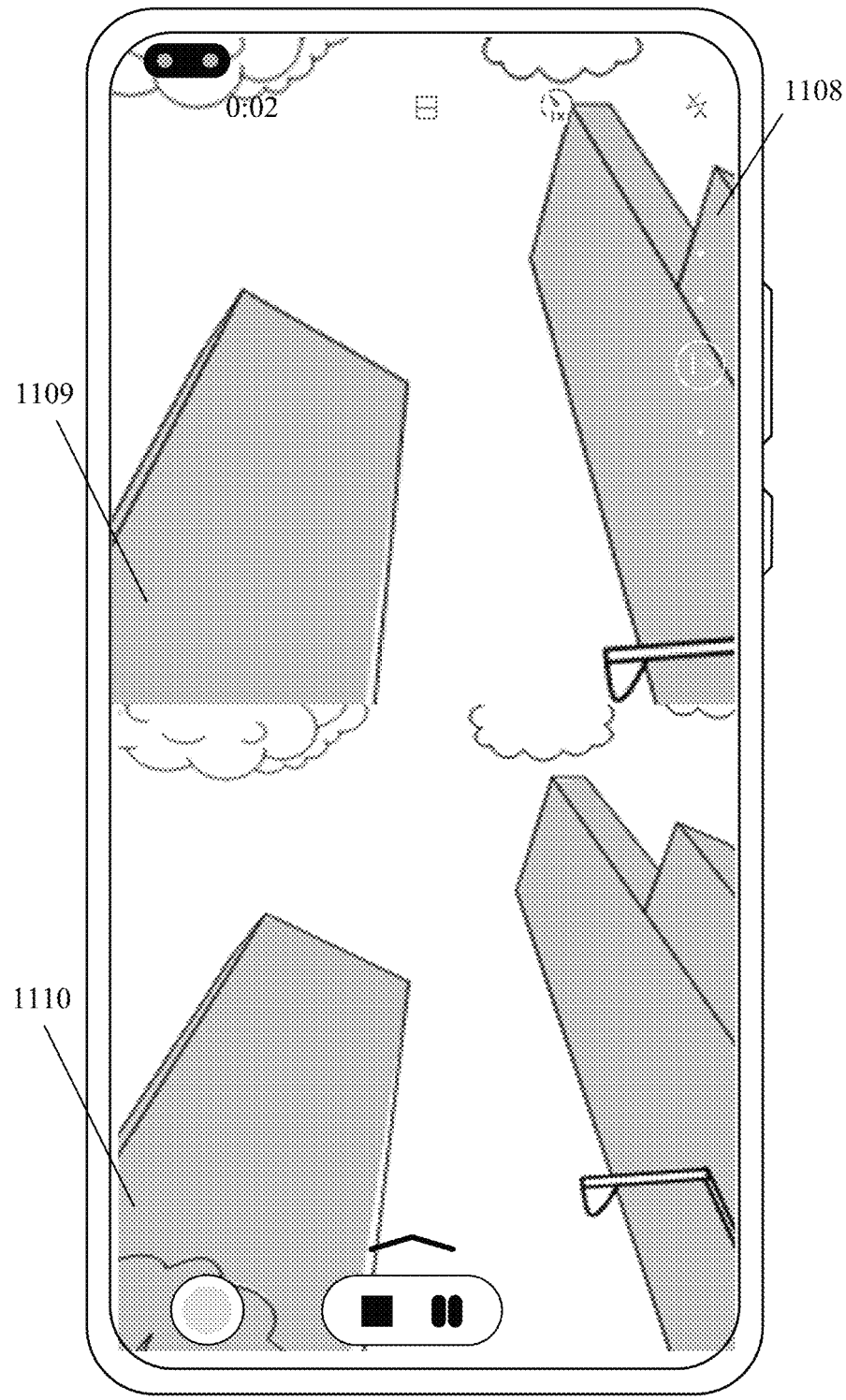

For example, the mode option a is a mode option 1107 on an interface b1101 shown in FIG. 11(a). The mode option 1107 corresponds to the rear-rear dual-lens mode, that is, the recording mode 2 is the rear-rear dual-lens mode. The rear-rear dual-lens mode uses two rear cameras (such as a rear telephoto camera and a rear wide-angle camera) as preview cameras, that is, the camera 3 and the camera 4 are two rear cameras. Moreover, a preview image c and a preview image d acquired by the two rear cameras are displayed in a split-screen layout, that is, the layout style 2 is a split-screen layout. Therefore, the mobile phone may display the interface b1108 shown in FIG. 11(c) in response to the user's click/tap operation on the mode option 1107. The interface b1108 may include a preview image c1109 acquired by the rear telephoto camera and a preview image d1110 acquired by the rear wide-angle camera. The preview image c1109 and the preview image d1110 are displayed on the interface b in a top-bottom split-screen layout. In a case that the mode option a corresponding to this example is a mode option pointing to the rear-rear dual-lens mode, the displayed interface b may be referred to as a third interface, the camera 3 may be referred to as a fourth camera, the camera 4 may be referred to as a fifth camera, the preview image c may be referred to as a fourth preview image, the preview image d may be referred to as a fifth preview image, and the layout style 2 may be referred to as a second layout. The second layout may be a split-screen layout.

It should be noted that, there is no essential difference between the interface b and the interface a, both of which are view-finding interfaces for video recording being performed. Except for the different corresponding recording modes, both the composition of the interface and the functions that can be realized are similar. For example, the mobile phone may display a plurality of mode options in response to the user's operation 1 on the interface b; and the mobile phone may turn off the display of the plurality of mode options in response to the user's operation 2 on the interface b.

In this embodiment of this application, in response to the selection operation, the mobile phone may switch the recording mode to the recording mode 2 corresponding to the mode option a, for example, switch from the front-rear dual-lens mode to the picture-in-picture dual-lens mode. In this way, the switching from one recording mode of dual-lens video recording to another recording mode of dual-lens video recording can be completed in the recording process.

S604: The mobile phone generates a video file a in response to an operation 3 by the user on the interface b. The operation 3 is used for triggering the mobile phone to end video recording. The video file a includes a video stream a, a video stream b, a video stream c, and a video stream d. The video stream a includes a plurality of frames of preview images a, the video stream b includes a plurality of frames of preview images b, the video stream c includes a plurality of frames of preview images c, and the video stream d includes a plurality of frames of preview images d.

Before S604, the mobile phone receives the user's operation 3 on the interface b. The operation 3 may be a preset gesture 4. For example, the operation 3 is a slide-upward gesture of the user of sliding upward from the bottom of the interface b. Alternatively, the interface b includes a control b, and the control b can be configured to trigger the mobile phone to end video recording. The operation 3 may be a trigger operation (such as a click/tap operation or a long press operation) on the control b.

An example in which the operation 3 is a click/tap operation by the user on the control b is used. The operation 3 may be a user's click/tap operation on a control b1106 on the interface b1103 shown in FIG. 11(*b*).

Figure 12:
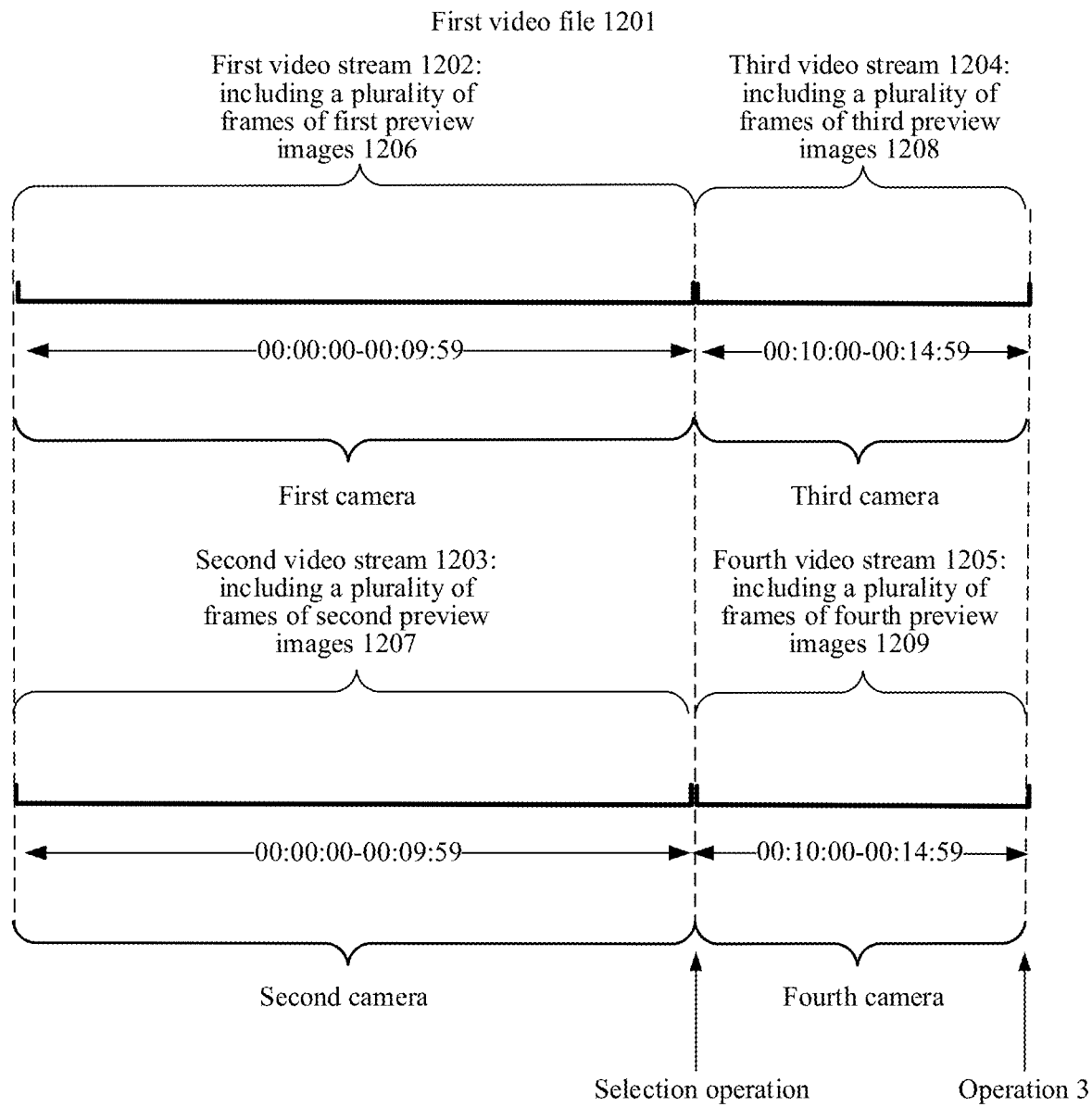
FIG. 12 is a schematic diagram of composition of a video file according to an embodiment of this application.

In S604, for example, as shown in FIG. 12, within the first 10 seconds from 00:00:00 (starting at second 0) to 00:09:59 (ending at second 9), the preview cameras are the camera 1 and the camera 2. Within the 10 seconds, the camera 1 acquires a plurality of frames of preview images a1206 and displays the preview images on the interface a, and the camera 2 acquires a plurality of frames of preview images b1207 and displays the preview images on the interface a. At 00:09:59 (or 00:10:00), the mobile phone switches the recording mode to the recording mode 2 in response to the user's selection operation, and the preview cameras of the recording mode 2 are the camera 3 and the camera 4. Subsequently, within the 5 seconds from 00:10:00 (starting at second 10) to 00:14:59 (ending at second 14), the camera 3 acquires a plurality of frames of preview images c1208 and displays the preview images on the interface b, and the camera 4 acquires a plurality of frames of preview images d1209 and displays the preview images on the interface b. At 00:14:59, the mobile phone generates a video file a1201 in response to the user's operation 3, and the video file a1201 includes a video stream a1202, a video stream b1203, a video stream c1204, and a video stream d1205. The video stream a1202 includes a plurality of frames of preview images a1206. The video stream b1203 includes a plurality of frames of preview images b1207. The video stream c1204 includes a plurality of frames of preview images c1208. The video stream d1205 includes a plurality of frames of preview images d1209.

The generated video file a includes video streams corresponding to two recording modes, that is, a spliced file of video streams obtained through recording in the two recording modes is obtained. After the video file a is generated, the mobile phone can play the video file a in response to the user's playback operation on the video file a. In the process of playing the video file a, the video stream a and the video stream b are played simultaneously first, and the playback of the dual-lens video recorded in the recording mode before switching is completed. After the video stream a and the video stream b are played, the video stream c and the video stream d are then played to complete the playback of the dual-lens video recorded in the recording mode (for example, the recording mode 2) after switching.

It should be understood that, in this specification, merely for the integrity of the solution, the recording is ended in a certain view-finding interface, and then a video file is generated. However, it is not limited that the recording mode can no longer be switched after the view-finding interface. In other words, after the interface b, the recording modes may alternatively continue to be switched.

Based on the above, by using the video capturing method provided in this embodiment of this application, in the video recording process, the mobile phone can switch the recording mode from one recording mode of dual-lens video recording to another recording mode of dual-lens video recording in response to the user's selection operation on a mode option, for example, switch from the front-rear dual-lens mode to the picture-in-picture dual-lens mode. Therefore, the flexible switching between recording modes of dual-lens video recording can be realized.

In addition, the mode option includes the effect image of the corresponding recording mode, which helps the user to prejudge the recording effect. Therefore, the recording mode can be selected more accurately.

Figure 1:
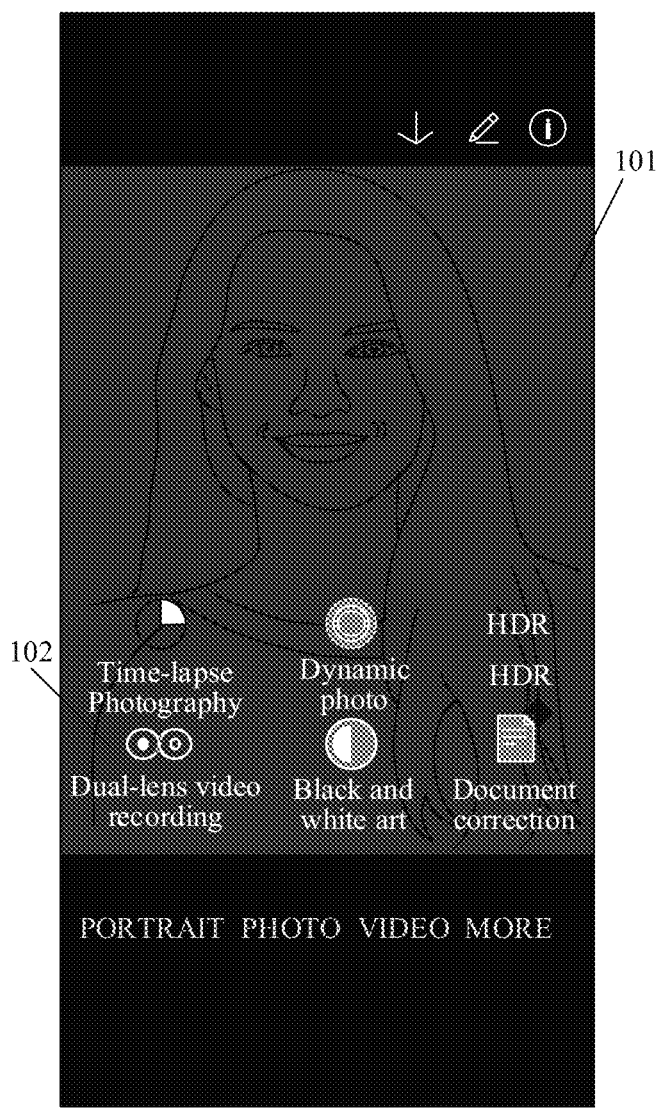
FIG. 1 is a schematic diagram of an entry interface for dual-lens video recording according to an embodiment of this application.

Further, the mobile phone can enter dual-lens video recording in response to the user's click/tap operation on the dual-lens video recording control 102 in the "MORE" function interface 101 shown in FIG. 1. In addition, this embodiment of this application further provides that entering into dual-lens video recording is triggered through a multi-lens video recording tab (tab) in the camera application.

Figure 13A:
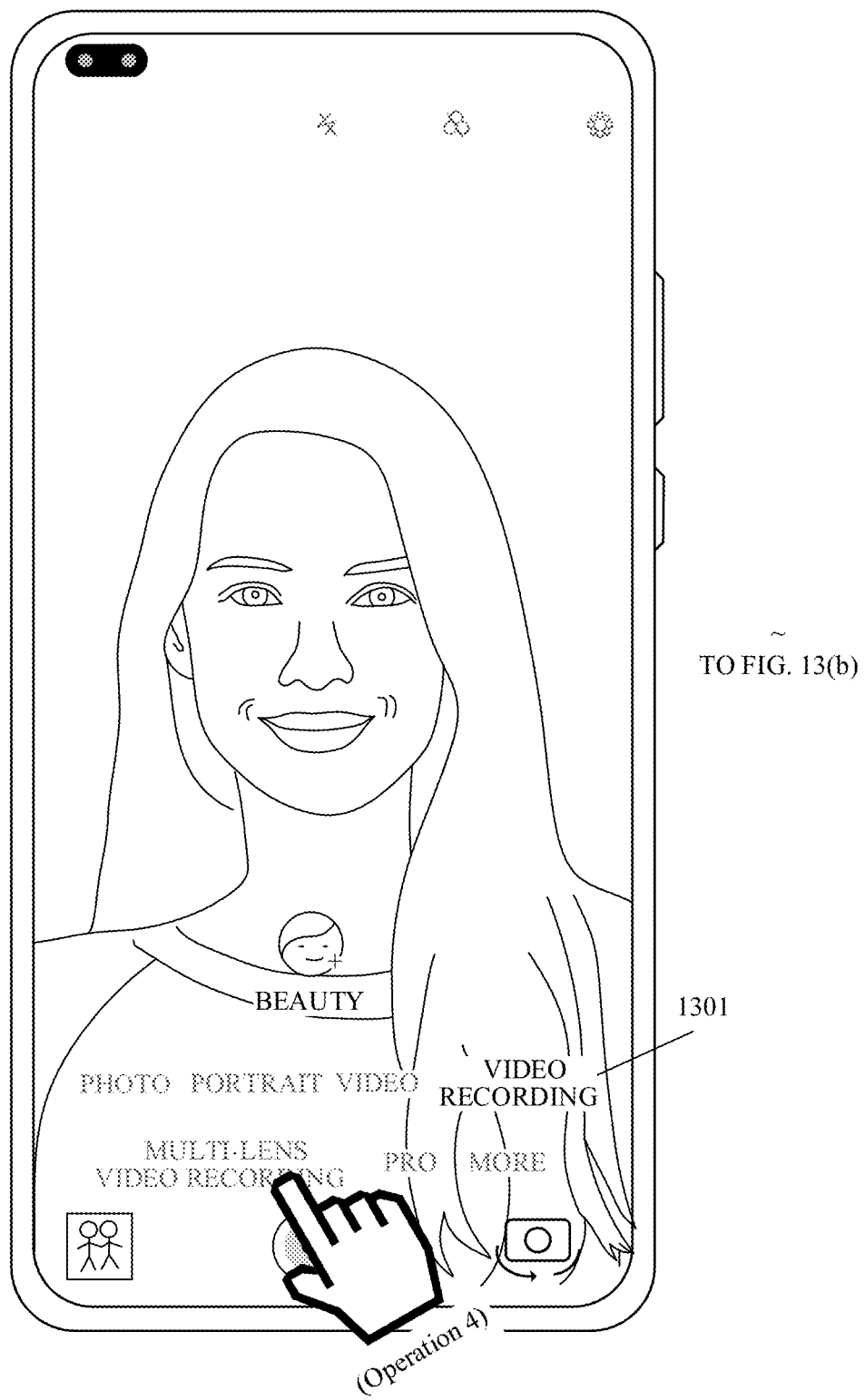
FIG. 13(a) and FIG. 13(b) are another schematic diagram of an entry interface for dual-lens video recording according to an embodiment of this application.
Figure 13B:
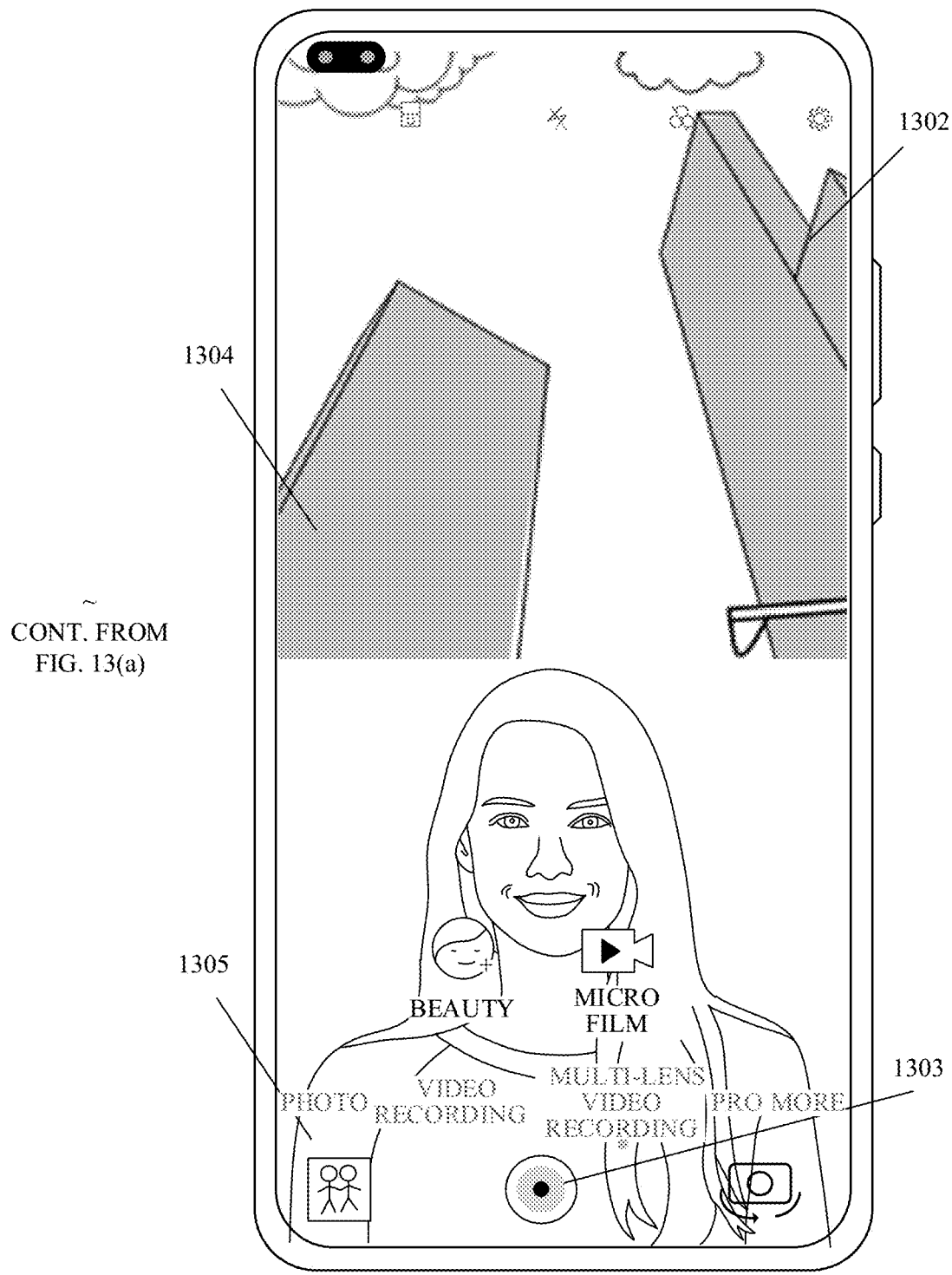

Specifically, after receiving an operation by the user for triggering starting of the camera application, the mobile phone may start the camera application and display a certain function interface in the camera application. By default, a photographing interface is displayed. In some other cases, if the camera application in the backend is started to run in the foreground, the displayed interface may be an interface displayed during exiting from the foreground to the backend last time, for example, a video recording interface shown in FIG. 13(*a*). The multi-lens video recording tab is displayed on the function interface. The mobile phone can receive the user's operation 4 on the multi-lens video recording tab. In response to the operation 4, the mobile phone can enter dual-lens video recording. The operation 4 may be a click/tap operation, a long press operation, or the like. In addition, dual-lens video recording 2 is entered, and the front-rear dual-lens mode is used for view-finding by default. In this way, dual-lens video recording can be quickly entered through an independent multi-lens video recording function module.

The function interface displayed after starting of the camera application may also be referred to as a fifth interface, and the multi-lens video recording tab may also be referred to as a first control. Moreover, dual-lens video recording is entered, and the view-finding interface of dual-lens video recording can be displayed, for example, entering the view-finding interface of the front-rear dual-lens mode, the rear-rear dual-lens mode, or the picture-in-picture dual-lens mode.

An example in which the operation 4 is a click/tap operation is used. The camera application provides a multi-lens video recording tab 1301 shown in FIG. 13(*a*). The mobile phone can receive the user's click/tap operation on the multi-lens video recording tab 1301. In response to the user's click/tap operation on the multi-lens video recording tab 1301, the mobile phone may display a view-finding interface 1302 in the front-rear dual-lens mode shown in FIG. 13(*b*). In this case, dual-lens video recording is entered.

Figure 14A:
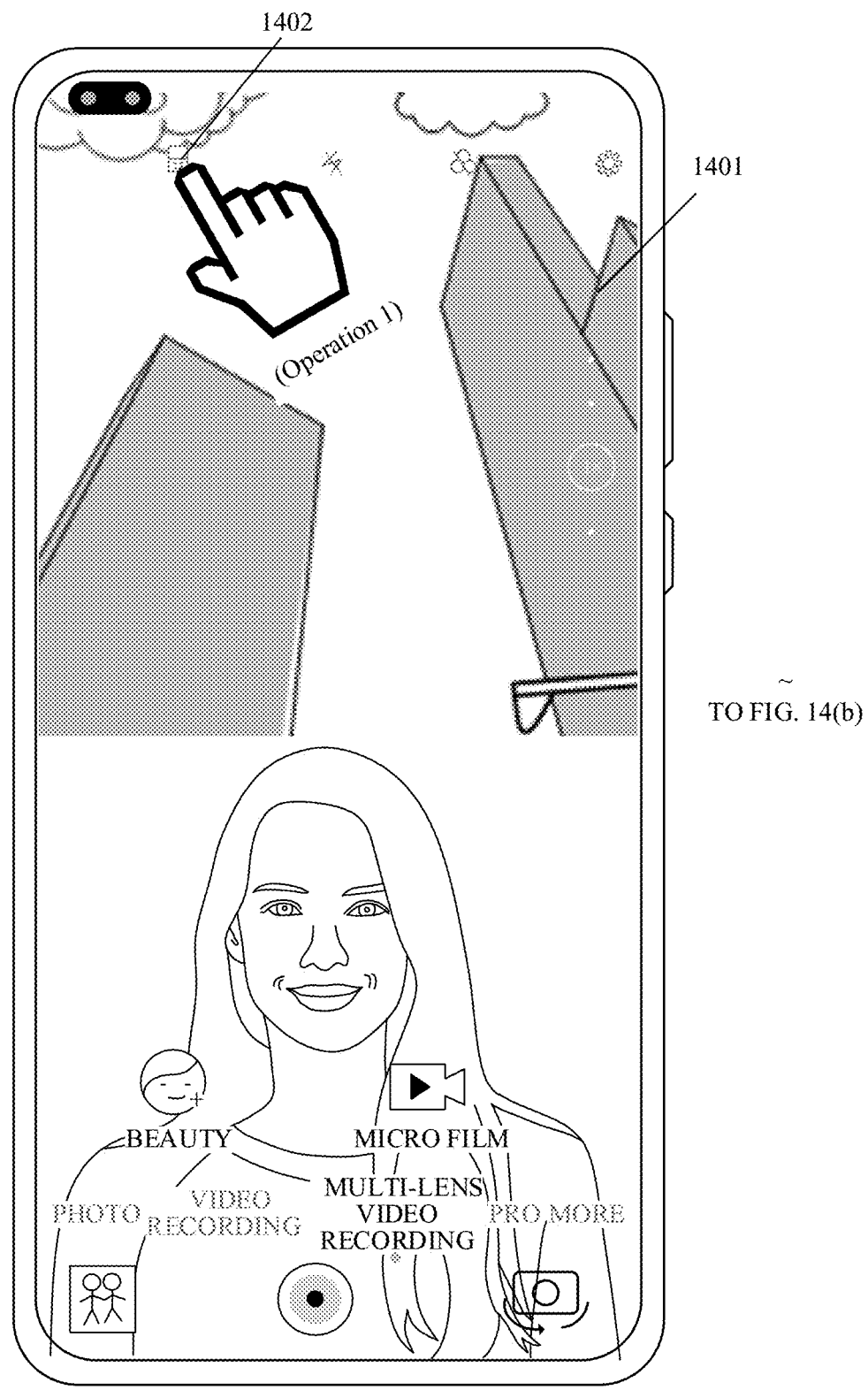
FIG. 14(a), FIG. 14(b), and FIG. 14(c) are another schematic diagram of a view-finding interface for dual-lens video recording in a portrait form according to an embodiment of this application.
Figure 14B:
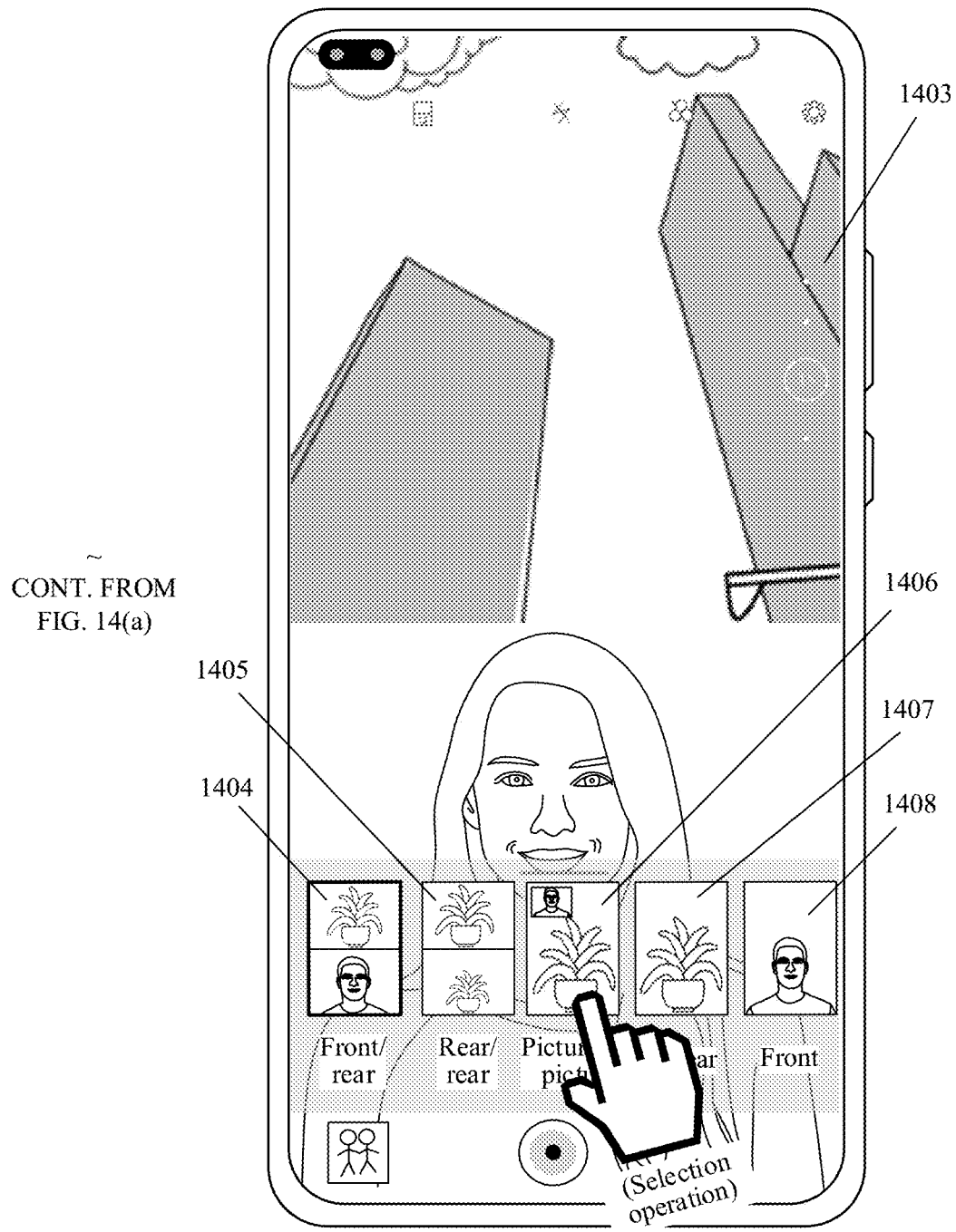

After entering dual-lens video recording, the mobile phone may also switch the recording mode for one or more times before starting the video recording, so as to switch to a satisfactory recording mode before starting the video recording. The switching process is the same as the switching process in the video recording process, and details are not described herein again. The following merely uses an example to illustrate a switching process before video recording starts:

For example, the mobile phone displays a view-finding interface 1401 of the front-rear dual-lens mode shown in FIG. 14(*a*), and the view-finding interface 1401 is the view-finding interface before video recording starts. The view-finding interface 1401 includes a control a1402. The mobile phone can receive the user's click/tap operation (that is, an operation 1) on the control a1402. In response to the user's click/tap operation on the control a1402, the mobile phone may display a view-finding interface 1403 of the front-rear dual-lens mode shown in FIG. 14(*b*). The view-finding interface 1403 includes a plurality of mode options, which are respectively: a mode option 1404, a mode option 1405, a mode option 1406, a mode option 1407, and a mode option 1408. The mobile phone may receive the user's click/tap operation (that is, a selection operation) on the mode option 1406, and the mode option 1406 corresponds to the picture-in-picture dual-lens mode. In response to the user's click/tap operation on the mode option 1406, the mobile phone may display a view-finding interface 1409 in the picture-in-picture dual-lens mode shown in FIG. 14(*c*). Similarly, the mobile phone may also receive the user's operation 1 on the view-finding interface 1409, so as to continue to switch the recording mode.

It should be noted that, when a plurality of mode options are displayed in the recording mode of dual-lens video recording, mode options of the recording modes of dual-lens video recording and mode options of the recording modes of single-lens video recording need to be displayed simultaneously. In this way, it is convenient to switch to the recording mode of single-lens video recording.

In addition, in the above example of switching the recording mode before video recording starts, although only the process of switching from the front-rear dual-lens mode to the rear-rear dual-lens mode has been described, in actual implementation, before video recording starts, one of the front-rear dual-lens modes, the rear-rear dual-lens mode, the picture-in-picture dual-lens mode, the front single-lens mode, and the rear single-lens mode can be flexibly switched to another thereof.

If the recording mode is not switched before video recording starts, video recording will start in a recording mode of dual-lens video recording (such as the default front-rear dual-lens mode) subsequently. In a case of switching the recording mode for one or more times before video recording starts, if the recording mode after the last time of switching is a recording mode of dual-lens video recording (for example, the rear-rear dual-lens mode), video recording will start in a recording mode of dual-lens video recording subsequently; and if the recording mode after the last time of switching is a recording mode of single-lens video recording, video recording will start in a recording mode of single-lens video recording subsequently.

In the following embodiments, the video capturing method in this embodiment of this application will be further described in two cases respectively: starting video recording in a recording mode of dual-lens video recording and starting video recording in a recording mode of single-lens video recording.

Corresponding to the first sub-case of Case 1, video recording starts in a recording mode of dual-lens video recording. An embodiment of this application provides a video capturing method. The method is applied to a mobile phone, and the mobile phone includes a plurality of cameras. Moreover, the phone can provide dual-lens video recording function. In this embodiment, a description is provided mainly based on switching the recording mode only once in the recording process, for example, switching from the recording mode 1 to the recording mode 2. Specifically, as shown in FIG. 15, before S601, the method further includes S1501, and S601 further includes S1502:

S1501: The mobile phone displays an interface c, where the interface c is a view-finding interface before video recording starts. The interface c includes a preview image acquired by a camera 1 and a preview image acquired by a camera 2. The preview image acquired by the camera 1 and the preview image acquired by the camera 2 are displayed in a layout style 1.

For example, the recording mode 1 is the front-rear dual-lens mode, then the camera 1 may be a rear main camera, the camera 2 may be a front camera, and the layout style 1 is a top-bottom layout. The interface c may be a view-finding interface 1302 shown in FIG. 13(*b*). The view-finding interface 1302 includes a preview image 1304 acquired by the rear main camera and a preview image 1305 acquired by the front camera. In addition, the preview image 1304 and the preview image 1305 are displayed in a top-bottom layout.

The interface c is a view-finding interface that triggers the start of video recording. In this embodiment, the recording mode is switched only once in the recording process, and the video is recorded in the recording mode 1 when the video recording starts, that is, the video recording starts in the recording mode 1. In other words, the interface c is a view-finding interface for view-finding in the recording mode 1.

S1502: The mobile phone displays the interface a in response to an operation 5 by the user on the interface c. The operation 5 is used for triggering the mobile phone to start video recording. The interface a is a view-finding interface for video recording being performed, and the interface a includes a preview image a acquired by a camera 1 and a preview image b acquired by a camera 2. The preview image a and the preview image b are displayed in a layout style 1.

Before S1502, the mobile phone may receive the user's operation 5 on the interface c. The operation 5 may be a preset gesture 5 on the interface c. For example, the preset gesture 5 is a sliding gesture from right to left on the view-finding interface 1302 shown in FIG. 13(*b*). Alternatively, the interface c includes a control c, and the control c is configured to trigger the mobile phone to start video recording. The operation 5 is a trigger operation on the control c, for example, a click/tap operation or a long press operation.

An example in which the operation 5 is a click/tap operation on the control c is used. Then the operation 5 may be the user's click/tap operation on a control c1303 on the view-finding interface 1302 shown in FIG. 13(*b*).

Based on the above, by using the video capturing method in this embodiment of this application, in a complete recording process, the recording mode is switched once, so that a video file formed by video streams obtained through recording in two recording modes can be obtained.

Corresponding to the first sub-case of Case 1, video recording starts in a recording mode of dual-lens video recording. An embodiment of this application provides a video capturing method. The method is applied to a mobile phone, and the mobile phone includes a plurality of cameras. Moreover, the phone can provide dual-lens video recording function. In this embodiment, a description is provided mainly based on switching the recording mode only twice in the recording process, for example, switching from the recording mode 3 to the recording mode 1, and then switching from the recording mode 1 to the recording mode 2. Specifically, as shown in FIG. 16A and FIG. 16B, before S601, the method further includes S1601 to S1603, S601 further includes S1604, and S604 further includes S1605:

S1601: The mobile phone displays an interface d, where the interface d is a view-finding interface before video recording starts. The interface d includes a preview image acquired by a camera 5 and a preview image acquired by a camera 6. The preview image acquired by the camera 5 and the preview image acquired by the camera 6 are displayed in a layout style 3.

The interface d is similar to the interface c above, both of which are view-finding interfaces before video recording starts. The only difference is that the interface d is the view-finding interface corresponding to the recording mode 3, and the interface c is the view-finding interface corresponding to the recording mode 1.

For example, the recording mode 3 is the rear-rear dual-lens mode, then the camera 5 may be a rear wide-angle camera, the camera 6 may be a rear telephoto camera, and the layout style 3 is a top-bottom layout. The interface d may be a view-finding interface 1409 shown in FIG. 14(c). The view-finding interface 1409 includes a preview image 1410 acquired by the rear wide-angle camera and a preview image 1411 acquired by the rear telephoto camera, and the preview image 1410 and the preview image 1411 are displayed in a top-bottom layout.

The camera 5 (or camera 6) may be a camera the same as the camera 1, the camera 2, the camera 3, or the camera 4, or may be a camera different from any one of the camera 1, the camera 2, the camera 3, and the camera 4.

S1602: The mobile phone displays an interface e in response to an operation 5 by the user on the interface d. The operation 5 is used for triggering the mobile phone to start video recording. The interface e is a view-finding interface for video recording being performed, and the interface e includes a preview image e acquired by the camera 5 and a preview image f acquired by the camera 6. The preview image e and the preview image f are displayed in a layout style 3.

For operation 5, reference may be made to the description of S1502 above, and details are not described herein again.

The recording modes adopted by the interface e and the interface d are the same, both of which are the recording mode 3. The difference from the interface d is that the interface e is a view-finding interface for a video being performed, and the interface d is a view-finding interface before video recording starts.

Figure 14C:
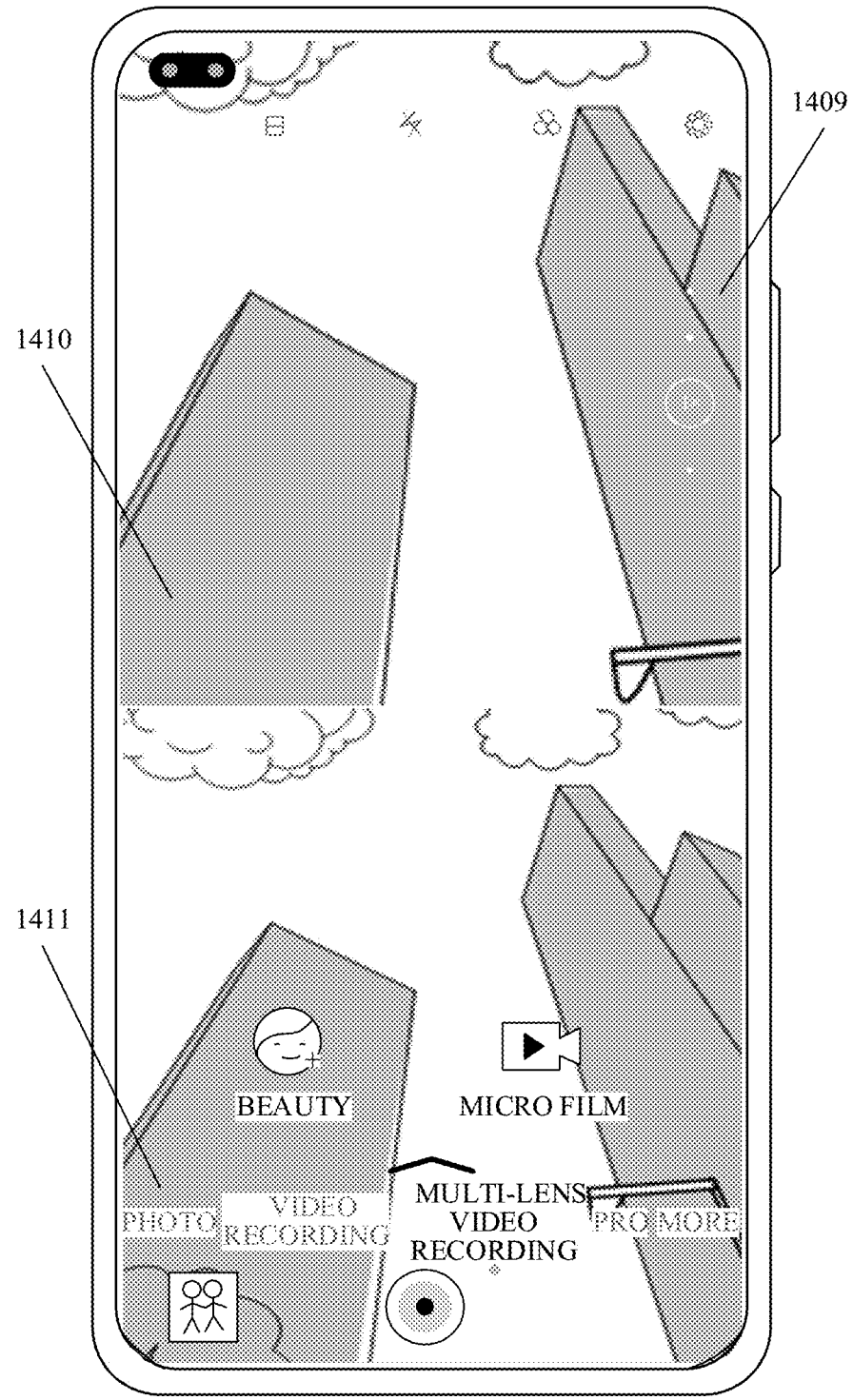
Figure 17:
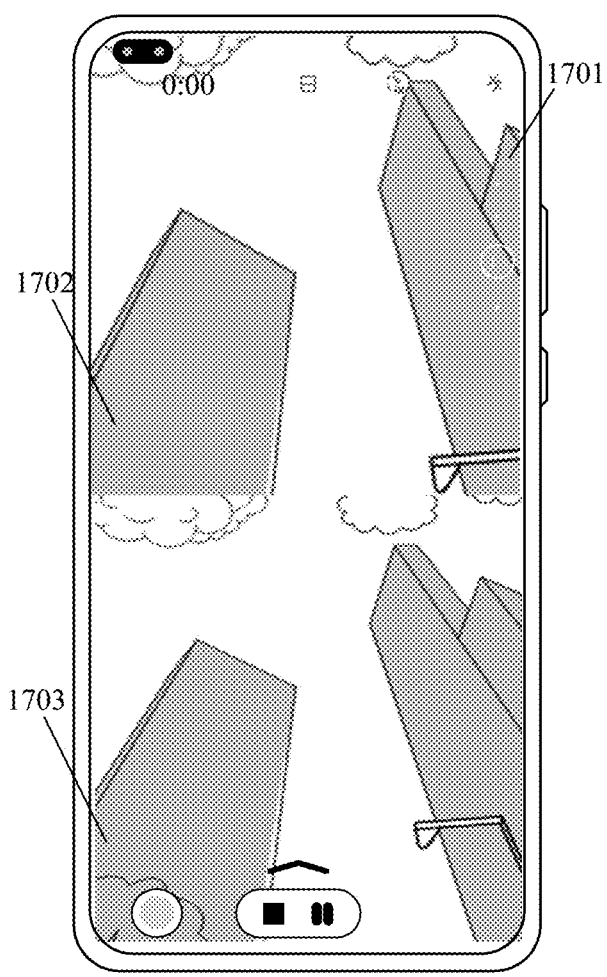
FIG. 17 is another schematic diagram of a view-finding interface for dual-lens video recording in a portrait form according to an embodiment of this application.

For example, the interface d is the view-finding interface 1409 shown in FIG. 14(c), and the interface e may be an interface e 1701 shown in FIG. 17. The interface e includes a preview image e 1702 acquired by the camera 5 (for example, a rear wide-angle camera) and a preview image f 1703 acquired by the camera 6 (for example, a rear telephoto camera). In addition, the preview image e 1702 and the preview image f 1703 are displayed in a top-bottom layout.

S1603: The mobile phone displays a plurality of mode options on the interface e in response to an operation 1 by the user on the interface e. The operation 1 is used for triggering the mobile phone to switch a recording mode; each mode option corresponds to one video recording mode; and each mode option includes an effect image corresponding to the recording mode.

Figure 18:
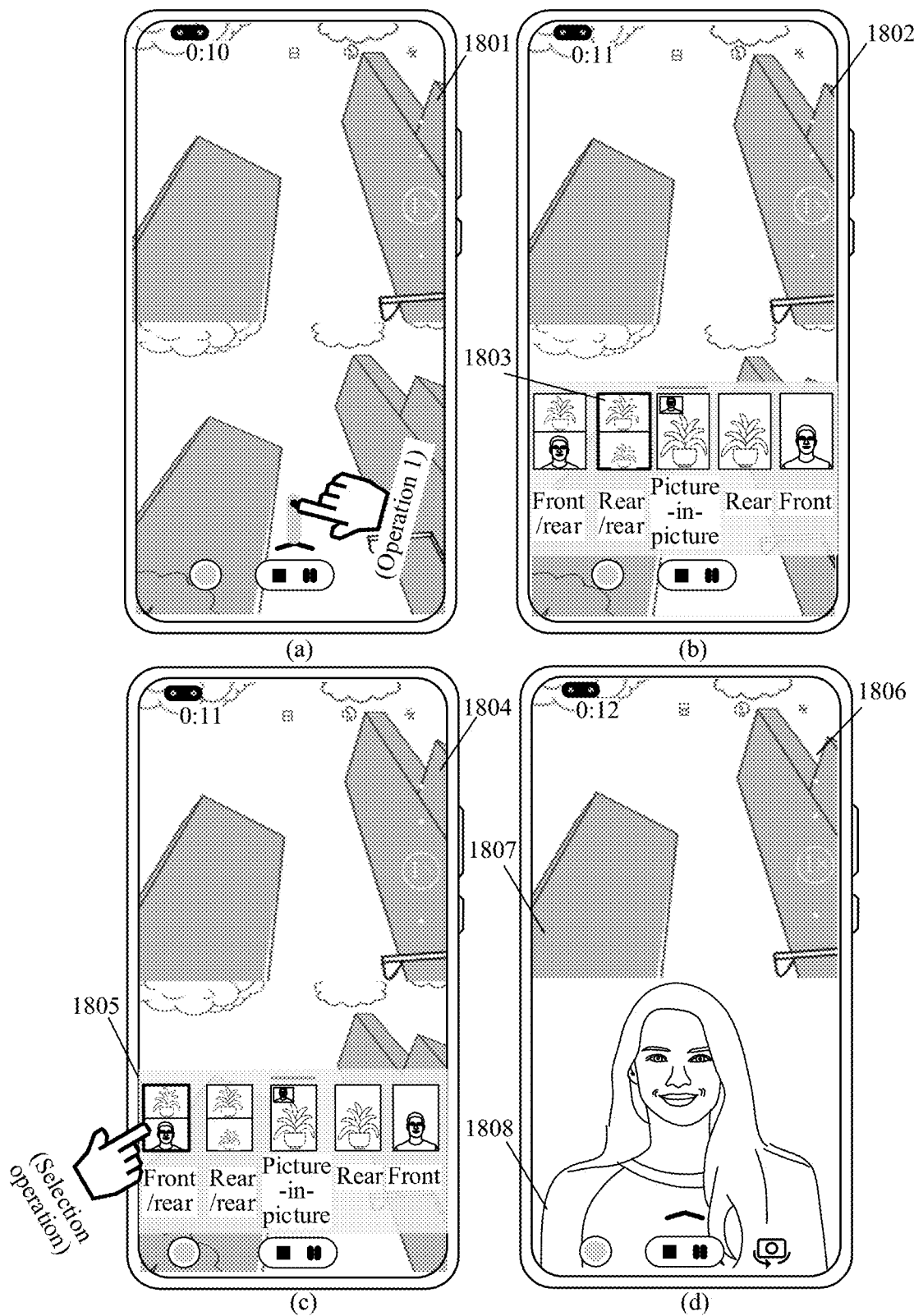
FIG. 18 is another schematic diagram of a view-finding interface for dual-lens video recording in a portrait form according to an embodiment of this application.

For example, an example in which the recording mode 3 is the rear-rear dual-lens mode, and the operation 1 is the user's sliding gesture from bottom to top on interface e. The mobile phone may receive the user's sliding gesture from bottom to top on the interface e 1801 shown in (a) of FIG. 18. In response to the sliding gesture, the mobile phone displays an interface e 1802 shown in (b) of FIG. 18, and the interface e 1802 includes a plurality of mode options. The mode option 1803 in the plurality of mode options that corresponds to the recording mode 3 is highlighted.

S1604: The mobile phone displays an interface a in response to a selection operation by the user on a mode option b. The mode option b is one of the plurality of mode options, and the mode option b corresponds to a recording mode 1. The recording mode 1 is a recording mode in which a camera 1 and a camera 2 are used as preview cameras, and a preview image acquired by the camera 1 and a preview image acquired by the camera 2 are displayed in a layout style 1. The interface a is a view-finding interface for video recording being performed, and the interface a includes a preview image a acquired by a camera 1 and a preview image b acquired by a camera 2. The preview image a and the preview image b are displayed on the interface a in a layout style 1.

For example, an example in which the recording mode 1 is the front-rear dual-lens mode is used, then the camera 1 may be a rear main camera, the camera 2 may be a front camera, and the layout style 1 is a top-bottom layout. An example in which the selection operation is a click/tap operation on mode option b is used. The mobile phone can receive the user's click/tap operation on the mode option 1805 on the interface e 1804 shown in (c) of FIG. 18, that is, the mode option b is the mode option 1805. In response to the click/tap operation, the mobile phone may display an interface a1806 shown in (d) of FIG. 18. The interface a1806 includes a preview image a1807 acquired by the rear main camera and a preview image b1808 acquired by the front camera, and the preview image a1807 and the preview image b1808 are displayed in a top-bottom layout.

For the detailed switching process from the recording mode 3 to the recording mode 1 corresponding to the S1603 and S1604 above, reference may be made to the switching process from the recording mode 1 to the recording mode 2 in S602 and S603 above, and details are not described herein again.

In addition, it should be noted that adjacent recording modes before and after switching are different, but non-adjacent recording modes may be the same or different. In this way, different switching requirements can be flexibly met. For example, the recording mode 3 is different from the recording mode 1, but the recording mode 3 may be the same as or different from the recording mode 2.

S1605: The mobile phone generates a video file a in response to an operation 3 by the user on the interface b. The operation 3 is used for triggering the mobile phone to end video recording. The video file a includes a video stream a, a video stream b, a video stream c, a video stream d, a video stream e, and a video stream f. The video stream a includes a plurality of frames of preview images a, the video stream b includes a plurality of frames of preview images b, the video stream c includes a plurality of frames of preview images c, the video stream d includes a plurality of frames of preview images d, the video stream e includes a plurality of frames of preview images e, and the video stream f includes a plurality of frames of preview images f.

Figure 19:
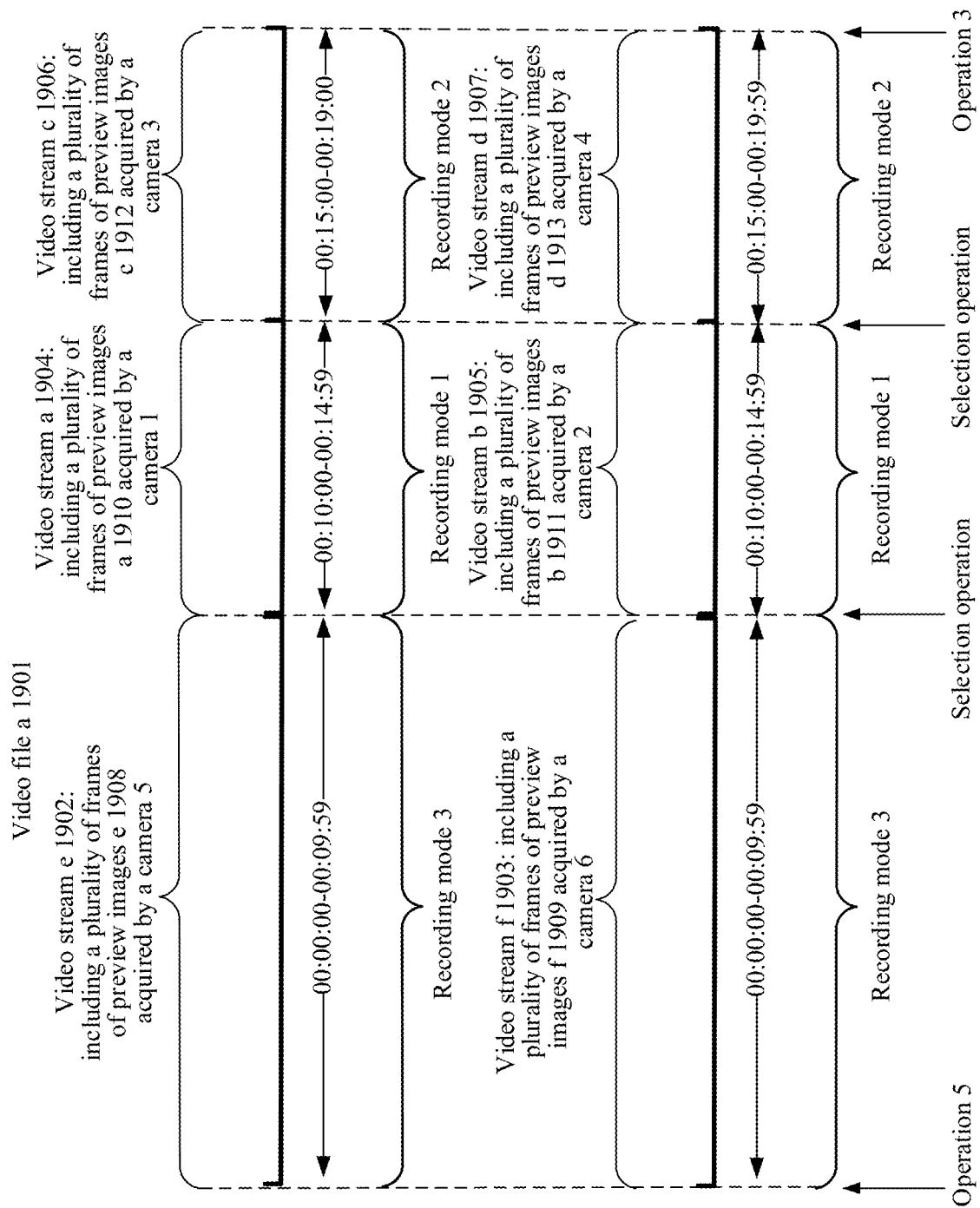
FIG. 19 is another schematic diagram of composition of a video file according to an embodiment of this application.

For example, as shown in FIG. 19, the mobile phone may trigger the start of video recording in response to the user's operation 5 on the interface d, and in this case, timing of the recording starts. Within the first 10 seconds from 00:00:00 (starting at second 0) to 00:09:59 (ending at second 9), the recording mode 3 is used for video recording, and the preview cameras are the camera 5 and the camera 6. Within the 10 seconds, the camera 5 acquires a plurality of frames of preview images e 1908 and displays the preview images on the interface e, and the camera 6 acquires a plurality of frames of preview images f 1909 and displays the preview images on the interface e. At 00:09:59 (or 00:10:00), the mobile phone switches the recording mode to the recording mode 1 in response to the user's selection operation, and the preview cameras of the recording mode 1 are the camera 1 and the camera 2. Subsequently, within the 5 seconds from 00:10:00 (starting at second 10) to 00:14:59 (ending at second 14), the camera 1 acquires a plurality of frames of preview images a1910 and displays the preview images on the interface a, and the camera 2 acquires a plurality of frames of preview images b1911 and displays the preview images on the interface a. At 00:14:59 (or 00:15:00), the mobile phone switches the recording mode to the recording mode 2 in response to the user's selection operation, and the preview cameras of the recording mode 2 are the camera 3 and the camera 4. Subsequently, within the 5 seconds from 00:15:00 (starting at second 15) to 00:19:59 (ending at second 19), the camera 3 acquires a plurality of frames of preview images c1912 and displays the preview images on the interface b, and the camera 4 acquires a plurality of frames of preview images d1913 and displays the preview images on the interface b. Finally, at 00:19:59, the mobile phone generates a video file a1901 in response to the user's operation 3, and the video file a1901 includes a video stream e 1902, a video stream f 1903, a video stream a1904, a video stream b1905, a video stream c1906, and a video stream d 1907. The video stream e 1902 includes a plurality of frames of preview images e 1908. The video stream f 1903 includes a plurality of frames of preview images f 1909. The video stream a1904 includes a plurality of frames of preview images a1910. The video stream b1905 includes a plurality of frames of preview images b1911. The video stream c1906 includes a plurality of frames of preview images c1912. The video stream d1907 includes a plurality of frames of preview images d1913.

The generated video file a includes video streams corresponding to the three recording modes, that is, a spliced file of the video streams obtained through recording in the three recording modes is obtained.

Based on the above, by using the video capturing method in this embodiment of this application, in a complete recording process, the recording mode 3 of dual-lens video recording may be first switched to the recording mode 1, and then the recording mode 1 is switched to the recording mode 2. Finally, a video file formed by video streams obtained through recording in three recording modes can be obtained.

Corresponding to the second sub-case of Case 1, video recording starts in a recording mode of single-lens video recording. An embodiment of this application provides a video capturing method. The method is applied to a mobile phone, and the mobile phone includes a plurality of cameras. Moreover, the phone can provide dual-lens video recording function. In this embodiment, a description is provided mainly based on switching the recording mode only twice in the recording process, for example, switching from the recording mode 4 to the recording mode 1, and then switching from the recording mode 1 to the recording mode 2. Specifically, as shown in FIG. 20, before S601, the method further includes S2001 to S2003, S601 further includes S2004, and S604 further includes S2005:

S2001: The mobile phone displays an interface f, where the interface f is a view-finding interface before video recording starts. The interface f includes a preview image acquired by a camera 7. The preview image acquired by the camera 7 is displayed in a layout style 4.

The interface f corresponds to the view-finding interface of the recording mode 4. In this embodiment, the recording mode 4 adopted when the video recording starts is a recording mode of single-lens video recording, and there is only one preview camera of the recording mode 4, that is, the camera 7. The layout style of the recording mode 4 is a full screen layout, and layout style 4 is a full screen layout.

Figure 21A:
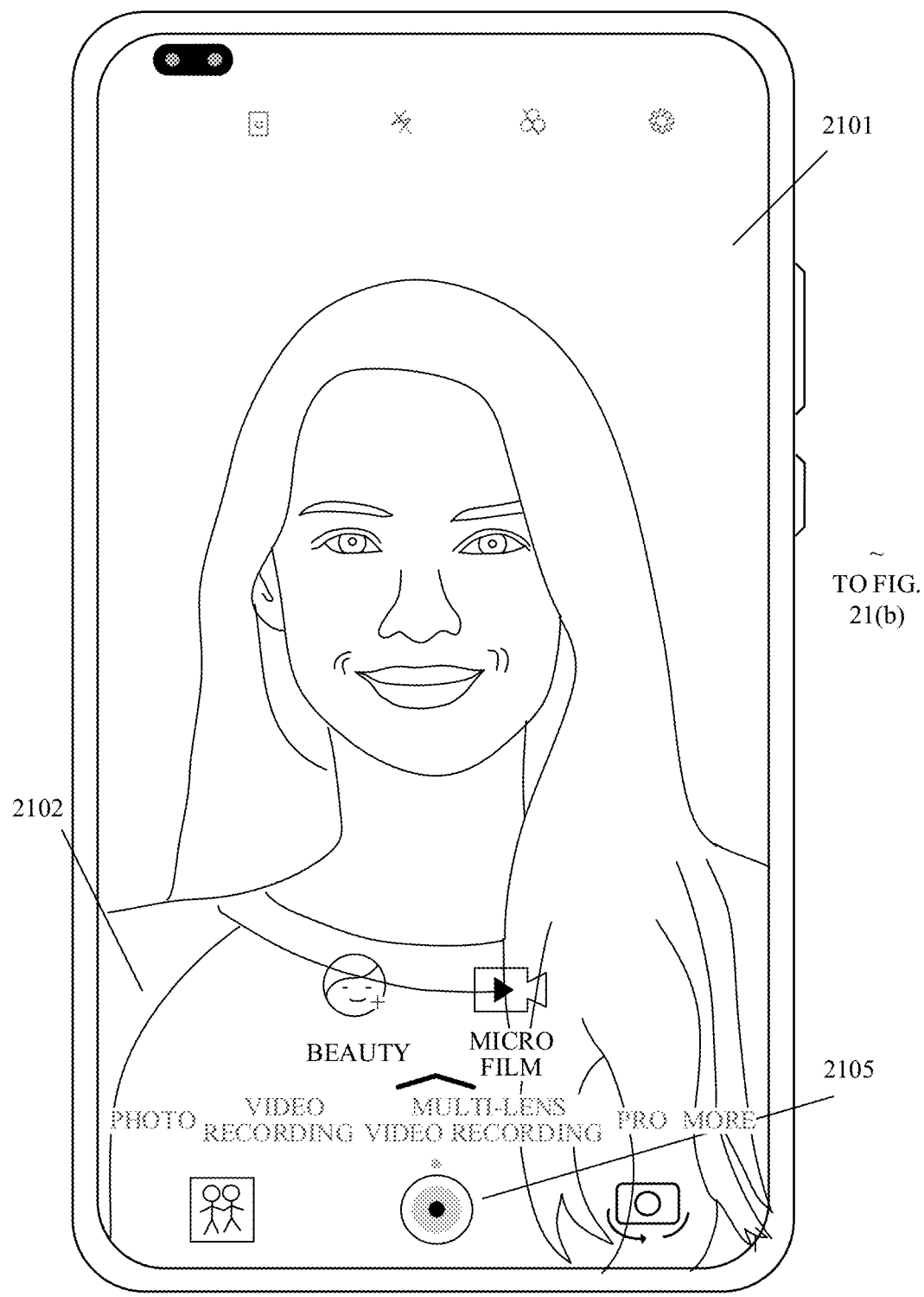
FIG. 21(a) and FIG. 21(b) are another schematic diagram of a view-finding interface for dual-lens video recording in a portrait form according to an embodiment of this application.
Figure 21B:
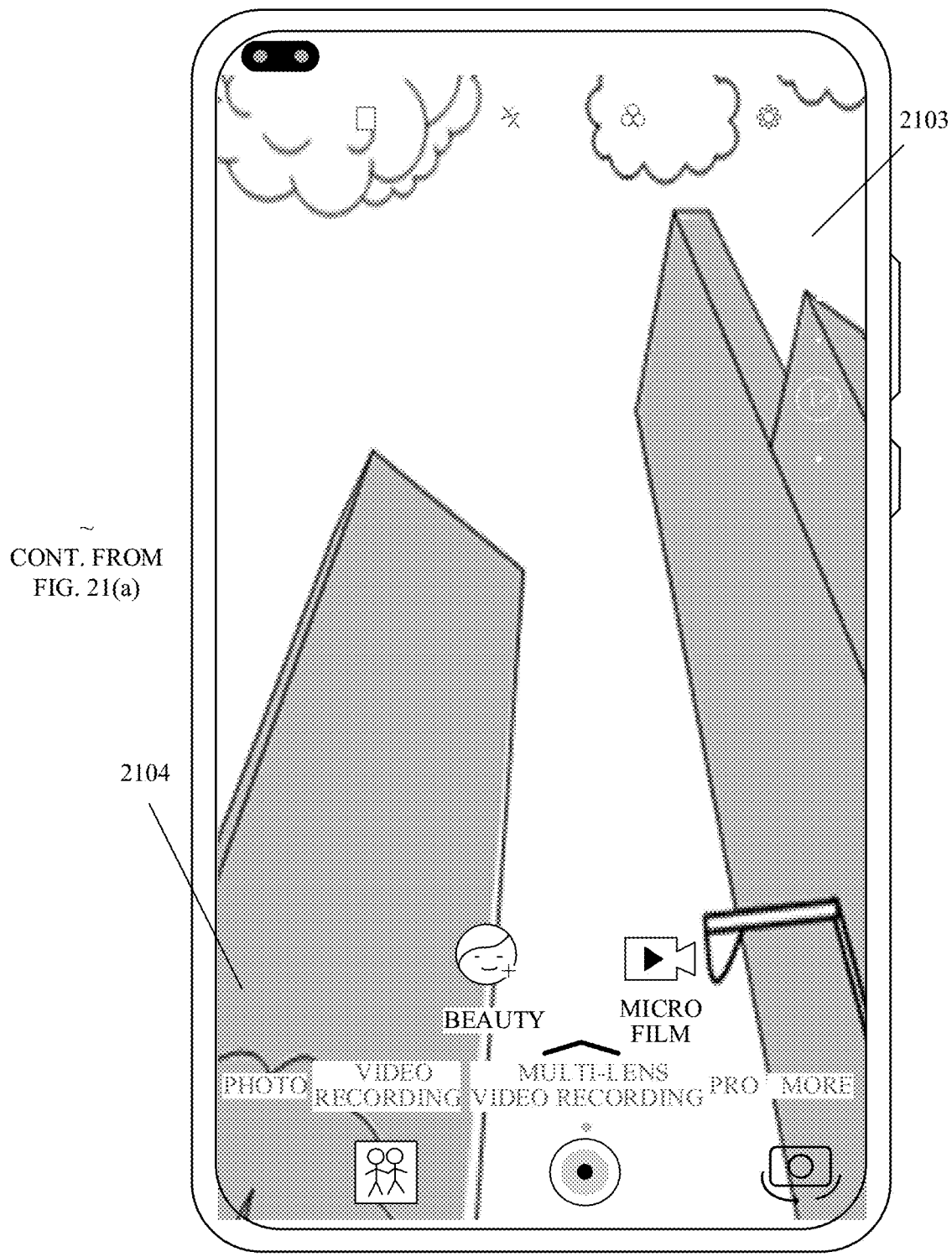

For example, if the recording mode 4 is a front single-lens mode, the camera 7 may be a front camera. The interface f may be the interface f 2101 shown in FIG. 21(*a*). The interface f 2101 includes a preview image 2102 acquired by the front camera.

In another example, if the recording mode 4 is a rear single-lens mode, the camera 7 may be a rear main camera. The interface f may be an interface f 2103 shown in FIG. 21(*b*). The interface f 2103 includes a preview image 2104 acquired by the rear main camera.

S2002: The mobile phone displays an interface g in response to an operation 5 by the user on the interface f. The operation 5 is used for triggering the mobile phone to start video recording. The interface g is a view-finding interface for video recording being performed, and the interface g includes a preview image g acquired by the camera 7. The preview image g is displayed in a layout style 4.

The interface g may also be referred to as a first interface, the camera 7 may also be referred to as a first camera, the preview image g may also be referred to as a first preview image, and the layout style 4 is a full screen layout. In other words, the interface g is a view-finding interface for single-lens video recording.

For the operation 5, reference may be made to the relevant description of S1502 above.

For example, an example in which the operation 5 is a click/tap operation on the control c on the interface f is used. The mobile phone may display the interface g 2201 shown in (a) of FIG. 22 in response to the user's click/tap operation on the control c2105 on the interface f 2101 shown in FIG. 21(*a*). The interface g 2201 is a view-finding interface for video recording being performed, and the interface g 2201 includes a preview image g 2202 acquired by the camera 7 (for example, a front camera).

S2003: The mobile phone displays a plurality of mode options on the interface g in response to an operation 1 by the user on the interface g. The operation 1 is used for triggering the mobile phone to switch a recording mode; each mode option corresponds to one video recording mode; and each mode option includes an effect image corresponding to the recording mode.

In some embodiments, in a case that the layout currently adopted by the mobile phone is a full screen layout, that is, in a recording mode of single-lens video recording, the view-finding interface further includes a control d. The control d is configured to trigger the mobile phone to switch between the front and rear cameras. For example, the view-finding interface (for example, the interface g) of single-lens video recording includes a control d, and the control d is configured to trigger the mobile phone to switch between the front camera and the rear camera. The mobile phone can receive the user's operation 6 on the control d. The operation 6 may be a click/tap operation, a long press operation, or the like. In a case that the recording mode of single-lens video recording is the front single-lens mode, the mobile phone can switch the front camera to the rear camera in response to the user's trigger operation on the control d. In this way, the front single-lens mode of single-lens video recording is switched to the rear single-lens mode. Alternatively, in a case that the recording mode of single-lens video recording is the rear single-lens mode, the mobile phone can switch the rear camera to the front camera in response to the user's trigger operation on the control d. In this way, the rear single-lens mode of single-lens video recording is switched to the front single-lens mode. In this way, switching between the recording modes of single-lens video recording can be realized conveniently. It should be understood that, in this embodiment of this application, the switching between the recording modes of single-lens video recording can all be realized through the control d on the view-finding interface. The control d may also be referred to as a fourth control.

Figure 22:
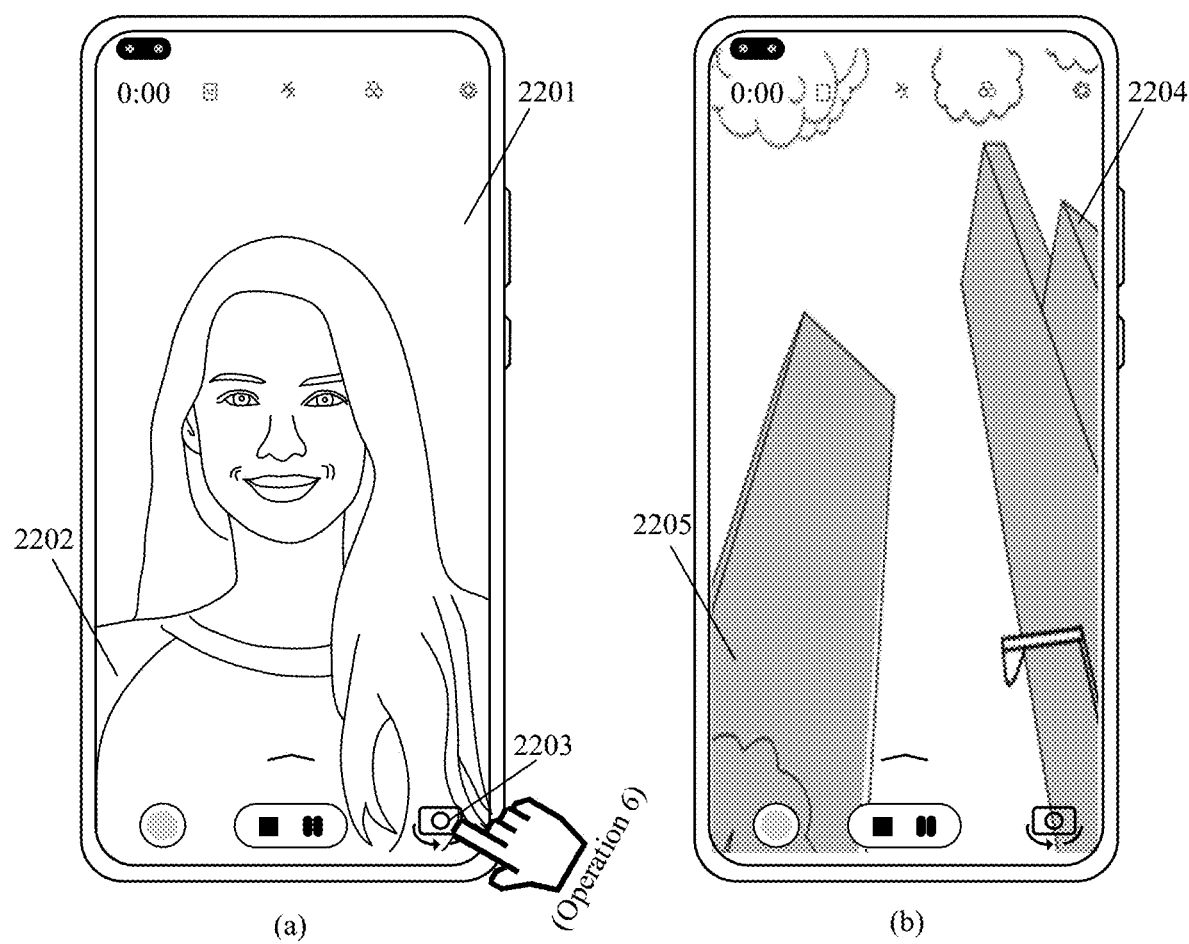
FIG. 22 is another schematic diagram of a view-finding interface for dual-lens video recording in a portrait form according to an embodiment of this application.

For example, the interface g is used as an example. The interface g 2201 shown in (a) of FIG. 22 is a view-finding interface in the front single-lens mode, and the interface g 2201 includes a control d2203. The control d2203 can be configured to trigger the mobile phone to switch between the front camera and the rear camera. The mobile phone can receive the user's operation 6 on the control d2203. In response to the operation 6, the mobile phone can display an interface h2204 shown in (b) of FIG. 22. The interface h2204 is a view-finding interface in the rear single-lens mode. Therefore, the switching from the front single-lens mode to the rear single-lens mode is completed.

In some embodiments, in a case that the view-finding interface of the single-lens video recording includes the control d, the plurality of mode options displayed by the mobile phone in response to the user's operation 1 on the view-finding interface of the single-lens video recording only include the mode options for the recording modes of the dual-lens video recording, and do not include mode options for the recording modes of single-lens video recording. In this way, based on that switching between the recording modes of single-lens video recording can be ensured, the quantity of mode options can be reduced and the interface elements can be simplified.

Figure 23:
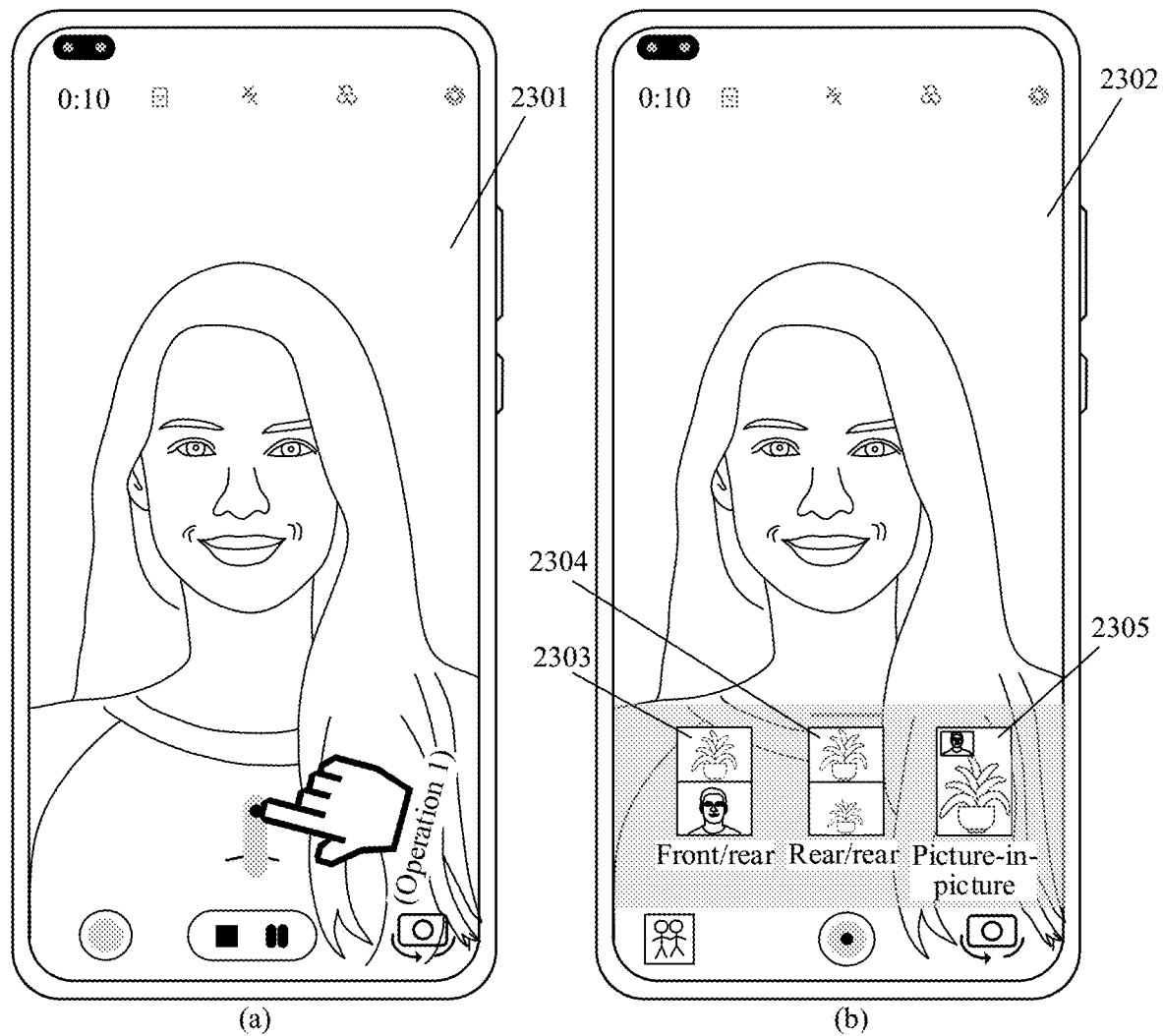
FIG. 23 is another schematic diagram of a view-finding interface for dual-lens video recording in a portrait form according to an embodiment of this application.

For example, the interface g is still used as an example, and the operation 1 is a user's sliding gesture from bottom to top on the interface g. The mobile phone may display the interface g 2302 shown in (b) of FIG. 23 in response to the user's operation 1 on the interface g 2301 shown in (a) of FIG. 23. The interface g 2302 includes three mode options, which are respectively: a mode option 2303, a mode option 2304, and a mode option 2305. The mode option 2303 corresponds to the front-rear dual-lens mode, the mode option 2304 corresponds to the rear-rear dual-lens mode, and the mode option 2305 corresponds to the picture-in-picture dual-lens mode. Obviously, these three mode options are all mode options for the recording modes of dual-lens video recording.

In some other embodiments, even if the view-finding interface of the single-lens video recording includes the control d, the plurality of mode options displayed by the mobile phone in response to the user's operation 1 on the view-finding interface of the single-lens video recording include the mode options for the recording modes of the dual-lens video recording, and do not include mode options for the recording modes of single-lens video recording. In this way, when a plurality of mode options are called out, any mode may be selected from the plurality of mode options for switching. At the same time, the control d is hidden when the plurality of mode options are displayed, thereby avoiding duplication of functions of elements on the interface.

In some embodiments, in a case that the view-finding interface (such as the interface g) of single-lens video recording is currently displayed, there is no need to turn off the dual-lens video recording, so that the plurality of mode options do not include the option to turn off the dual lens. For example, the plurality of mode options displayed on the interface g 2302 shown in (b) of FIG. 23 do not include the option to turn off the dual lens.

S2004: The mobile phone displays an interface a in response to a selection operation by the user on a mode option b. The mode option b is one of the plurality of mode options, and the mode option b corresponds to a recording mode 1. The recording mode 1 is a recording mode in which a camera 1 and a camera 2 are used as preview cameras, and a preview image acquired by the camera 1 and a preview image acquired by the camera 2 are displayed in a layout style 1. The interface a is a view-finding interface for video recording being performed, and the interface a includes a preview image a acquired by a camera 1 and a preview image b acquired by a camera 2. The preview image a and the preview image b are displayed on the interface a in a layout style 1.

For the detailed switching process from the recording mode 4 to the recording mode 1 corresponding to S2003 and S2004 above, reference may be made to the switching process from the recording mode 1 to the recording mode 2 in S602 and S603 above, and details are not described herein again. It should only be distinguished that the recording mode 4 is a recording mode of single-lens video recording, and the recording mode 1 is a recording mode of dual-lens video recording.

In a case that the mode option b is a mode option pointing to the front-rear dual-lens mode or a mode option pointing to the picture-in-picture dual-lens mode, the mode option b may also be referred to as a first option, and the camera 1 may be referred to as a second camera, the camera 2 may be referred to as a third camera, the preview image a may be referred to as a second preview image, the preview image b may be referred to as a third preview image, and the layout style 1 may be referred to as a first layout. If the first option is a mode option pointing to the front-rear dual-lens mode, the first layout is a split-screen layout; and if the first option is a mode option pointing to the picture-in-picture dual-lens mode, the first layout is a picture-in-picture layout.

In addition, it should be noted that adjacent recording modes before and after switching are different, but non-adjacent recording modes may be the same or different. In this way, different switching requirements can be flexibly met. For example, the recording mode 4 is different from the recording mode 1, but the recording mode 4 may be the same as or different from the recording mode 2.

S2005: The mobile phone generates a video file a in response to an operation 3 by the user on the interface b. The operation 3 is used for triggering the mobile phone to end video recording. The video file a includes a video stream a, a video stream b, a video stream c, a video stream d, and a video stream g. The video stream a includes a plurality of frames of preview images a, the video stream b includes a plurality of frames of preview images b, the video stream c includes a plurality of frames of preview images c, the video stream d includes a plurality of frames of preview images d, and the video stream g includes a plurality of frames of preview images g.

Figure 24:
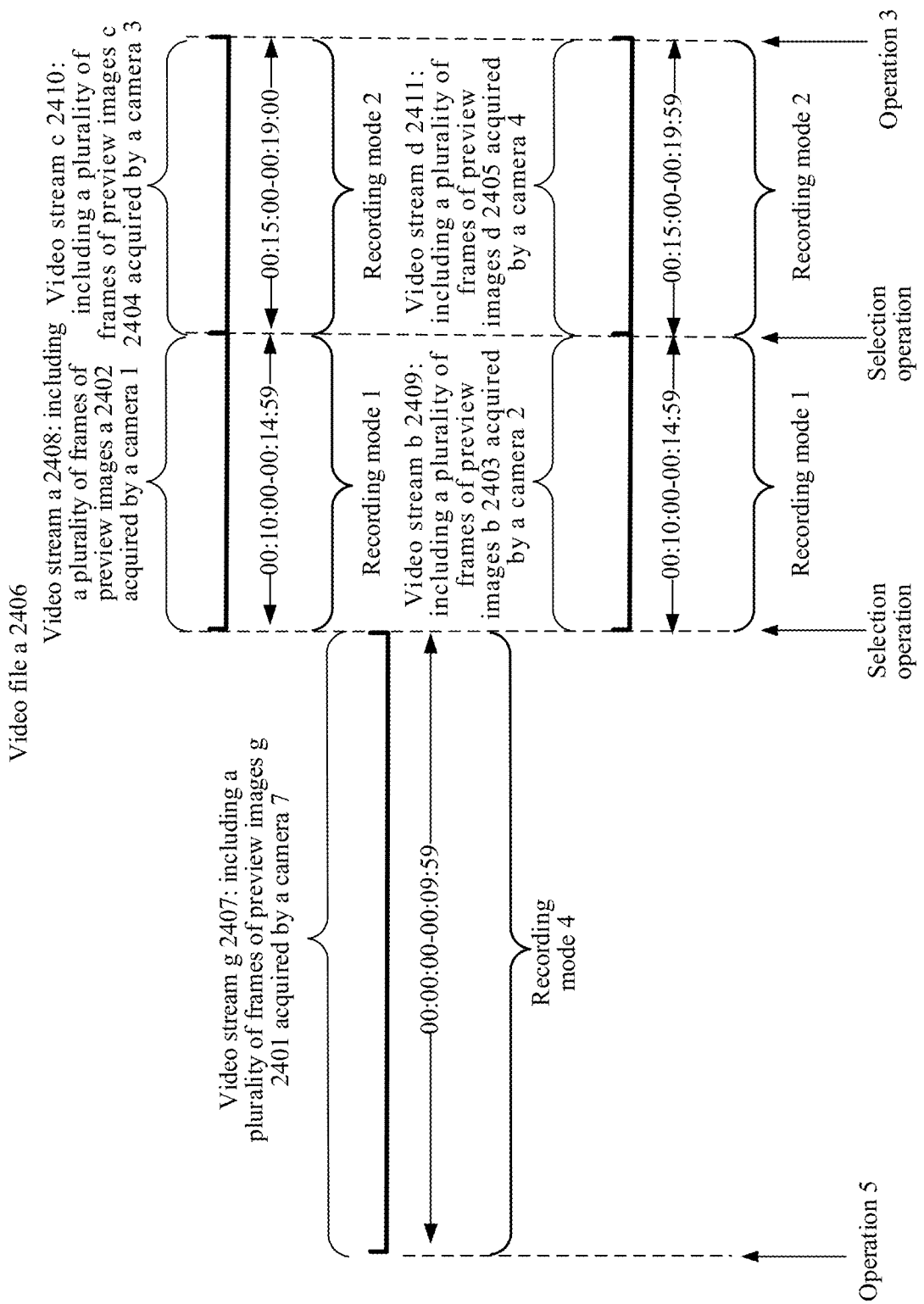
FIG. 24 is another schematic diagram of composition of a video file according to an embodiment of this application.

For example, as shown in FIG. 24, the mobile phone may trigger the start of video recording in response to the user's operation 5 on the interface f, and in this case, timing of the recording starts. Within the first 10 seconds from 00:00:00 (starting at second 0) to 00:09:59 (ending at second 9), the recording mode 4 is used for video recording, and the preview camera is the camera 7. Within the 10 seconds, the camera 7 acquires a plurality of frames of preview images g 2401 and displays the preview images on the interface g. At 00:09:59 (or 00:10:00), the mobile phone switches the recording mode to the recording mode 1 in response to the user's selection operation on the mode option b, and the preview cameras of the recording mode 1 are the camera 1 and the camera 2. Subsequently, within the 5 seconds from 00:10:00 (starting at second 10) to 00:14:59 (ending at second 14), the camera 1 acquires a plurality of frames of preview images a2402 and displays the preview images on the interface a, and the camera 2 acquires a plurality of frames of preview images b2403 and displays the preview images on the interface a. At 00:14:59 (or 00:15:00), the mobile phone switches the recording mode to the recording mode 2 in response to the user's selection operation on the mode option a, and the preview cameras of the recording mode 2 are the camera 3 and the camera 4. Subsequently, within the 5 seconds from 00:15:00 (starting at second 15) to 00:19:59 (ending at second 19), the camera 3 acquires a plurality of frames of preview images c2404 and displays the preview images on the interface b, and the camera 4 acquires a plurality of frames of preview images d2405 and displays the preview images on the interface b. Finally, at 00:19:59, the mobile phone generates a video file a2406 in response to the user's operation 3, and the video file a2406 includes a video stream g 2407, a video stream a2408, a video stream b2409, a video stream c2410, and a video stream d2411. The video stream g 2407 includes a plurality of frames of preview images g 2401. The video stream a2408 includes a plurality of frames of preview images a2402. The video stream b2409 includes a plurality of frames of preview images b2403. The video stream c2410 includes a plurality of frames of preview images c2404. The video stream d2411 includes a plurality of frames of preview images d2405.

The generated video file a includes video streams corresponding to the three recording modes, that is, a spliced file of the video streams obtained through recording in the three recording modes is obtained.

Based on the above, by using the video capturing method in this embodiment of this application, in a complete recording process, the recording mode 4 of single-lens video recording may be first switched to the recording mode 1 of dual-lens video recording, and then switched to the recording mode 2 of dual-lens video recording. Finally, a video file formed by video streams obtained through recording in three recording modes can be obtained.

It is to be noted that, in the above embodiment corresponding to Case 1, the process of switching recording modes for a plurality of times in the video recording process is described only by using switching the recording modes once or twice as an example, but it is not limited thereto in actual implementation. For example, between the recording mode 3 and the recording mode 1, recording mode switching can also be performed. In another example, between the recording mode 4 and the recording mode 1, recording mode switching can also be performed. The recording mode switching may include switching between recording modes of dual-lens video recording and/or recording modes of single-lens video recording, and the switching may be performed for one or more times. Details are not listed in this specification.

Figure 25A:
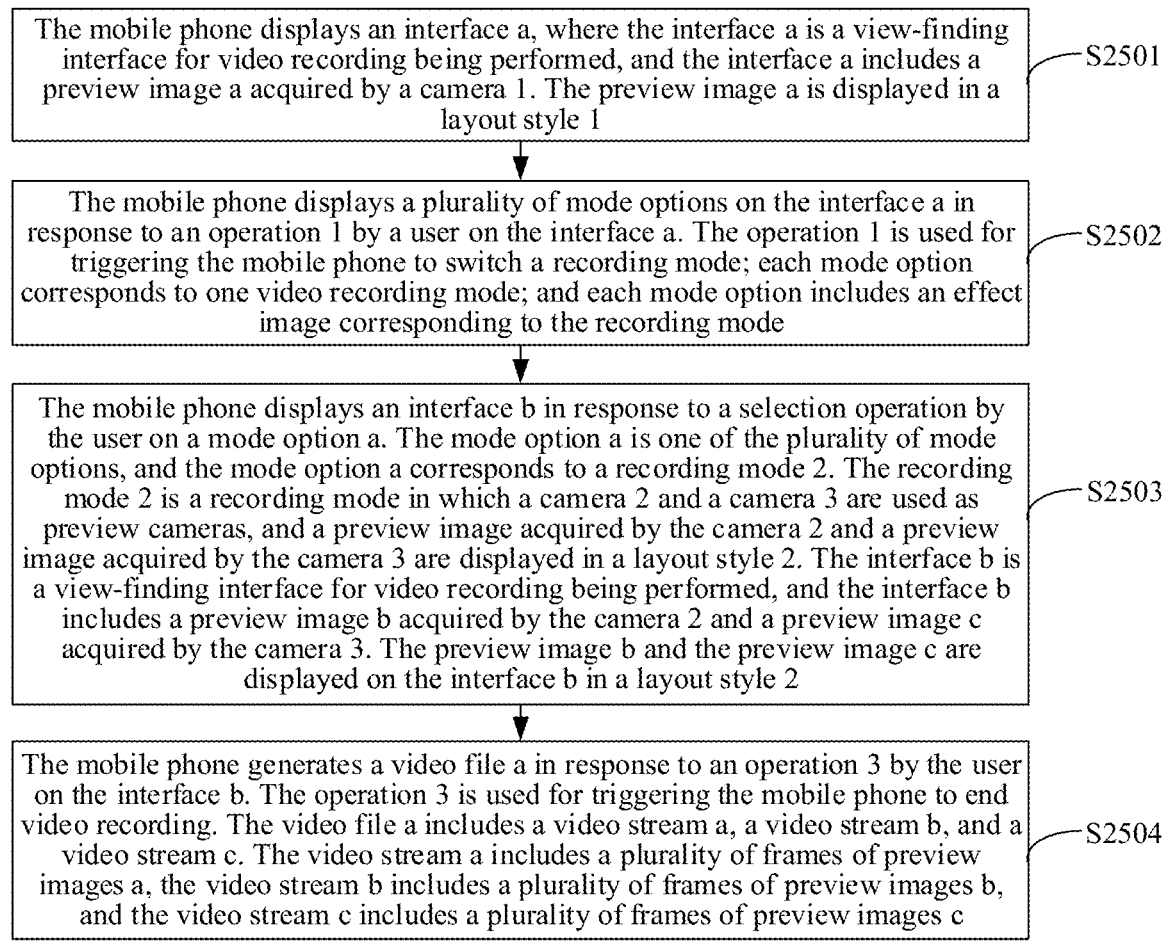
FIG. 25a is another flowchart of a video capturing method according to an embodiment of this application.

Corresponding to Case 2, an embodiment of this application provides a video capturing method. The method is applied to a mobile phone, and the mobile phone includes a plurality of cameras and can provide a dual-lens video recording function. Specifically, as shown in FIG. 25a, the method includes S2501 to S2504.

S2501: The mobile phone displays an interface a, where the interface a is a view-finding interface for video recording being performed, and the interface a includes a preview image a acquired by a camera 1. The preview image a is displayed in a layout style 1.

The interface a may be referred to as a first interface, the camera 1 may be referred to as a first camera, the preview image a may be referred to as a first preview image, and the layout style 1 is a full screen layout.

The difference from the interface a in Case 1 is that the interface a in Case 2 is a view-finding interface for single-lens video recording. That is, the currently adopted recording mode is the recording mode 1, and the recording mode 1 is a recording mode of single-lens video recording.

Moreover, there is only one preview camera of the recording mode 1, that is, the camera 1. The layout style of the recording recording 1 is a full screen layout, that is, the layout style 1 is a full screen layout.

For example, if the recording mode 1 is the front single-lens mode, the interface a may be the view-finding interface shown in (a) of FIG. 22. The recording mode 1 is a rear single-lens mode, then the interface a may be the view-finding interface shown in (b) of FIG. 22.

S2502: The mobile phone displays a plurality of mode options on the interface a in response to an operation 1 by a user on the interface a. The operation 1 is used for triggering the mobile phone to switch a recording mode; each mode option corresponds to one video recording mode; and each mode option includes an effect image corresponding to the recording mode.

In some embodiments, the interface a includes a control d. The control d is configured to trigger the mobile phone to switch between the front camera and the rear camera. In this way, switching between the recording modes of single-lens video recording can be realized conveniently.

Further, in a case that the view-finding interface of single-lens video recording includes the control d, the mobile phone displays a plurality of mode options on the interface a in response to the user's operation 1 on the interface a. The plurality of mode options only include the mode options for the recording modes of dual-lens video recording, but not the mode options for the recording modes of single-lens video recording. In this way, based on that switching between the recording modes of single-lens video recording can be ensured, the quantity of mode options can be reduced and the interface elements can be simplified.

In some embodiments, the interface a is a view-finding interface for single-lens video recording, then there is no need to turn off dual-lens video recording, so that the plurality of mode options do not include the option to turn off dual-lens.

For these embodiments, reference may be made to the relevant descriptions in S2003 above.

In addition, for the operation 1 and the plurality of mode options, reference may be made to the relevant description in Case 1 above, and details are not described herein again.

S2503: The mobile phone displays an interface b in response to a selection operation by the user on a mode option a. The mode option a is one of the plurality of mode options, and the mode option a corresponds to a recording mode 2. The recording mode 2 is a recording mode in which a camera 2 and a camera 3 are used as preview cameras, and a preview image acquired by the camera 2 and a preview image acquired by the camera 3 are displayed in a layout style 2. The interface b is a view-finding interface for video recording being performed, and the interface b includes a preview image b acquired by the camera 2 and a preview image c acquired by the camera 3. The preview image b and the preview image c are displayed on the interface b in a layout style 2.

In a case that the mode option a is a mode option pointing to the front-rear dual-lens mode or a mode option pointing to the picture-in-picture dual-lens mode, the mode option a may also be referred to as a first option, and the camera 2 may be referred to as a second camera, the camera 3 may be referred to as a third camera, the preview image b may be referred to as a second preview image, the preview image c may be referred to as a third preview image, and the layout style 2 may be referred to as a first layout. If the first option is a mode option pointing to the front-rear dual-lens mode, the first layout is a split-screen layout; and if the first option is a mode option pointing to the picture-in-picture dual-lens mode, the first layout is a picture-in-picture layout. The second camera is a front camera, and the third camera is a rear camera; or the second camera is a rear camera, and the third camera is a front camera.

Figure 25B:
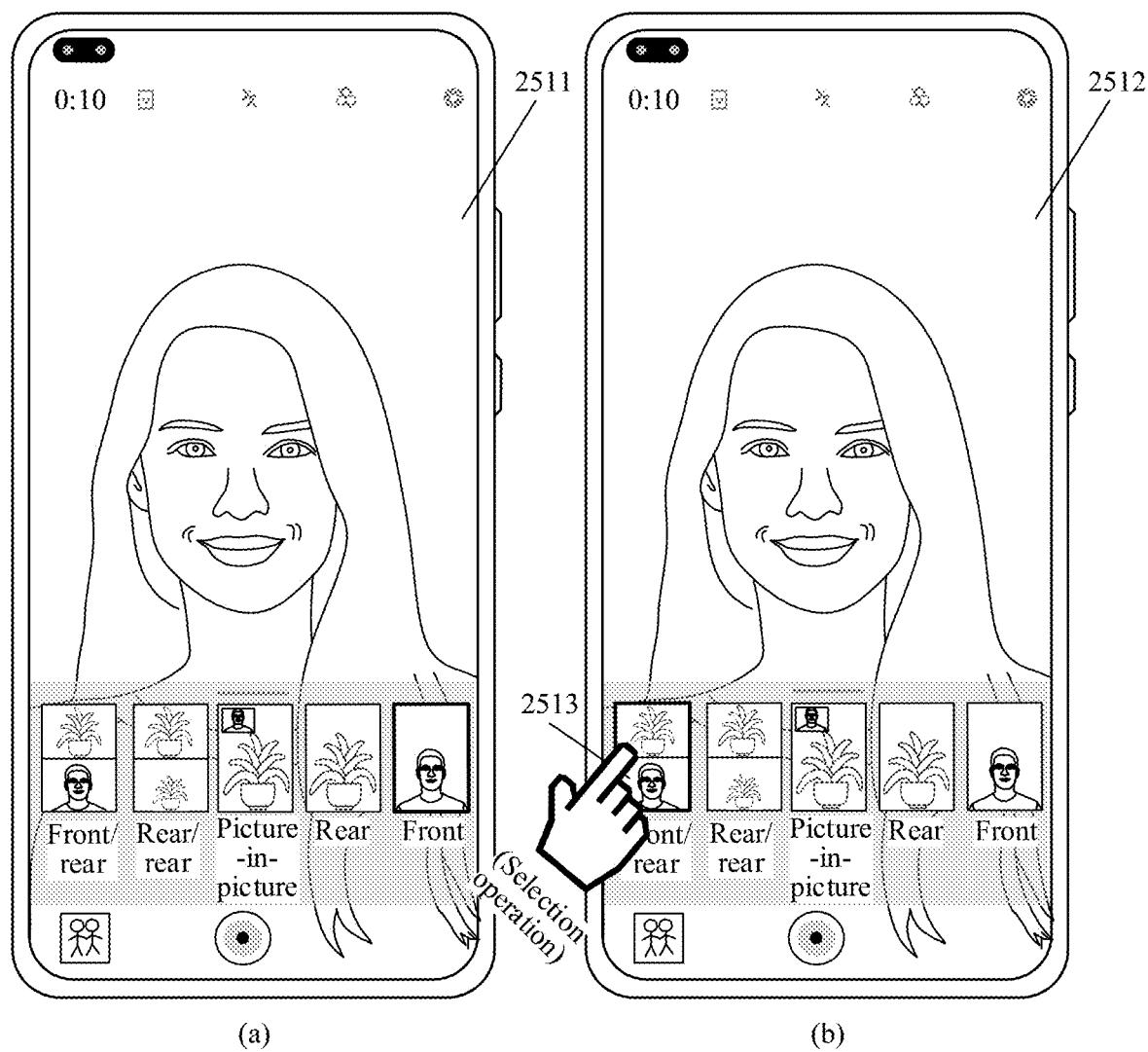
FIG. 25b is another schematic diagram of a view-finding interface for dual-lens video recording in a portrait form according to an embodiment of this application.

For S2503, reference may be made to the relevant description of S603 above, and details are not described herein again. It is to be only noted that the camera 2 corresponds to the camera 3 in Case 1, the camera 3 corresponds to the camera 4 in Case 1, the preview image b corresponds to the preview image c in Case 1, and the preview image c corresponds to the preview image d in Case 1. A specific example is used only for description below:

For example, the mobile phone can display an interface a2511 shown in (a) of FIG. 25b. The interface a2511 includes a plurality of mode options. The mode option pointing to the currently adopted front single-camera mode is highlighted. The mobile phone can receive the user's selection operation on the mode option 2513 on the interface a2512 shown in (b) of FIG. 25b. The mode option 2513 corresponds to the front-rear dual-lens mode, which may be referred to as a first option. In response to the user's selection operation on the mode option 2513, the mobile phone may display a view-finding interface shown in FIG. 7(a).

S2504: The mobile phone generates a video file a in response to an operation 3 by the user on the interface b. The operation 3 is used for triggering the mobile phone to end video recording. The video file a includes a video stream a, a video stream b, and a video stream c. The video stream a includes a plurality of frames of preview images a, the video stream b includes a plurality of frames of preview images b, and the video stream c includes a plurality of frames of preview images c.

The difference from Case 1 is that: in Case 2, the recording mode 1 is a recording mode of single-lens video recording, and correspondingly, in the video recording process in the recording mode 1, only one video stream can be formed, that is, the video stream a. The video stream a includes a plurality of frames of preview images a.

Figure 26:
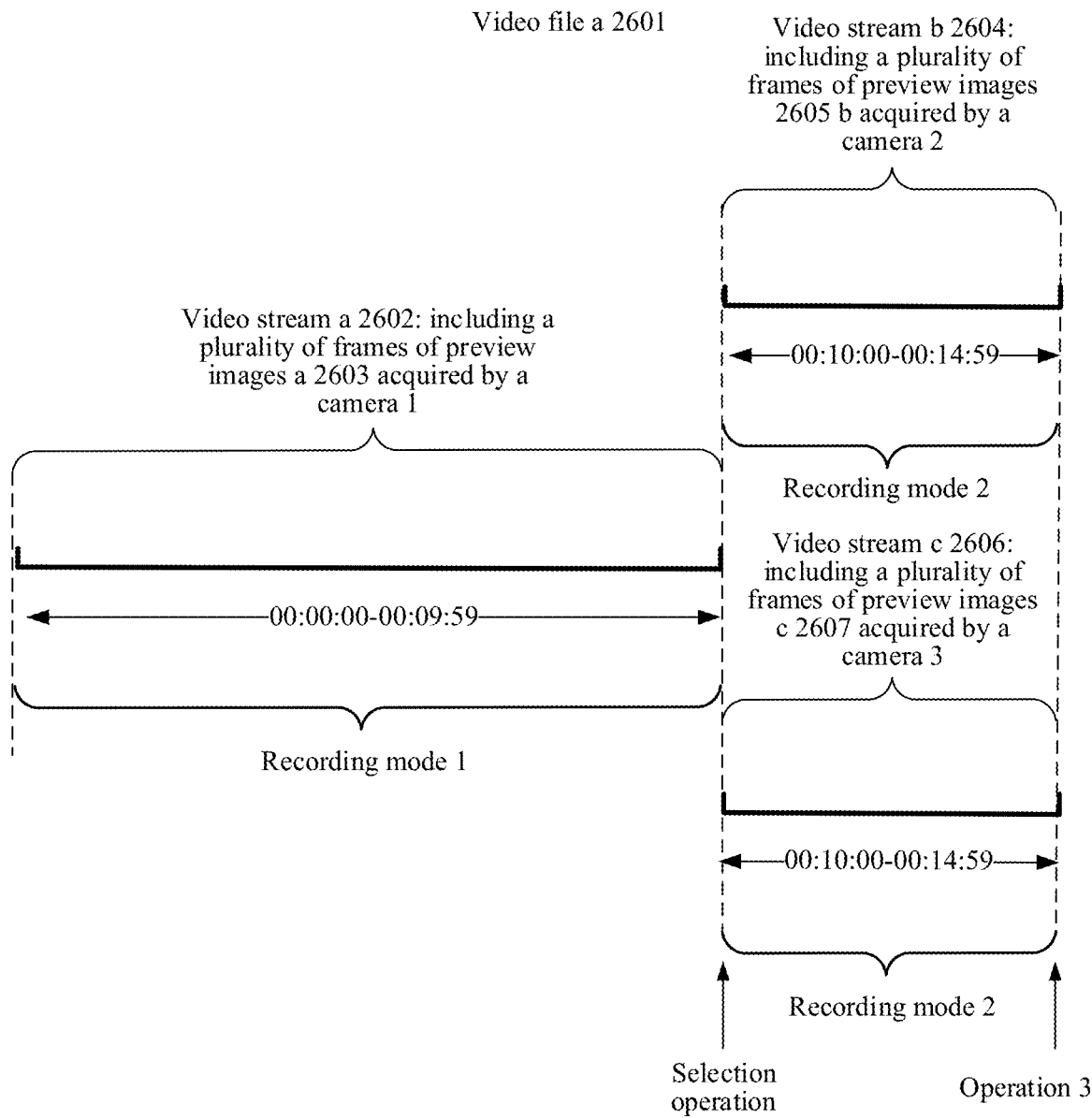
FIG. 26 is another schematic diagram of composition of a video file according to an embodiment of this application.

For example, as shown in FIG. 26, within the first 10 seconds from 00:00:00 (starting at second 0) to 00:09:59 (ending at second 9), the recording mode 1 is used for video recording, and the preview camera of the recording mode 1 is the camera 1. During the 10 seconds, the camera 1 acquires a plurality of frames of preview images a2603 and displays the preview images on the interface a. At 00:09:59 (or 00:10:00), the mobile phone switches the recording mode to the recording mode 2 in response to the user's selection operation on the mode option a, and the preview cameras of the recording mode 2 are the camera 2 and the camera 3. Subsequently, within the 5 seconds from 00:10:00 (starting at second 10) to 00:14:59 (ending at second 14), the camera 2 acquires a plurality of frames of preview images b2605 and displays the preview images on the interface b, and the camera 3 acquires a plurality of frames of preview images c2607 and displays the preview images on the interface b. At 00:14:59, the mobile phone generates a video file a2601 in response to the user's operation 3, and the video file a2601 includes a video stream a2602, a video stream b2604, and a video stream c2606. The video stream a2602 includes a plurality of frames of preview images a2603. The video stream b2604 includes a plurality of frames of preview images b2605. The video stream c2606 includes a plurality of frames of preview images c2607.

Based on the above, by using the video capturing method provided in this embodiment of this application, in the video recording process, the mobile phone can switch the recording mode from a recording mode of single-lens video recording to a recording mode of dual-lens video recording in response to the user's selection operation on a mode option, for example, switch from the front single-lens mode to the front-rear dual-lens mode. Therefore, the flexible switching from single-lens video recording to dual-lens video recording can be realized.

In addition, the mode option includes the effect image of the corresponding recording mode, which helps the user to prejudge the recording effect. Therefore, the recording mode can be selected more accurately.

Further, in Case 2, the multi-lens video recording tab (tab) in the camera application can also be used to trigger entry of dual-lens video recording. For details, reference may be made to the relevant description in Case 1 above, and details are not described herein again.

Similarly, the recording mode may not be switched, or may be switched for one or more times before the dual-lens video recording is entered and the video recording starts. Therefore, the recording mode when video recording starts can be a recording mode of dual-lens video recording, or a recording mode of single-lens video recording. The video capturing method in this embodiment of this application will be further described by using the two sub-cases below.

Figure 27:
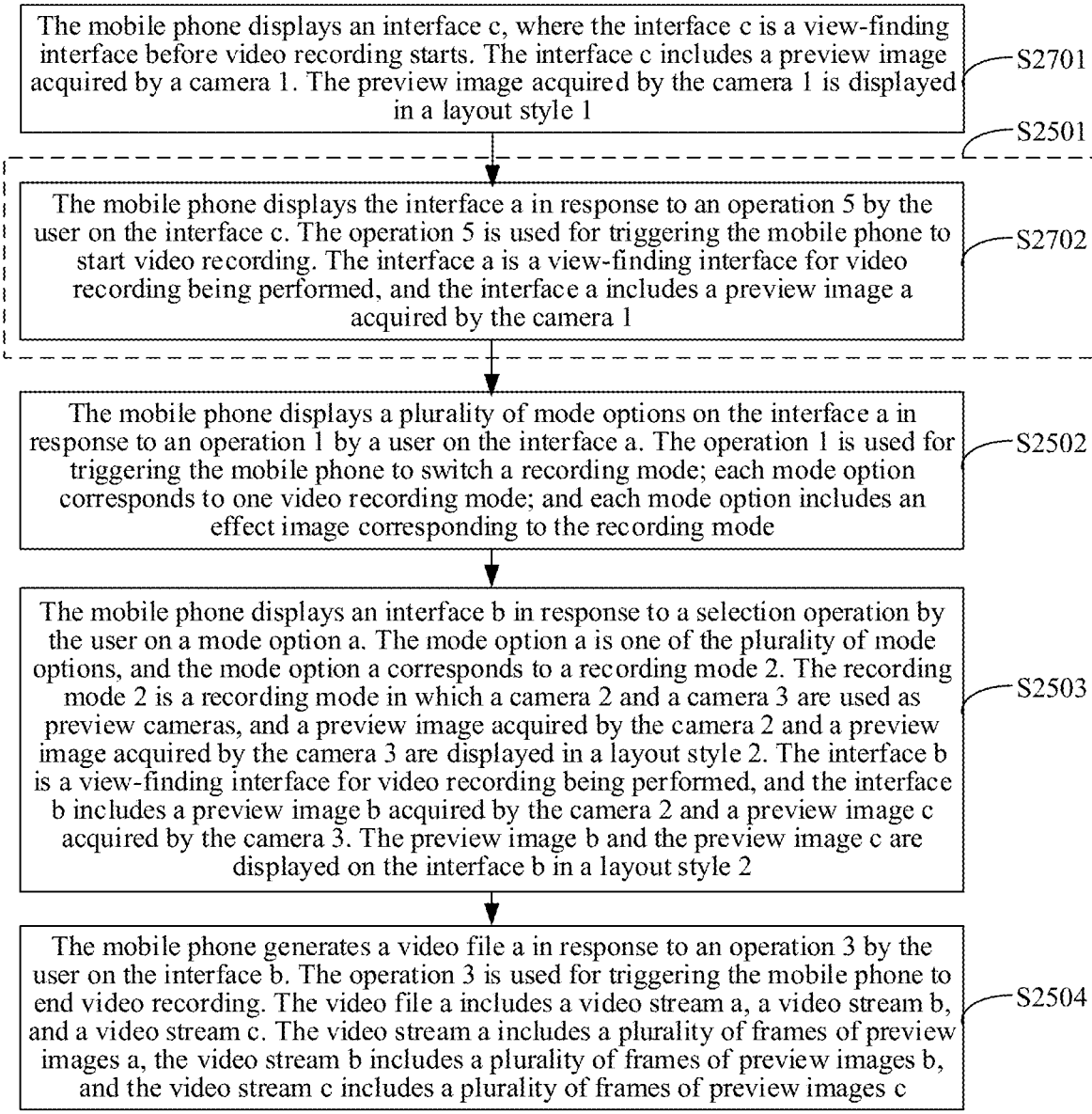
FIG. 27 is another flowchart of a video capturing method according to an embodiment of this application.

Corresponding to the first sub-case of Case 2, video recording starts in a recording mode of single-lens video recording. An embodiment of this application provides a video capturing method. The method is applied to a mobile phone, and the mobile phone includes a plurality of cameras. Moreover, the phone can provide dual-lens video recording function. In this embodiment, a description is provided mainly based on switching the recording mode only once in the recording process, for example, switching from the recording mode 1 to the recording mode 2. Specifically, as shown in FIG. 27, before S2501, the method further includes S2701, and S2501 further includes S2702:

S2701: The mobile phone displays an interface c, where the interface c is a view-finding interface before video recording starts. The interface c includes a preview image acquired by a camera 1. The preview image acquired by the camera 1 is displayed in a layout style 1.

In this embodiment, the recording mode is switched only once in the recording process. In other words, if the video recording starts in recording mode 1, view-finding for the interface c is also performed by adopting the recording mode 1.

For example, if the recording mode 1 is a front single-lens mode, the camera 1 may be a front camera. The interface c may be a view-finding interface shown in FIG. 21(a).

S2702: The mobile phone displays the interface a in response to an operation 5 by the user on the interface c. The operation 5 is used for triggering the mobile phone to start video recording. The interface a is a view-finding interface for video recording being performed, and the interface a includes a preview image a acquired by the camera 1.

For the operation 5, reference may be made to the relevant description of S1502 above, and details are not described herein again.

Based on the above, by using the method in this embodiment of this application, in a complete recording process, the recording mode is switched once, so that a video file formed by video streams obtained through recording in two recording modes can be obtained.

Corresponding to the first sub-case of Case 2, video recording starts in a recording mode of single-lens video recording. An embodiment of this application provides a video capturing method. The method is applied to a mobile phone, and the mobile phone includes a plurality of cameras. Moreover, the phone can provide dual-lens video recording function. In this embodiment, a description is provided mainly based on switching the recording mode only twice in the recording process, for example, switching from the recording mode 3 to the recording mode 1, and then switching from the recording mode 1 to the recording mode 2. Specifically, as shown in FIG. 28, before S2501, the method further includes S2801 and S2802, S2501 further includes S2803, and S2504 further includes S2804:

S2801: The mobile phone displays an interface d, where the interface d is a view-finding interface before video recording starts. The interface d includes a preview image acquired by a camera 4. The preview image acquired by the camera 4 is displayed in a layout style 3.

The interface d is similar to the interface c above, both of which are view-finding interfaces before video recording starts. The only difference is that the interface d is the view-finding interface corresponding to the recording mode 3, and the interface c is the view-finding interface corresponding to the recording mode 1.

It should be noted that, the layout styles of single-lens video recording are all full screen layouts, so that the layout style 3 is also a full screen layout.

The camera 4 may be the same as the camera 1, the camera 2, or the camera 3, or may be different from any one of the camera 1, the camera 2, and the camera 3.

For example, if the recording mode 1 is a front single-lens mode, the camera 1 may be a front main camera. The recording mode 2 is the rear-rear dual-lens mode, the camera 2 may be a rear wide-angle camera, and the camera 3 may be a rear telephoto camera. If the recording mode 3 is a rear single-lens mode, the camera 4 may be a rear main camera. Obviously, the camera 4 is not the same as any one of the camera 1, the camera 2, and the camera 3.

In another example, if the recording mode 1 is a front single-lens mode, the camera 1 may be a front main camera. The recording mode 2 is the ront-rear dual-lens mode, then the camera 2 may be the rear main camera, and the camera 3 may be the front camera. If the recording mode 3 is a rear single-lens mode, the camera 4 may be a rear main camera. Obviously, the camera 4 is the same as the camera 2.

S2802: The mobile phone displays an interface e in response to an operation 5 by the user on the interface d. The operation 5 is used for triggering the mobile phone to start video recording. The interface e is a view-finding interface for video recording being performed, and the interface e includes a control d and a preview image d acquired by the camera 4. The control d is configured to trigger the mobile phone to switch between the front camera and the rear camera. The preview image d is displayed in a layout style 3.

For the operation 5, reference may be made to the description of S1502 above, and details are not described herein again.

The recording modes adopted by the interface e and the interface d are the same, both of which are the recording mode 3. The difference from the interface d is that the interface e is a view-finding interface for a video being performed, and the interface d is a view-finding interface before video recording starts.

S2803: The mobile phone displays an interface a in response to an operation 6 by the user on the control d. The interface a is a view-finding interface for video recording being performed, and the interface a includes a preview image a acquired by a camera 1. The preview image a is displayed in a layout style 1.

The view-finding interface (for example, the interface e) of single-lens video recording includes a control d, and the control d is configured to trigger the mobile phone to switch between the front camera and the rear camera. Therefore, during switching from one recording mode of single-lens video recording to another recording mode of single-lens video recording, the switching can be triggered by operating 6 on the control d. In this way, switching between the recording modes of single-lens video recording can be realized conveniently.

For the process of switching from one recording mode of single-lens video recording to another recording mode of single-lens video recording, reference may be made to the relevant description in S2003 above, and details are not described herein again.

It should be noted that, switching from one recording mode of single-lens video recording to another recording mode of single-lens video recording may alternatively be implemented by calling out a plurality of mode options on the view-finding interface of one recording mode of single-lens video recording, and then selecting a mode option pointing to another recording mode of single-lens video recording from the plurality of mode options. The switching process is similar to the switching process from a recording mode of single-lens video recording to a recording mode of dual-lens video recording, and only the template option selected by the user is different, which will not be described herein again.

S2804: The mobile phone generates a video file a in response to an operation 3 by the user on the interface b. The operation 3 is used for triggering the mobile phone to end video recording. The video file a includes a video stream a, a video stream b, a video stream c, and a video stream d. The video stream a includes a plurality of frames of preview images a, the video stream b includes a plurality of frames of preview images b, the video stream c includes a plurality of frames of preview images c, and the video stream d includes a plurality of frames of preview images d.

Figure 29:
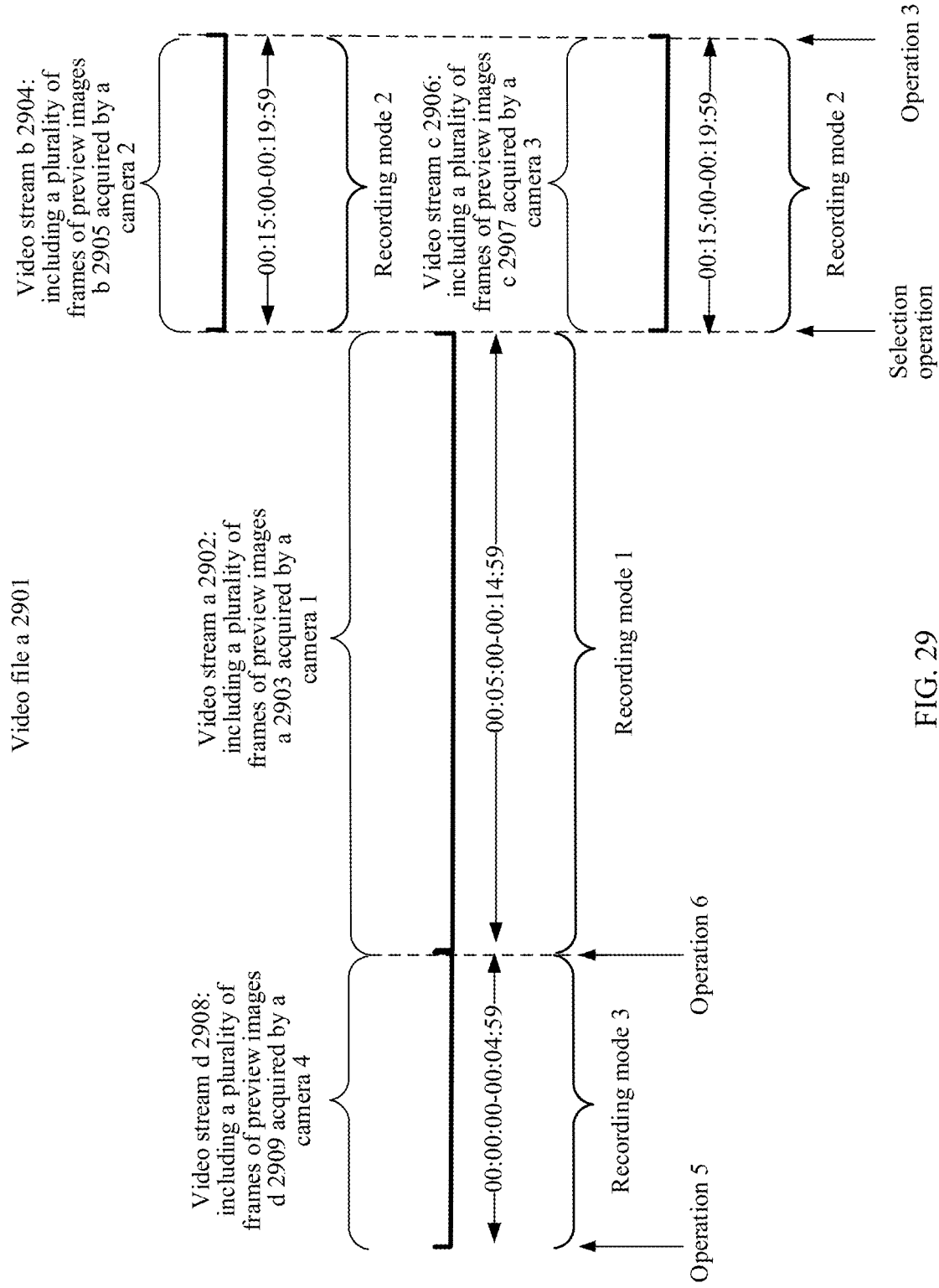
FIG. 29 is another schematic diagram of composition of a video file according to an embodiment of this application.

For example, as shown in FIG. 29, within the first 5 seconds from 00:00:00 (starting at second 0) to 00:04:59 (ending at second 4), the recording mode 3 is used for video recording, and the preview camera of the recording mode 3 is the camera 4. Within the 5 seconds, the camera 4 acquires a plurality of frames of preview images d2909 and displays the preview images on the interface e. At 00:04:59 (or 00:05:00), the mobile phone switches the recording mode to the recording mode 1 in response to the user's operation 6, and the preview camera of the recording mode 1 is the camera 1. Subsequently, within 10 seconds from 00:05:00 (starting at second 5) to 00:14:59 (ending at second 14), the camera 2 acquires a plurality of frames of preview images a2903 and displays the preview images on the interface a. At 00:14:59 (or 00:15:00), the mobile phone switches the recording mode to the recording mode 2 in response to the user's selection operation, and the preview cameras of the recording mode 2 are the camera 2 and the camera 3. Subsequently, within the 5 seconds from 00:15:00 (starting at second 15) to 00:19:59 (ending at second 19), the camera 2 acquires a plurality of frames of preview images b2905 and displays the preview images on the interface b, and the camera 3 acquires a plurality of frames of preview images c2907 and displays the preview images on the interface b. At 00:19:59, the mobile phone generates video file a2901 in response to the user's operation 3, and the video file a2901 includes a video stream a2902, a video stream b2904, a video stream c2906, and a video stream d2908. The video stream a2902 includes a plurality of frames of preview images a2903. The video stream b2904 includes a plurality of frames of preview images b2905. The video stream c2906 includes a plurality of frames of preview images c2907. The video stream d2908 includes a plurality of frames of preview images d2909.

Based on the above, by using the video capturing method in this embodiment of this application, in a complete recording process, the recording mode 3 of single-lens video recording may be first switched to the recording mode 1 of single-lens video recording, and then the recording mode 1 of single-lens video recording is switched to the recording mode 2 of dual-lens video recording. The switching between the recording modes of single-lens video recording, and between the recording modes of single-lens video recording and the recording modes of dual-lens video recording can be implemented. Finally, a video file formed by video streams obtained through recording in three recording modes can be obtained.

Figure 30A:
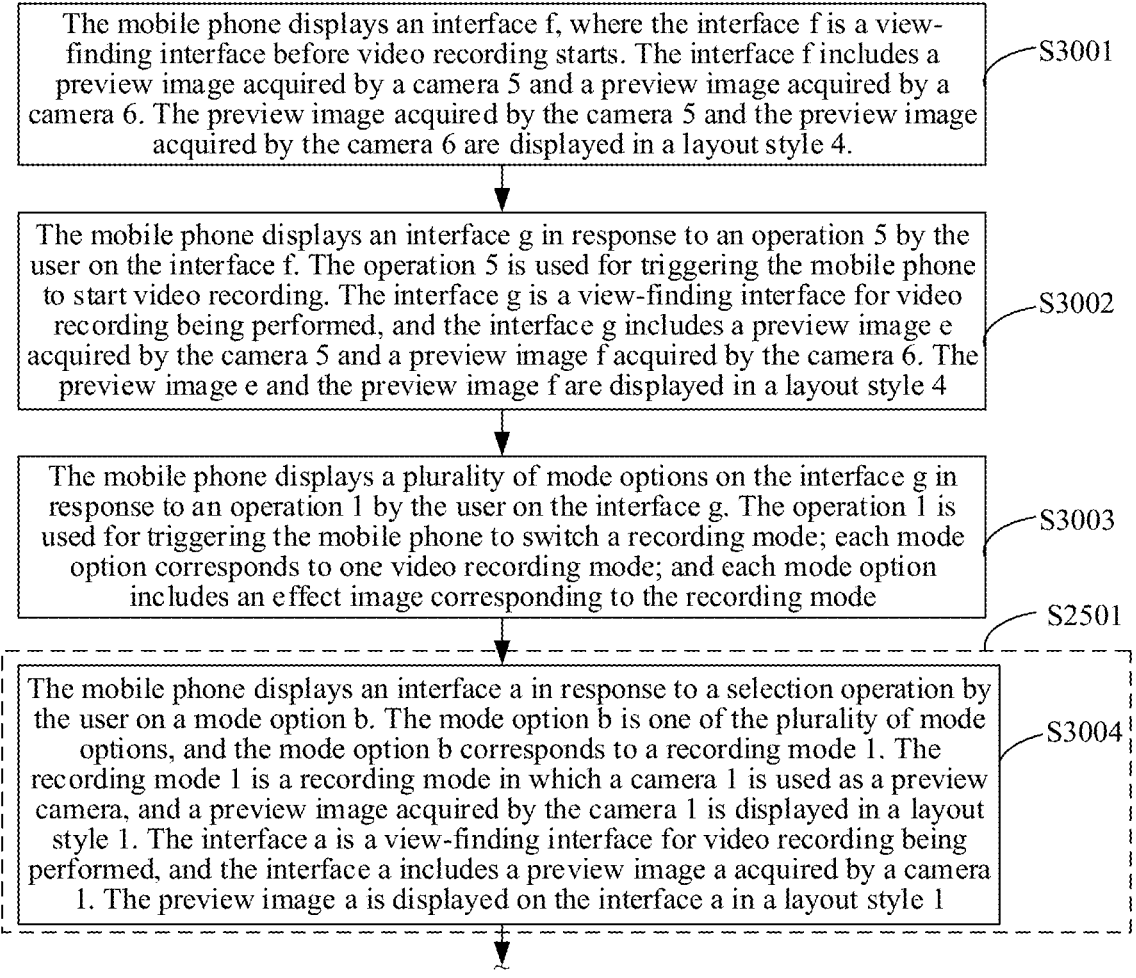

Corresponding to the second sub-case of Case 2, video recording starts in a recording mode of dual-lens video recording. An embodiment of this application provides a video capturing method. The method is applied to a mobile phone, and the mobile phone includes a plurality of cameras. Moreover, the phone can provide dual-lens video recording function. In this embodiment, a description is provided mainly based on switching the recording mode only twice in the recording process, for example, switching from the recording mode 4 to the recording mode 1, and then switching from the recording mode 1 to the recording mode 2. Specifically, as shown in FIG. 30A and FIG. 30B, before S2501, the method further includes S3001 to S3003, S2501 further includes S3004, and S2504 further includes S3005:

S3001: The mobile phone displays an interface f, where the interface f is a view-finding interface before video recording starts. The interface f includes a preview image acquired by a camera 5 and a preview image acquired by a camera 6. The preview image acquired by the camera 5 and the preview image acquired by the camera 6 are displayed in a layout style 4.

The interface f corresponds to the view-finding interface of the recording mode 4, and the recording mode 4 is a recording mode for dual-lens video recording. Therefore, the interface f includes two channels of preview images acquired by two preview cameras (such as the camera 5 and the camera 6).

For example, if the recording mode 4 is a front-rear dual-lens mode, the camera 5 may be a rear main camera, the camera 6 may be a front camera, and the layout style 4 may be a top-bottom layout.

S3002: The mobile phone displays an interface g in response to an operation 5 by the user on the interface f. The operation 5 is used for triggering the mobile phone to start video recording. The interface g is a view-finding interface for video recording being performed, and the interface g includes a preview image e acquired by the camera 5 and a preview image f acquired by the camera 6. The preview image e and the preview image f are displayed in a layout style 4.

For the operation 5, reference may be made to the relevant description of S1502 above.

The interface g is also a view-finding interface corresponding to the recording mode 4. Different from the interface f, the interface g is a view-finding interface for video recording being performed, and interface g is a view-finding interface before video recording starts.

In a case that the interface g is a view-finding interface in the front-rear dual-lens mode or a view-finding interface in the picture-in-picture dual-lens mode, the interface g may be referred to as a fourth interface, the camera 5 may be referred to as a seventh camera, the camera 6 may be referred to as an eighth camera, the preview image e may be referred to as a seventh preview image, the preview image f may be referred to as an eighth preview image, and the layout style 4 may be referred to as a fourth layout. If the fourth interface is a view-finding interface in the front-rear dual-lens mode, the fourth layout is a split-screen layout; and if the fourth interface is a view-finding interface in the picture-in-picture dual-lens mode, the fourth layout is a picture-in-picture layout. The seventh camera is a front camera, and the eighth camera is a rear camera; or the seventh camera is a rear camera, and the eighth camera is a front camera.

In a case that the interface g is a view-finding interface in the rear-rear dual-lens mode, the interface g may be referred to as a fourth interface, the camera 5 may be referred to as a ninth camera, the camera 6 may be referred to as a tenth camera, the preview image e may be referred to as a ninth preview image, the preview image f may be referred to as a tenth preview image, the layout style 4 may be referred to as a sixth layout, and the sixth layout is a split-screen layout. The ninth camera and the tenth camera are two different rear cameras.

S3003: The mobile phone displays a plurality of mode options on the interface g in response to an operation 1 by the user on the interface g. The operation 1 is used for triggering the mobile phone to switch a recording mode; each mode option corresponds to one video recording mode; and each mode option includes an effect image corresponding to the recording mode.

S3004: The mobile phone displays an interface a in response to a selection operation by the user on a mode option b. The mode option b is one of the plurality of mode options, and the mode option b corresponds to a recording mode 1. The recording mode 1 is a recording mode in which a camera 1 is used as a preview camera, and a preview image acquired by the camera 1 is displayed in a layout style 1. The interface a is a view-finding interface for video recording being performed, and the interface a includes a preview image a acquired by a camera 1. The preview image a is displayed on the interface a in a layout style 1.

The mode option b may be referred to as a fourth option, and the fourth option is used for indicating the layout style 1 of the preview image a acquired by the camera 1 on the view-finding interface. This layout style 1 may be referred to as a fifth layout.

Figure 31:
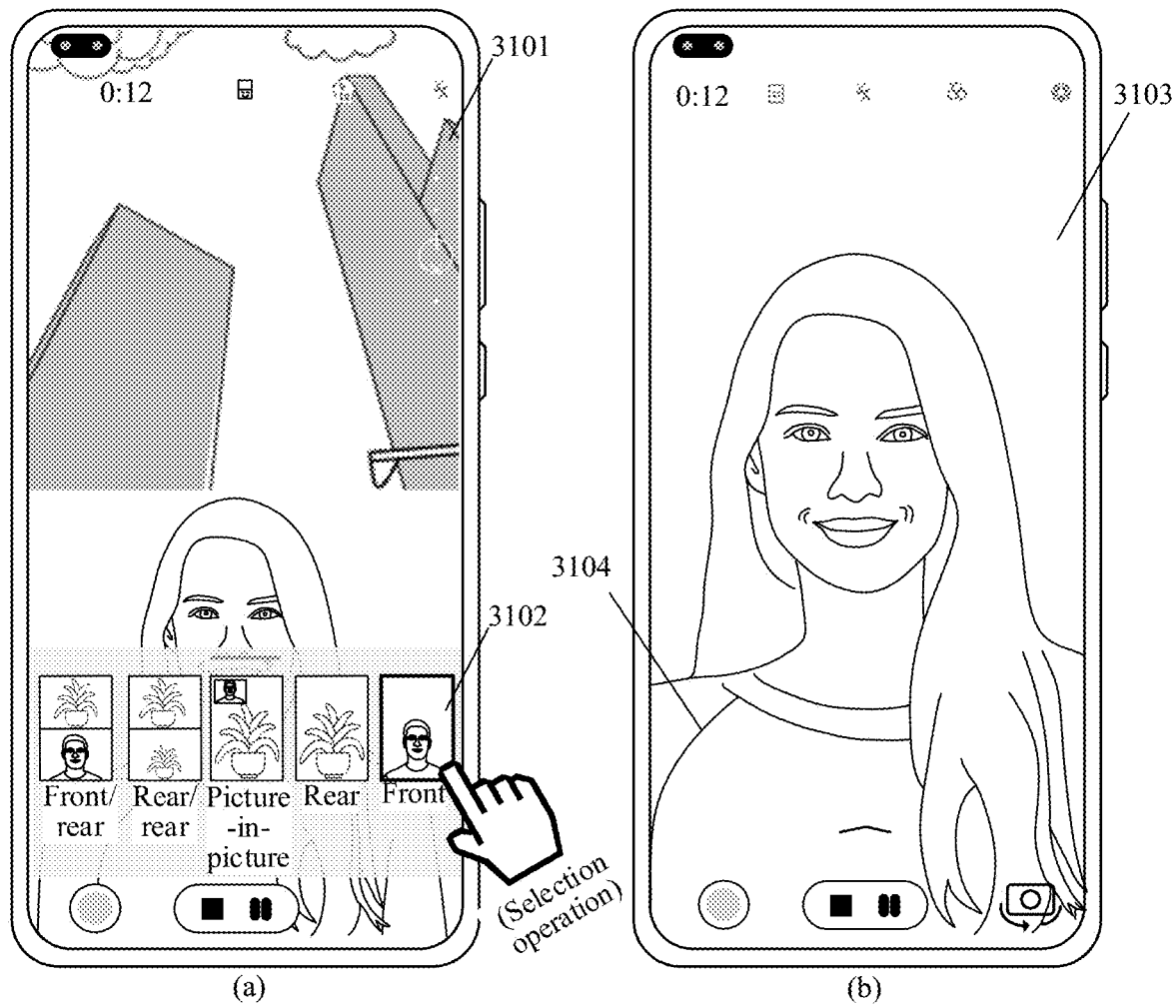
FIG. 31 is another schematic diagram of a view-finding interface for dual-lens video recording in a portrait form according to an embodiment of this application.

For example, if the recording mode 1 is a front single-lens mode, the camera 1 may be a front camera, and the layout style 1 is a full screen layout. The selection operation is a click/tap operation. The mobile phone can receive the user's click/tap operation on the mode option 3102 on the interface g 3101 shown in (a) of FIG. 31, that is, the mode option b is the mode option 3102. The mode option 3102 corresponds to the front single-lens mode. In response to the user's click/tap operation on the mode option 3102, the mobile phone may display an interface a3103 shown in (b) of FIG. 31, and the interface a3103 includes a preview image a3104 acquired by the front camera.

The recording mode 1 is a recording mode of single-lens video recording, and the mode option b is a mode option corresponding to a recording mode of single-lens video recording.

S3005: The mobile phone generates a video file a in response to an operation 3 by the user on the interface b. The operation 3 is used for triggering the mobile phone to end video recording. The video file a includes a video stream a, a video stream b, a video stream c, a video stream d, and a video stream g. The video stream a includes a plurality of frames of preview images a, the video stream b includes a plurality of frames of preview images b, the video stream c includes a plurality of frames of preview images c, the video stream d includes a plurality of frames of preview images d, and the video stream g includes a plurality of frames of preview images g.

Figure 32:
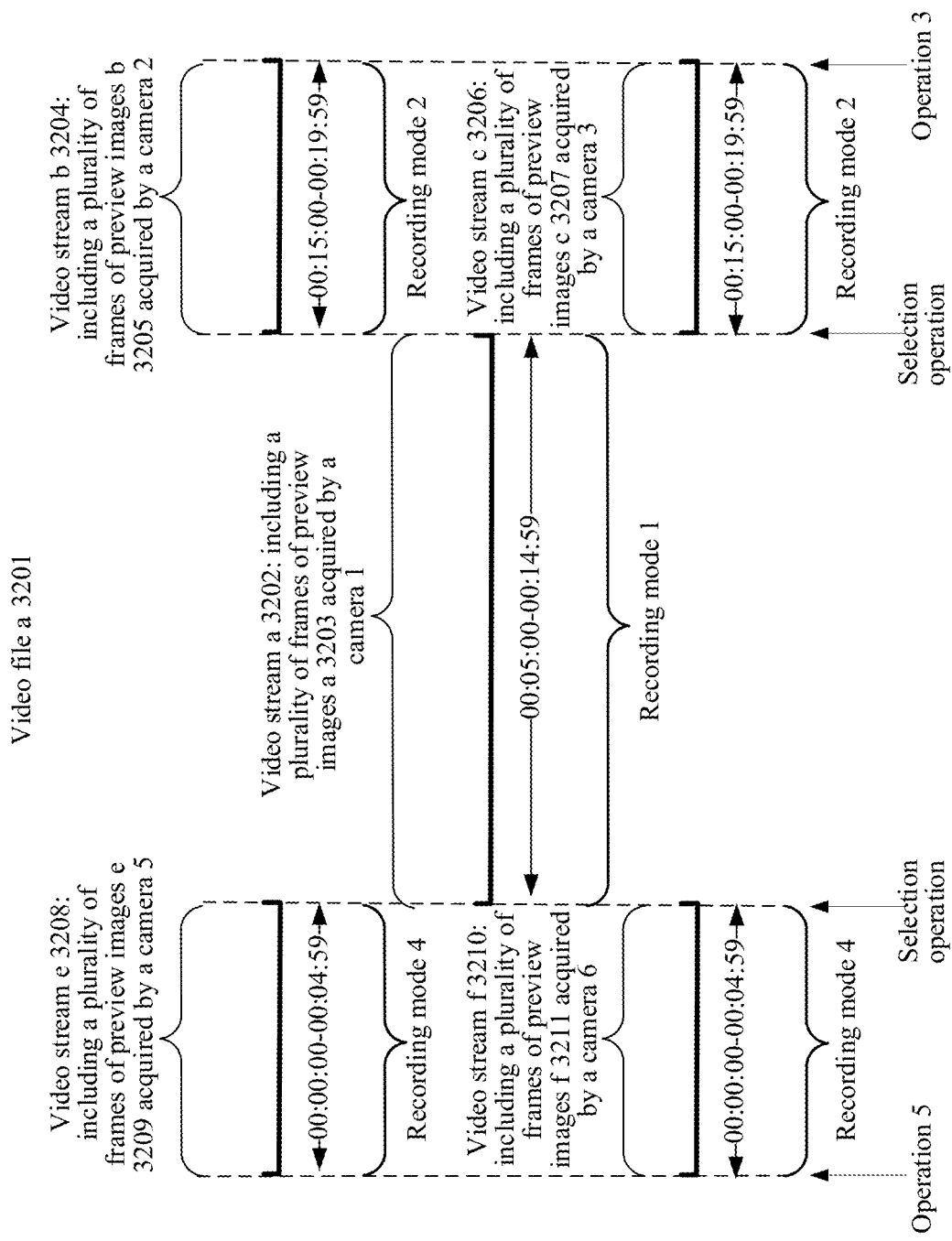
FIG. 32 is another schematic diagram of composition of a video file according to an embodiment of this application.

For example, as shown in FIG. 32, within the first 5 seconds from 00:00:00 (starting at second 0) to 00:04:59 (ending at second 4), the recording mode 4 is used for video recording, and the preview cameras of the recording mode 4 is the camera 4 and the camera 6. Within the 5 seconds, the camera 5 acquires a plurality of frames of preview images e 3209 and displays the preview images on the interface g, and the camera 6 acquires a plurality of frames of preview images f 3210 and displays the preview images on the interface g. At 00:04:59 (or 00:05:00), the mobile phone switches the recording mode to the recording mode 1 in response to the user's selection operation on the mode option b, and the preview camera of the recording mode 1 is the camera 1. Subsequently, within 10 seconds from 00:05:00 (starting at second 5) to 00:14:59 (ending at second 14), the camera 1 acquires a plurality of frames of preview images a3203 and displays the preview images on the interface a. At 00:14:59 (or 00:15:00), the mobile phone switches the recording mode to the recording mode 2 in response to the user's selection operation on the mode option a, and the preview cameras of the recording mode 2 are the camera 2 and the camera 3. Subsequently, within the 5 seconds from 00:15:00 (starting at second 15) to 00:19:59 (ending at second 19), the camera 2 acquires a plurality of frames of preview images b3205 and displays the preview images on the interface b, and the camera 3 acquires a plurality of frames of preview images c3207 and displays the preview images on the interface b. At 00:19:59, the mobile phone generates video file a3201 in response to user's operation 3, and the video file a3201 includes a video stream a3202, a video stream b3204, a video stream c3206, a video stream e 3208, and a video stream f 3210. The video stream a3202 includes a plurality of frames of preview images a3203. The video stream b3204 includes a plurality of frames of preview images b3205. The video stream c3206 includes a plurality of frames of preview images c3207. The video stream e 3208 includes a plurality of frames of preview images e 3209. The video stream f 3210 includes a plurality of frames of preview images f 3211.

Based on the above, by using the video capturing method in this embodiment of this application, in a complete recording process, the recording mode 4 of dual-lens video recording may be first switched to the recording mode 1 of single-lens video recording, and then switched to the recording mode 2 of dual-lens video recording. Flexible switching between the recording modes of single-lens video recording, and the recording modes of dual-lens video recording can be implemented. Finally, a video file formed by video streams obtained through recording in three recording modes can be obtained.

It is to be noted that, in the above embodiment corresponding to Case 2, the process of switching recording modes for a plurality of times in the video recording process is described only by using switching the recording modes once or twice as an example, but it is not limited thereto in actual implementation. For example, between the recording mode 3 and the recording mode 1, recording mode switching can also be performed. In another example, between the recording mode 4 and the recording mode 1, recording mode switching can also be performed. The recording mode switching may include switching between recording modes of dual-lens video recording and/or recording modes of single-lens video recording, and the switching may be performed for one or more times. Details are not listed in this specification.

Figure 33:
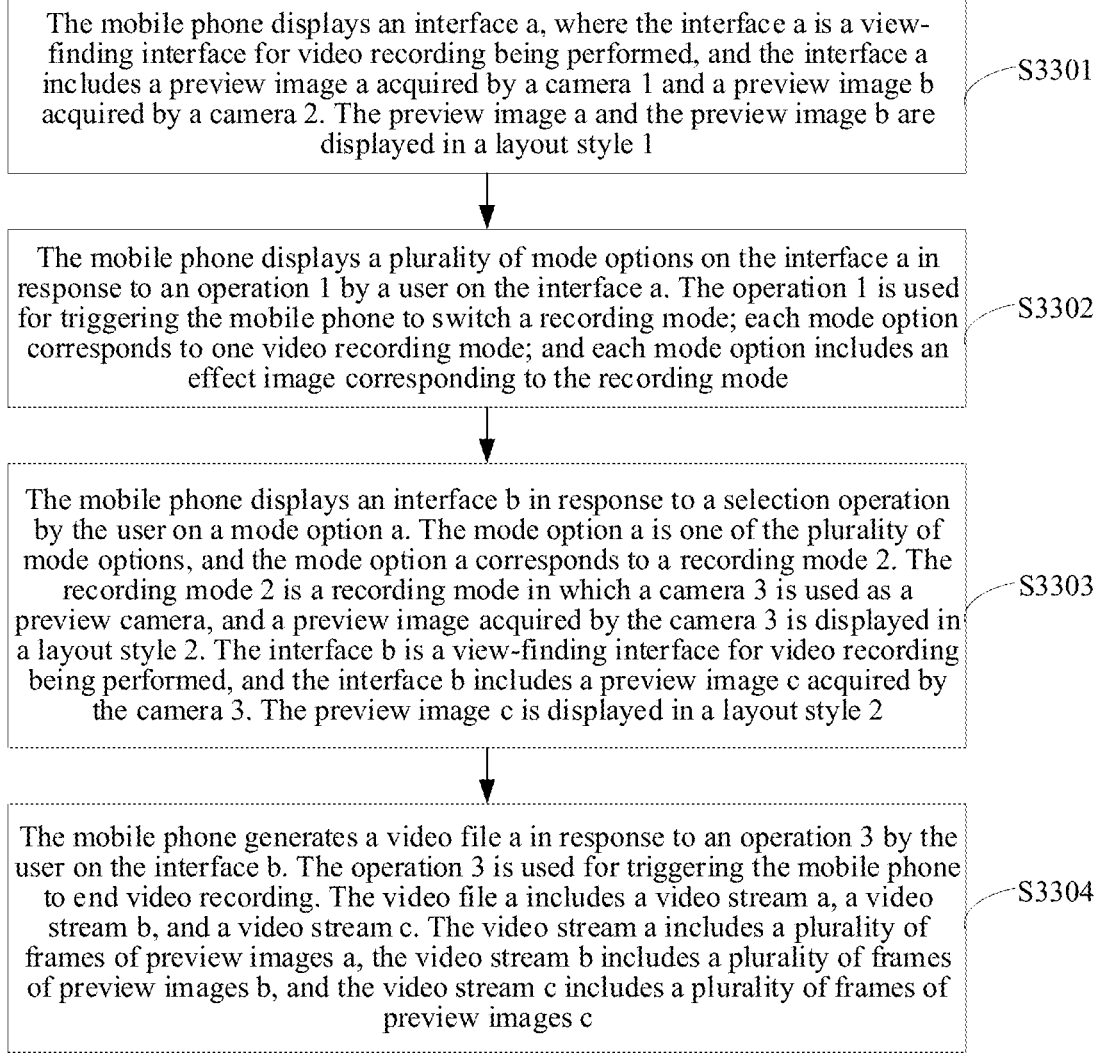
FIG. 33 is another flowchart of a video capturing method according to an embodiment of this application.

Corresponding to Case 3, an embodiment of this application provides a video capturing method. The method is applied to a mobile phone, and the mobile phone includes a plurality of cameras and can provide a dual-lens video recording function. Specifically, as shown in FIG. 33, the method includes S3301 to S3304.

S3301: The mobile phone displays an interface a, where the interface a is a view-finding interface for video recording being performed, and the interface a includes a preview image a acquired by a camera 1 and a preview image b acquired by a camera 2. The preview image a and the preview image b are displayed in a layout style 1.

In a case that the interface a is a view-finding interface in the front-rear dual-lens mode or a view-finding interface in the picture-in-picture dual-lens mode, the interface a may also be referred to as a second interface, the camera 1 may be referred to as a second camera, the camera 2 may be referred to as a third camera, the preview image a may be referred to as a second preview image, the preview image b may be referred to as a third preview image, and the layout style 1 may be referred to as a first layout. If the second interface is a view-finding interface in the front-rear dual-lens mode, the first layout is a split-screen layout; and if the second interface is a view-finding interface in the picture-in-picture dual-lens mode, the first layout is a picture-in-picture layout.

S3302: The mobile phone displays a plurality of mode options on the interface a in response to an operation 1 by a user on the interface a. The operation 1 is used for triggering the mobile phone to switch a recording mode; each mode option corresponds to one video recording mode; and each mode option includes an effect image corresponding to the recording mode.

S3303: The mobile phone displays an interface b in response to a selection operation by the user on a mode option a. The mode option a is one of the plurality of mode options, and the mode option a corresponds to a recording mode 2. The recording mode 2 is a recording mode in which a camera 3 is used as a preview camera, and a preview image acquired by the camera 3 is displayed in a layout style 2. The interface b is a view-finding interface for video recording being performed, and the interface b includes a preview image c acquired by the camera 3. The preview image c is displayed in a layout style 2.

The mode option a may be referred to as a third option, and the third option is used for indicating the layout style 2 of the preview image c acquired by the camera 3 on the view-finding interface. The camera 3 may be referred to as a sixth camera, the preview image c may be referred to as a sixth preview image, the layout style 2 may be referred to as a third layout, and the third layout is a full screen layout. The interface b is a third interface.

For the above implementation process of S3301 to S3303, reference may be made to the description of S601-S603 in Case 1, and details are not described herein again. The only difference is that in Case 1, the recording mode 1 of dual-lens video recording is switched to the recording mode 2 of dual-lens video recording, and in Case 2, the recording mode 1 of the dual-lens video recording is switched to the recording mode 2 of single-lens video recording. Correspondingly, the layout style 2 in Case 2 is a full screen layout.

S3304: The mobile phone generates a video file a in response to an operation 3 by the user on the interface b. The operation 3 is used for triggering the mobile phone to end video recording. The video file a includes a video stream a, a video stream b, and a video stream c. The video stream a includes a plurality of frames of preview images a, the video stream b includes a plurality of frames of preview images b, and the video stream c includes a plurality of frames of preview images c.

Figure 34:
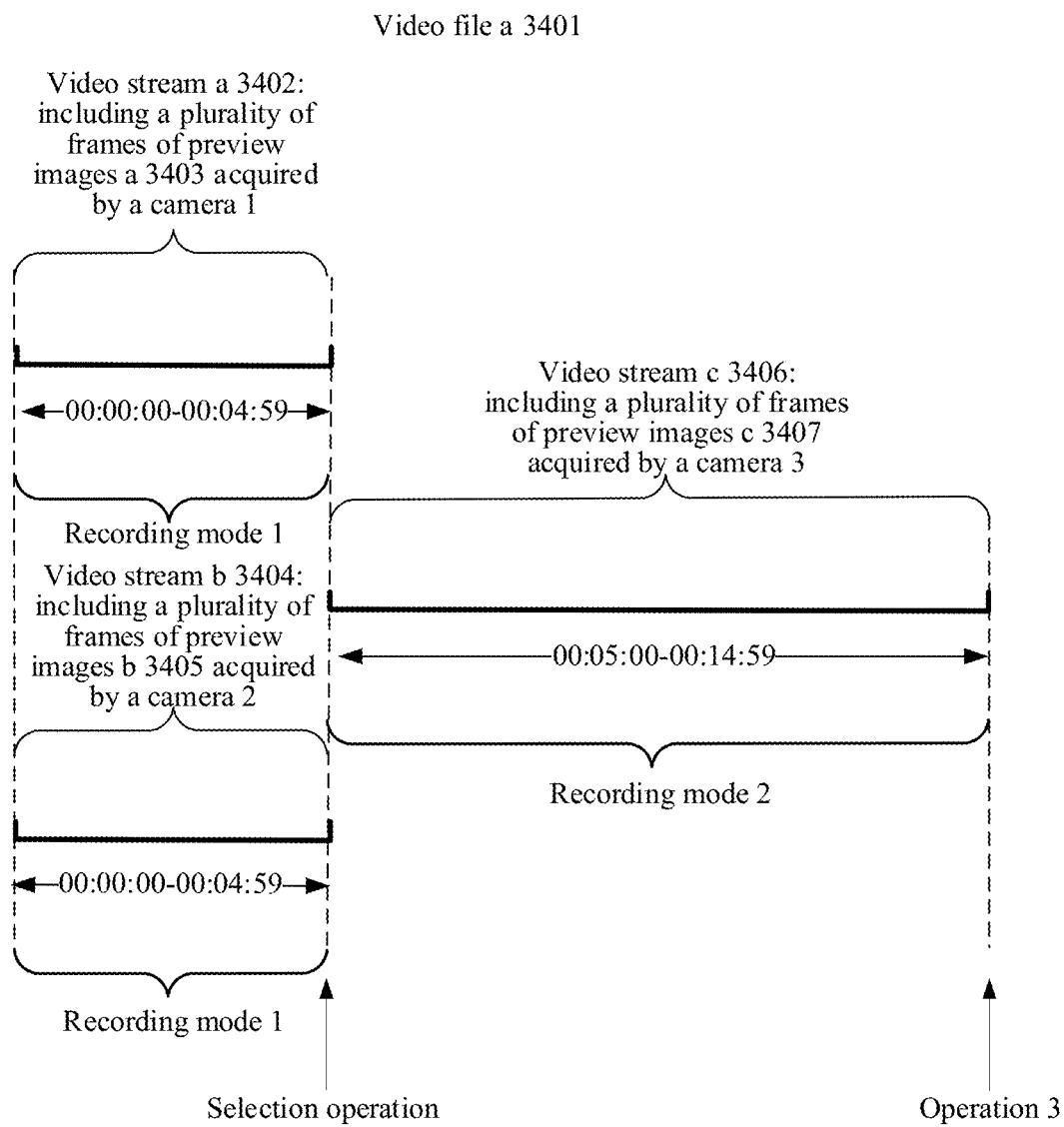
FIG. 34 is another schematic diagram of composition of a video file according to an embodiment of this application.

For example, as shown in FIG. 34, within the first 10 seconds from 00:00:00 (starting at second 0) to 00:09:59 (ending at second 9), the recording mode 1 is used for video recording, and the preview cameras of the recording mode 1 is the camera 1 and the camera 2. Within the 10 seconds, the camera 1 acquires a plurality of frames of preview images a3403 and displays the preview images on the interface a, and the camera 2 acquires a plurality of frames of preview images b3405 and displays the preview images on the interface a. At 00:09:59 (or 00:10:00), the mobile phone switches the recording mode to the recording mode 2 in response to the user's selection operation on the mode option a, and the preview camera of the recording mode 2 is the camera 3. Subsequently, within 5 seconds from 00:10:00 (starting at second 10) to 00:14:59 (ending at second 14), the camera 3 acquires a plurality of frames of preview images c3407 and displays the preview images on the interface b. At 00:14:59, the mobile phone generates a video file a3401 in response to the user's operation 3, and the video file a3401 includes a video stream a3402, a video stream b3404, and a video stream c3406. The video stream a3402 includes a plurality of frames of preview images a3403. The video stream b3404 includes a plurality of frames of preview images b3405. The video stream c3406 includes a plurality of frames of preview images c3407.

Based on the above, by using the video capturing method provided in this embodiment of this application, in the video recording process, the mobile phone can switch the recording mode from a recording mode of dual-lens video recording to a recording mode of single-lens video recording in response to the user's selection operation on a mode option, for example, switch from the front-rear dual-lens mode to the front single-lens mode. Therefore, the flexible switching from dual-lens video recording to single-lens video recording can be realized.

In addition, the mode option includes the effect image of the corresponding recording mode, which helps the user to prejudge the recording effect. Therefore, the recording mode can be selected more accurately.

Further, in Case 3, the multi-lens video recording tab (tab) in the camera application can also be used to trigger entry of dual-lens video recording. For details, reference may be made to the relevant description in Case 1 above, and details are not described herein again.

Similarly, the recording mode may not be switched, or may be switched for one or more times before the dual-lens video recording is entered and the video recording starts. Therefore, the recording mode when video recording starts can be a recording mode of dual-lens video recording, or a recording mode of single-lens video recording. The video capturing method in this embodiment of this application will be further described by using the two sub-cases below.

Figure 35A:
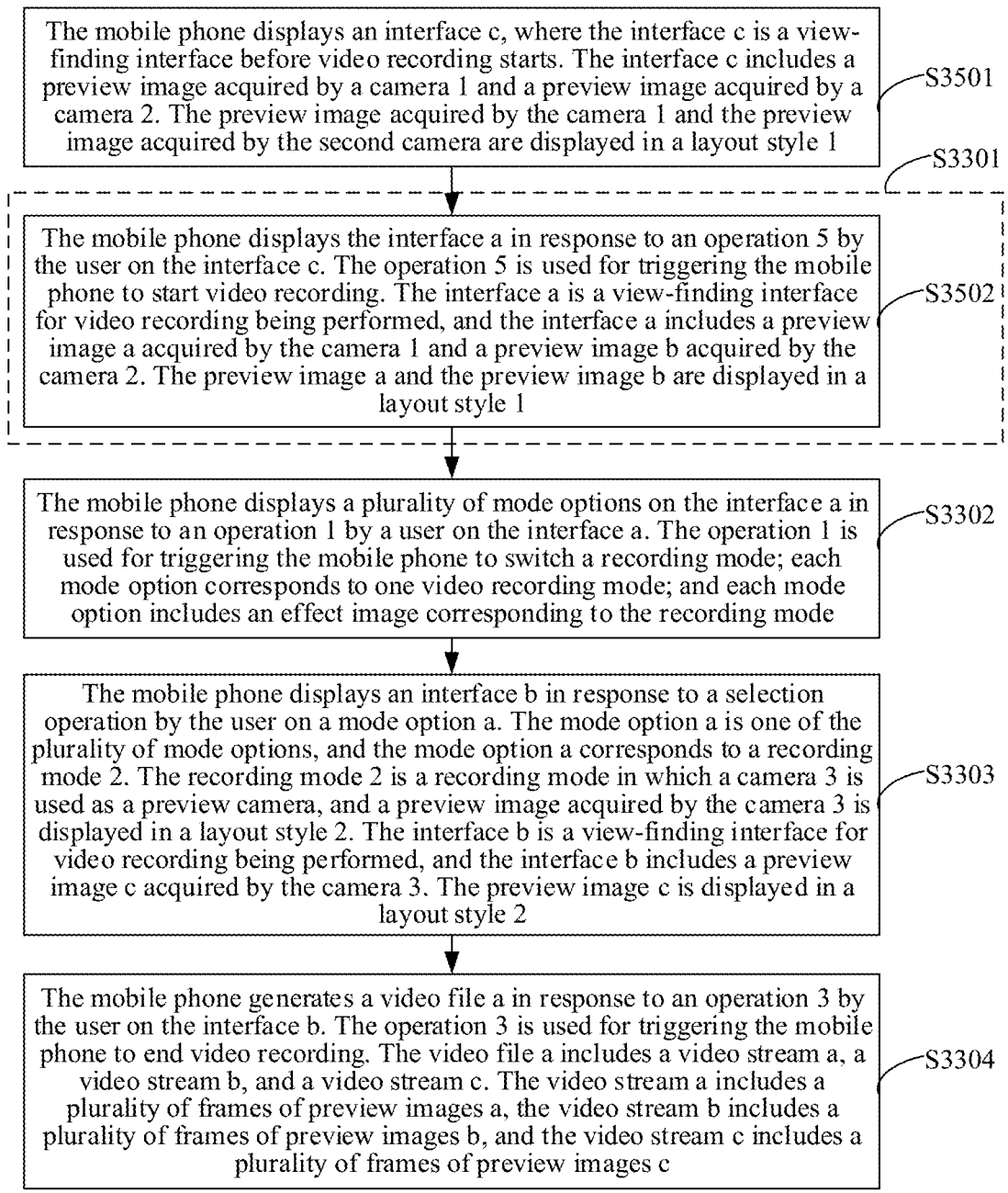
FIG. 35a is another flowchart of a video capturing method according to an embodiment of this application.

Corresponding to the first sub-case of Case 3, video recording starts in a recording mode of dual-lens video recording. An embodiment of this application provides a video capturing method. The method is applied to a mobile phone, and the mobile phone includes a plurality of cameras. Moreover, the phone can provide dual-lens video recording function. In this embodiment, a description is provided mainly based on switching the recording mode only once in the recording process, for example, switching from the recording mode 1 to the recording mode 2. Specifically, as shown in FIG. 35*a*, before S3301, the method further includes S3501, and S3301 further includes S3502:

S3501: The mobile phone displays an interface c, where the interface c is a view-finding interface before video recording starts. The interface c includes a preview image acquired by a camera 1 and a preview image acquired by a camera 2. The preview image acquired by the camera 1 and the preview image acquired by the second camera are displayed in a layout style 1.

In this embodiment, the recording mode is switched only once in the recording process. In other words, if the video recording starts in recording mode 1, view-finding for the interface c is also performed by adopting the recording mode 1.

S3502: The mobile phone displays the interface a in response to an operation 5 by the user on the interface c. The operation 5 is used for triggering the mobile phone to start video recording. The interface a is a view-finding interface for video recording being performed, and the interface a includes a preview image a acquired by the camera 1 and a preview image b acquired by the camera 2. The preview image a and the preview image b are displayed in a layout style 1.

Based on the above, by using the method in this embodiment of this application, in a complete recording process, the recording mode is switched once, so that a video file formed by video streams obtained through recording in two recording modes can be obtained.

Figures 2, 35B:
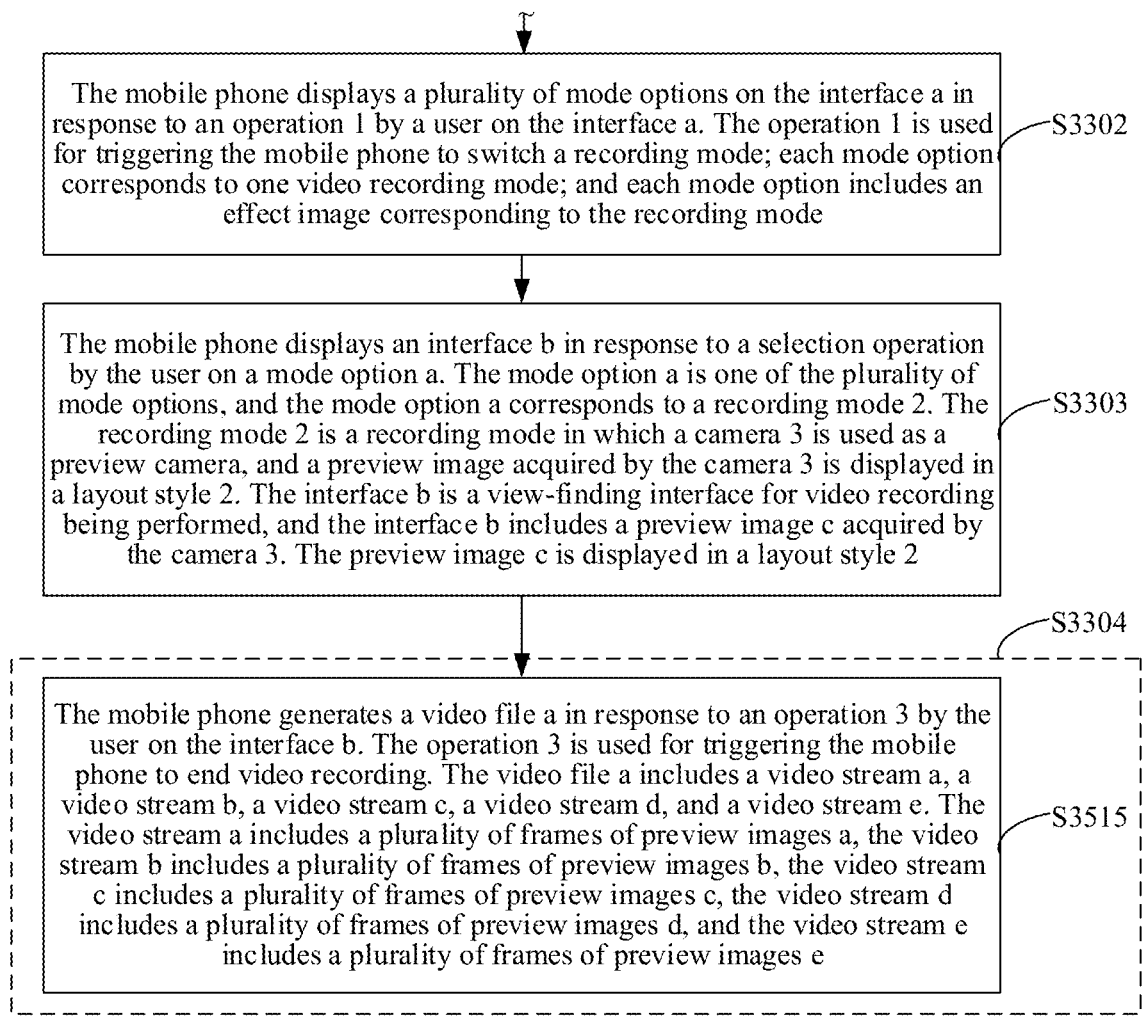

Corresponding to the first sub-case of Case 3, video recording starts in a recording mode of dual-lens video recording. An embodiment of this application provides a video capturing method. The method is applied to a mobile phone, and the mobile phone includes a plurality of cameras. Moreover, the phone can provide dual-lens video recording function. In this embodiment, a description is provided mainly based on switching the recording mode only twice in the recording process, for example, switching from the recording mode 3 to the recording mode 1, and then switching from the recording mode 1 to the recording mode 2. Specifically, as shown in FIG. 35*b*-1 and FIG. 35*b*-2, before S3301, the method further includes S3511 to S3513, S3301 further includes S3514, and S3304 further includes S3515:

S3511: The mobile phone displays an interface d, where the interface d is a view-finding interface before video recording starts. The interface d includes a preview image acquired by a camera 4 and a preview image acquired by a camera 5. The preview image acquired by the camera 4 and the preview image acquired by the camera 5 are displayed in a layout style 3.

S3512: The mobile phone displays an interface e in response to an operation 5 by the user on the interface d. The operation 5 is used for triggering the mobile phone to start video recording. The interface e is a view-finding interface for video recording being performed, and the interface e includes a preview image d acquired by the camera 4 and a preview image e acquired by the camera 5. The preview image d and the preview image e are displayed in a layout style 3.

S3513: The mobile phone displays a plurality of mode options on the interface e in response to an operation 1 by the user on the interface e. The operation 1 is used for triggering the mobile phone to switch a recording mode; each mode option corresponds to one video recording mode; and each mode option includes an effect image corresponding to the recording mode.

S3514: The mobile phone displays an interface a in response to a selection operation by the user on a mode option b. The mode option b is one of the plurality of mode options, and the mode option b corresponds to a recording mode 1. The recording mode 1 is a recording mode in which a camera 1 and a camera 2 are used as preview cameras, and a preview image acquired by the camera 1 and a preview image acquired by the camera 2 are displayed in a layout style 1. The interface a is a view-finding interface for video recording being performed, and the interface a includes a preview image a acquired by a camera 1 and a preview image b acquired by a camera 2. The preview image a and the preview image b are displayed on the interface a in a layout style 1.

For implementation of switching from the recording mode 3 to the recording mode 1 in S3513 and S3514, reference may be made to the switching from the recording mode 1 to the recording mode 2 in Case 1, both of which are switching from one recording mode of dual-lens video recording to another recording mode of dual-lens video recording. The implementation principle and process thereof are the same, and details are not described herein again.

S3515: The mobile phone generates a video file a in response to an operation 3 by the user on the interface b. The operation 3 is used for triggering the mobile phone to end video recording. The video file a includes a video stream a, a video stream b, a video stream c, a video stream d, and a video stream e. The video stream a includes a plurality of frames of preview images a, the video stream b includes a plurality of frames of preview images b, the video stream c includes a plurality of frames of preview images c, the video stream d includes a plurality of frames of preview images d, and the video stream e includes a plurality of frames of preview images e.

Figure 36:
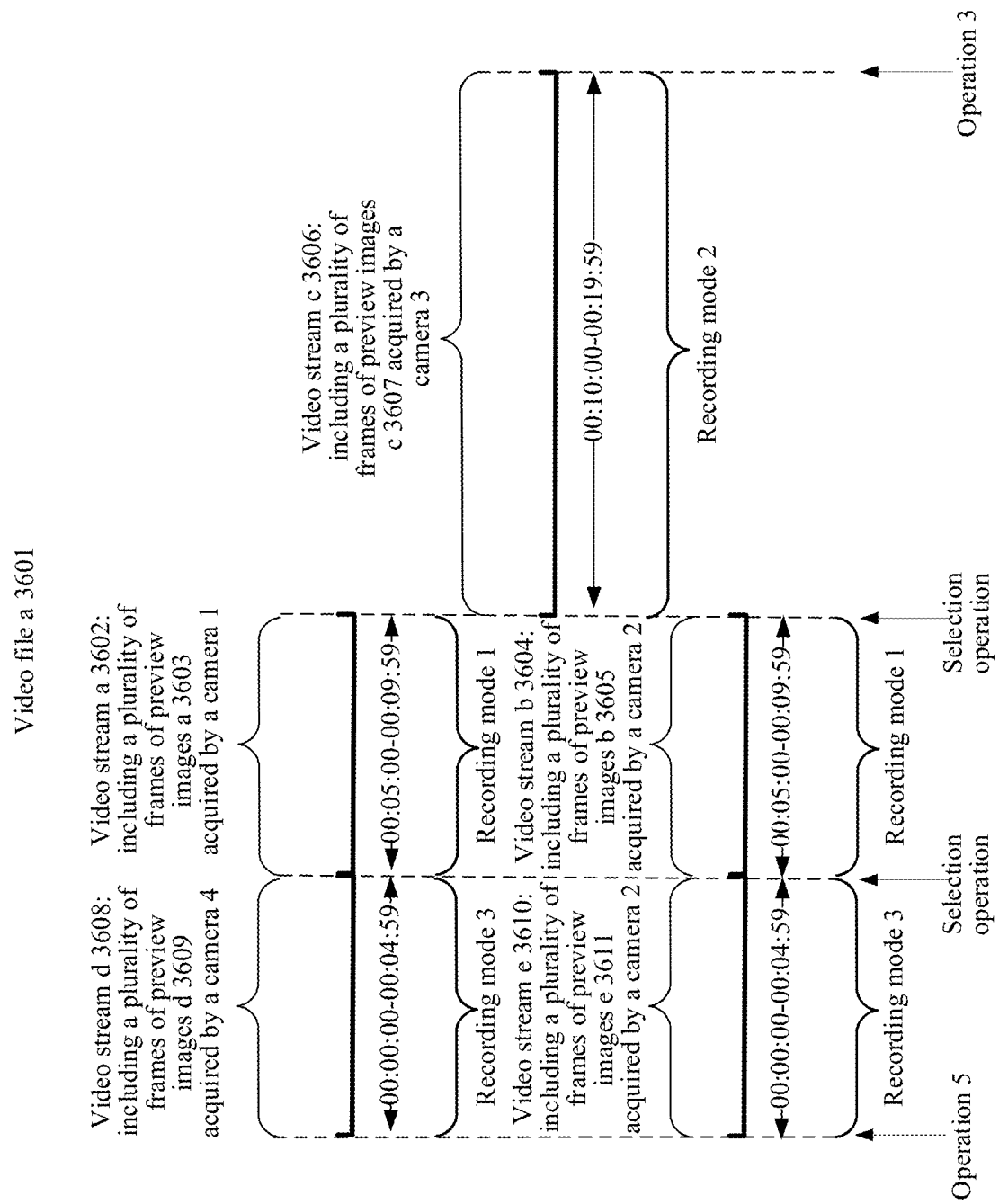
FIG. 36 is another schematic diagram of composition of a video file according to an embodiment of this application.

For example, as shown in FIG. 36, the mobile phone starts video recording in response to the user's operation 5, and timing starts at this time. Within the first 5 seconds from 00:00:00 (starting at second 0) to 00:04:59 (ending at second 4), the recording mode 3 is used for video recording, and the preview cameras of the recording mode 3 are the camera 4 and the camera 5. Within the 5 seconds, the camera 4 acquires a plurality of frames of preview images d3609 and displays the preview images on the interface e, and the camera 5 acquires a plurality of frames of preview images e 3611 and displays the preview images on the interface e. At 00:04:59 (or 00:05:00), the mobile phone switches the recording mode to the recording mode 1 in response to the user's selection operation on the mode option b, and the preview cameras of the recording mode 1 are the camera 1 and the camera 2. Subsequently, within the 5 seconds from 00:05:00 (starting at second 5) to 00:09:59 (ending at second 9), the camera 1 acquires a plurality of frames of preview images a3603 and displays the preview images on the interface a, and the camera 2 acquires a plurality of frames of preview images b3605 and displays the preview images on the interface a. At 00:09:59 (or 00:10:00), the mobile phone switches the recording mode to the recording mode 2 in response to the user's selection operation on the mode option a, and the preview camera of the recording mode 2 is the camera 3. Subsequently, within 10 seconds from 00:10:00 (starting at second 10) to 00:19:59 (ending at second 19), the camera 3 acquires a plurality of frames of preview images c3607 and displays the preview images on the interface b. At 00:19:59, the mobile phone generates video file a3601 in response to the user's operation 3, and the video file a3601 includes a video stream a3602, a video stream b3604, a video stream c3606, a video stream d3608, and a video stream e 3610. The video stream a3602 includes a plurality of frames of preview images a3603. The video stream b3604 includes a plurality of frames of preview images b3605. The video stream c3606 includes a plurality of frames of preview images c3607. The video stream d3608 includes a plurality of frames of preview images d3609. The video stream e 3610 includes a plurality of frames of preview images e 3611.

Based on the above, by using the method in this embodiment of this application, in a complete recording process, one recording mode of dual-lens video recording may be switched to another recording mode of dual-lens video recording, and then switched to a recording mode of single-lens video recording, so as to realize flexible switching between dual-lens video recording, and between dual-lens video recording and single-lens video recording. Finally, a video file formed by video streams obtained through recording in three recording modes can be obtained.

Figure 37A:
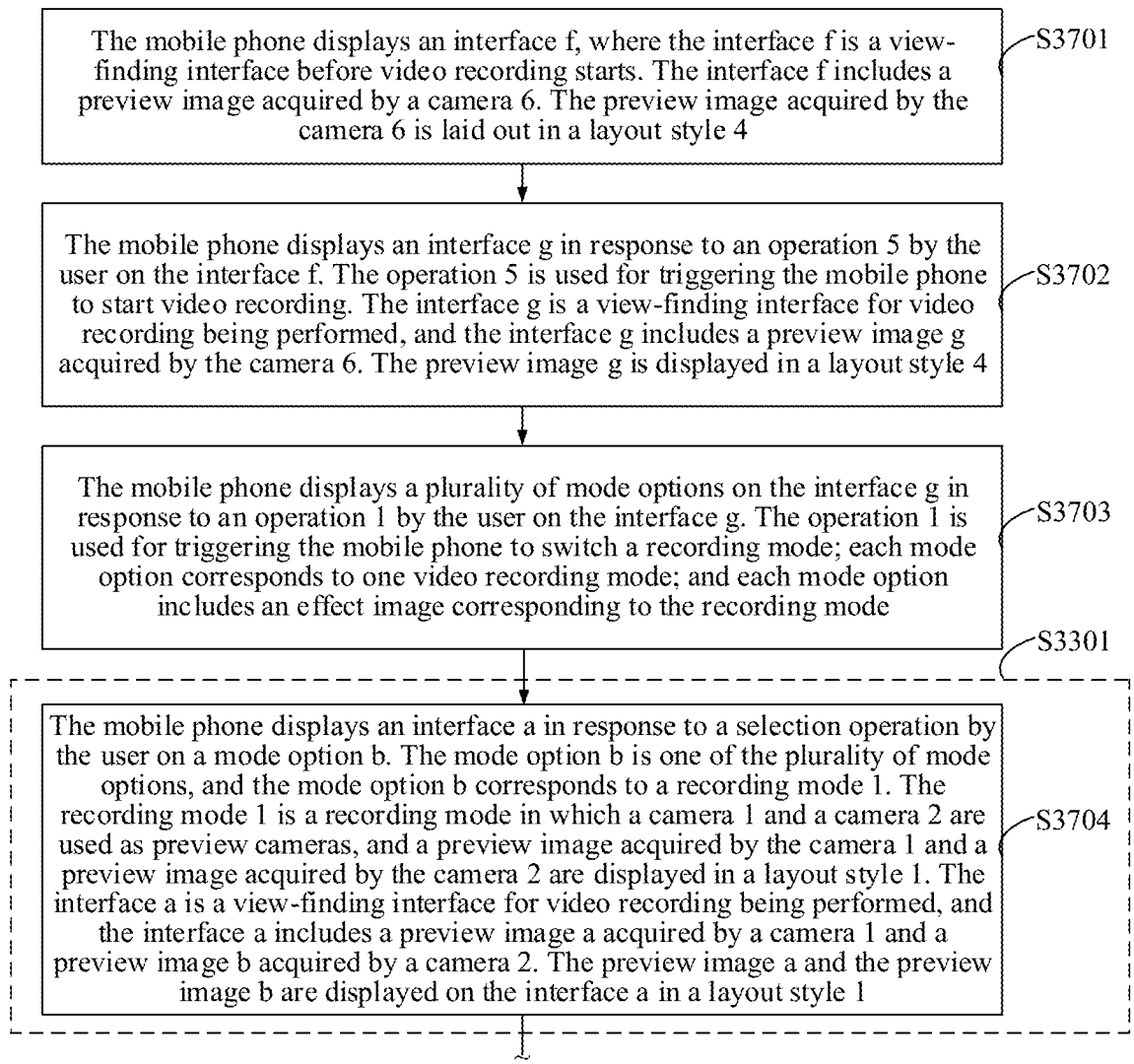

Corresponding to the second sub-case of Case 3, video recording starts in a recording mode of single-lens video recording. An embodiment of this application provides a video capturing method. The method is applied to a mobile phone, and the mobile phone includes a plurality of cameras. Moreover, the phone can provide dual-lens video recording function. In this embodiment, a description is provided mainly based on switching the recording mode only twice in the recording process, for example, switching from the recording mode 4 to the recording mode 1, and then switching from the recording mode 1 to the recording mode 2. Specifically, as shown in FIG. 37A and FIG. 37B, before S3301, the method further includes S3701 to S3703, S3301 further includes S3704, and S3304 further includes S3705:

S3701: The mobile phone displays an interface f, where the interface f is a view-finding interface before video recording starts. The interface f includes a preview image acquired by a camera 6. The preview image acquired by the camera 6 is laid out in a layout style 4.

S3702: The mobile phone displays an interface g in response to an operation 5 by the user on the interface f. The operation 5 is used for triggering the mobile phone to start video recording. The interface g is a view-finding interface for video recording being performed, and the interface g includes a preview image g acquired by the camera 6. The preview image g is displayed in a layout style 4.

The interface g may be referred to as a first interface, the camera 6 may be referred to as a first camera, the preview image g may be referred to as a first preview image, and the layout style 4 is a full screen layout.

S3703: The mobile phone displays a plurality of mode options on the interface g in response to an operation 1 by the user on the interface g. The operation 1 is used for triggering the mobile phone to switch a recording mode; each mode option corresponds to one video recording mode; and each mode option includes an effect image corresponding to the recording mode.

S3704: The mobile phone displays an interface a in response to a selection operation by the user on a mode option b. The mode option b is one of the plurality of mode options, and the mode option b corresponds to a recording mode 1. The recording mode 1 is a recording mode in which a camera 1 and a camera 2 are used as preview cameras, and a preview image acquired by the camera 1 and a preview image acquired by the camera 2 are displayed in a layout style 1. The interface a is a view-finding interface for video recording being performed, and the interface a includes a preview image a acquired by a camera 1 and a preview image b acquired by a camera 2. The preview image a and the preview image b are displayed on the interface a in a layout style 1.

For implementation of switching from the recording mode 4 to the recording mode 1 in S3703 and S3704, reference may be made to the switching from the recording mode 4 to the recording mode 1 in Case 1, both of which are switching from a recording mode of single-lens video recording to a recording mode of dual-lens video recording. The implementation principle and process thereof are the same, and details are not described herein again.

In a case that the mode option b is a mode option pointing to the front-rear dual-lens mode or a mode option pointing to the picture-in-picture dual-lens mode, the mode option b may also be referred to as a first option, and the camera 1 may be referred to as a second camera, the camera 2 may be referred to as a third camera, the preview image a may be referred to as a second preview image, the preview image b may be referred to as a third preview image, and the layout style 1 may be referred to as a first layout. If the first option is a mode option pointing to the front-rear dual-lens mode, the first layout is a split-screen layout; and if the first option is a mode option pointing to the picture-in-picture dual-lens mode, the first layout is a picture-in-picture layout.

S3705: The mobile phone generates a video file a in response to an operation 3 by the user on the interface b. The operation 3 is used for triggering the mobile phone to end video recording. The video file a includes a video stream a, a video stream b, a video stream c, and a video stream f. The video stream a includes a plurality of frames of preview images a, the video stream b includes a plurality of frames of preview images b, the video stream c includes a plurality of frames of preview images c, and the video stream f includes a plurality of frames of preview images f.

Figure 38:
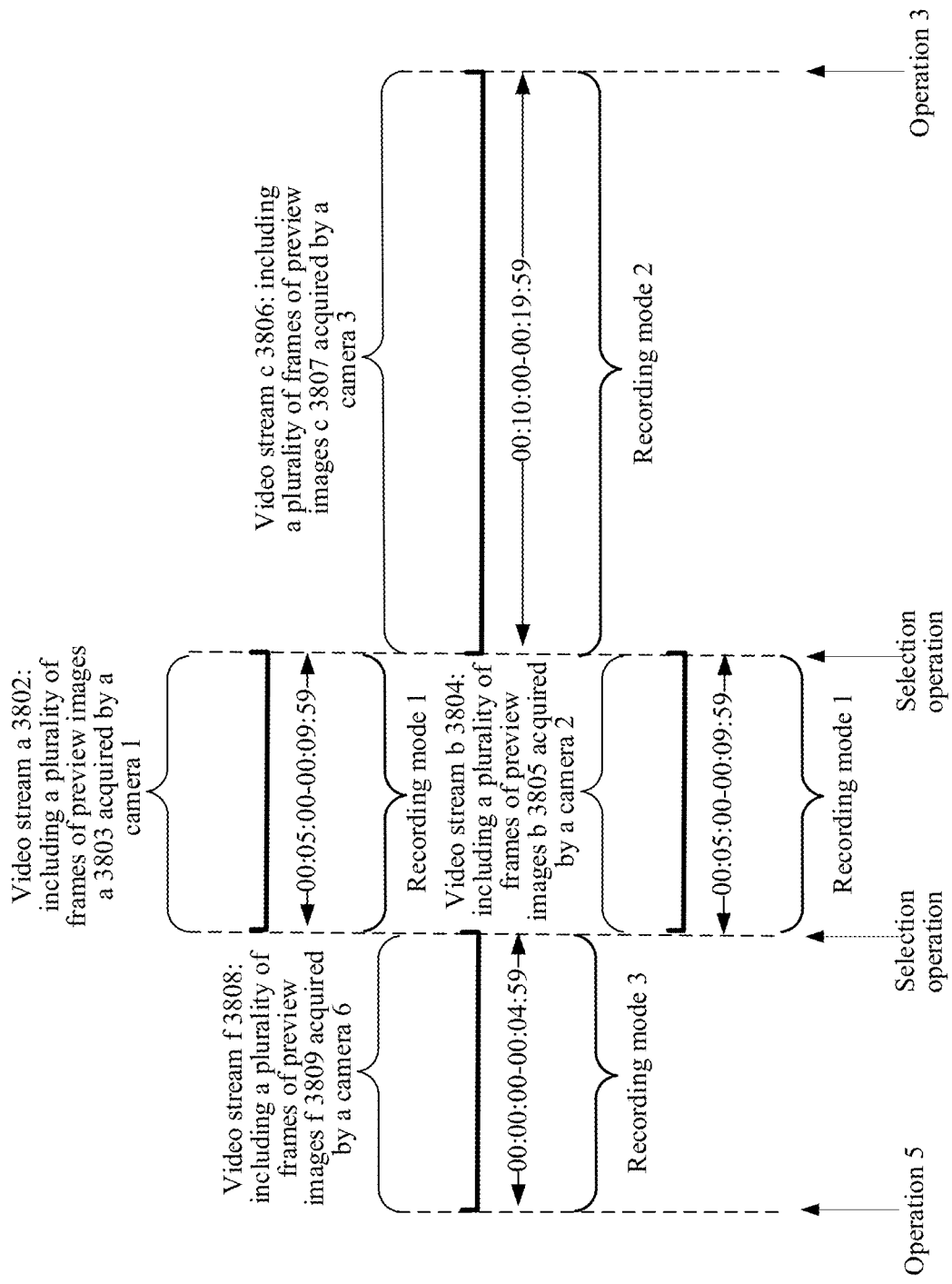
FIG. 38 is another schematic diagram of composition of a video file according to an embodiment of this application.

For example, as shown in FIG. 38, the mobile phone starts video recording in response to the user's operation 5, and timing starts at this time. Within the first 5 seconds from 00:00:00 (starting at second 0) to 00:04:59 (ending at second 4), the recording mode 4 is used for video recording, and the preview camera of the recording mode 4 is the camera 6. Within the 5 seconds, the camera 6 acquires a plurality of frames of preview images f 3809 and displays the preview images on the interface g. At 00:04:59 (or 00:05:00), the mobile phone switches the recording mode to the recording mode 1 in response to the user's selection operation on the mode option b, and the preview cameras of the recording mode 1 are the camera 1 and the camera 2. Subsequently, within the 5 seconds from 00:05:00 (starting at second 5) to 00:09:59 (ending at second 9), the camera 1 acquires a plurality of frames of preview images a3803 and displays the preview images on the interface a, and the camera 2 acquires a plurality of frames of preview images b3805 and displays the preview images on the interface a. At 00:09:59 (or 00:10:00), the mobile phone switches the recording mode to the recording mode 2 in response to the user's selection operation on the mode option a, and the preview camera of the recording mode 2 is the camera 3. Subsequently, within 10 seconds from 00:10:00 (starting at second 10) to 00:19:59 (ending at second 19), the camera 3 acquires a plurality of frames of preview images c3807 and displays the preview images on the interface b. At 00:19:59, the mobile phone generates video file a3801 in response to the user's operation 3, and the video file a3801 includes a video stream a3802, a video stream b3804, a video stream c3806, and a video stream f 3808. The video stream a3602 includes a plurality of frames of preview images a3603. The video stream b3604 includes a plurality of frames of preview images b3605. The video stream c3606 includes a plurality of frames of preview images c3607. The video stream f 3808 includes a plurality of frames of preview images f 3809.

Based on the above, by using the method in this embodiment of this application, in a complete recording process, a recording mode of single-lens video recording may be switched to a recording mode of dual-lens video recording, and then switched to a recording mode of single-lens video recording, so as to realize flexible switching between dual-lens video recording and single-lens video recording. Finally, a video file formed by video streams obtained through recording in three recording modes can be obtained.

It is to be noted that, in the above embodiment corresponding to Case 3, the process of switching recording modes for a plurality of times in the video recording process is described only by using switching the recording modes once or twice as an example, but it is not limited thereto in actual implementation. For example, between the recording mode 3 and the recording mode 1, recording mode switching can also be performed. In another example, between the recording mode 4 and the recording mode 1, recording mode switching can also be performed. The recording mode switching may include switching between recording modes of dual-lens video recording and/or recording modes of single-lens video recording, and the switching may be performed for one or more times. Details are not listed in this specification.

Corresponding to Case 4, this case includes switching from one recording mode of single-lens video recording to another recording mode of single-lens video recording, and switching from one recording mode of single-lens video recording to another recording mode of single-lens video recording may alternatively be implemented by calling out a plurality of mode options on the view-finding interface of one recording mode of single-lens video recording, and then selecting a mode option pointing to another recording mode of single-lens video recording from the plurality of mode options. The switching process is similar to the switching process from a recording mode of single-lens video recording to a recording mode of dual-lens video recording, and only the template option selected by the user is different, which will not be described herein again.

Similarly, in Case 4, there may also be a plurality of times of switching. Various switching manners have been mentioned above, and details are not described herein again.

So far, it is to be noted that, in the foregoing embodiments, the manner of switching recording modes provided in the embodiments of this application is mainly described based on the switching in the recording process. In some other embodiments, switching may alternatively be performed for one or more times before video recording starts. In other words, each view-finding interface (such as the interface a or the interface b) involved in the foregoing embodiments may alternatively be a view-finding interface for video recording before the mobile phone starts video recording. Alternatively, in some other embodiments, switching can be performed both before recording starts and during recording. This is not specifically limited in this embodiment of this application.

In the foregoing embodiments, descriptions are mainly made in the manner of displaying a plurality of mode options for the user to select and switch recording modes.

In some embodiments, in order to further improve the convenience of switching, the following switching manners are further provided:

Manner 1: Use the control d to trigger switching of the recording mode of single-lens video recording. Specifically, the view-finding interface of single-lens video recording includes a control d, and the control d is configured to trigger the mobile phone to switch between the front camera and the rear camera. This manner has been described in detail in S2203 above, and details are not described herein again.

Manner 2: Use the control d to trigger switching from the front-rear dual-lens mode to the rear-rear dual-lens mode. Specifically, the view-finding interface of the front-rear dual-lens mode includes a control d, and the control d is configured to trigger the mobile phone to switch the front camera in the front-rear dual-lens mode to the rear camera. In a case that the view-finding interface (such as any one of the interfaces a to g above) is a view-finding interface in the front-rear dual-lens mode, the view-finding interface includes a control d. The mobile phone can receive the user's operation 6 on the control d. In response to the operation 6, the mobile phone can switch the front camera in the front-rear dual-lens mode to the rear camera, and display the view-finding interface h in the rear-rear dual-lens mode. In this way, the flexible switching from the front-rear dual-lens mode to the rear-rear dual-lens mode is realized. Alternatively, in response to the operation 6, the mobile phone can switch the rear camera in the front-rear dual-lens mode to the front camera, and display the view-finding interface h of a front-front (for example, two front cameras) dual-lens mode. In this way, the flexible switching from the front-rear dual-lens mode to the front-front dual-lens modes is realized. The control d on the view-finding interface of the front-rear dual-lens mode may be referred to as a fourth control.

In other words, in a case that the layout currently adopted by the mobile phone is a split-screen layout or a picture-in-picture layout, and the preview cameras currently adopted by the mobile phone include a front camera and a rear camera, the view-finding interface for video recording by the mobile phone video further includes a control d. The control d is configured to trigger the mobile phone to switch to use two front camera recordings or two rear camera for video recording.

Case 1 is used as an example. It is assumed that the recording mode 1 is the front-rear dual-lens mode, then the interface a is a view-finding interface of the front-rear dual-lens mode. The camera 1 may be the rear main camera, and the camera 2 may be the front camera. The layout style 1 is a top-bottom layout. The interface a may be an interface a3901 shown in (a) of FIG. 39. The interface a3901 includes a preview image 3902 acquired by the rear main camera and a preview image 3903 acquired by the front camera. The interface a3901 further includes a control d3904, and the control d3904 is configured to trigger the mobile phone to switch the front camera in the front-rear dual-lens mode to the rear camera. The mobile phone can receive the user's click/tap operation on the control d3904. In response to the user's click/tap operation on the control d3904, the mobile phone switches the front camera to the rear telephoto camera and then displays the interface h3905 shown in (b) of FIG. 39. The interface h3905 is a view-finding interface of the rear-rear dual-lens mode. The interface h3905 includes a preview image 3906 acquired by the rear main camera and a preview image 3907 acquired by the rear telephoto camera. Moreover, the interface h3905 is neither a view-finding interface for a recording mode of single-lens video recording nor a view-finding interface for the front-rear dual-lens mode, so that the interface h3905 includes a control d. It should be understood that, the interfaces b to g in Cases 1 to 3 are based on the same principle, and will not be repeated herein.

In some other embodiments, in order to further improve the switching accuracy, the following switching manners are further provided:

Manner 1: Use the control e to trigger the switching of the rear camera. Specifically, in a case that the preview cameras in the recording mode include a rear camera, the view-finding interface of the recording mode (such as any one of the interfaces a to g above) includes a control e, and the control e is configured to trigger the mobile phone to perform zoom adjustment. The recording modes corresponding to that the preview cameras include the rear camera include: the front-rear dual-lens mode, the rear-rear dual-lens mode, the picture-in-picture mode, or the rear single-lens mode. Generally, the control e is displayed in a display region of the preview image acquired by the rear camera on the view-finding interface. The control e may also be referred to as a fifth control.

In other words, in a case that the preview cameras currently adopted by the mobile phone include a rear camera, the view-finding interface for video recording by the mobile phone also includes a control e. The control e is configured to trigger the mobile phone to switch the currently adopted rear camera to another rear camera included in the mobile phone.

Figure 39:
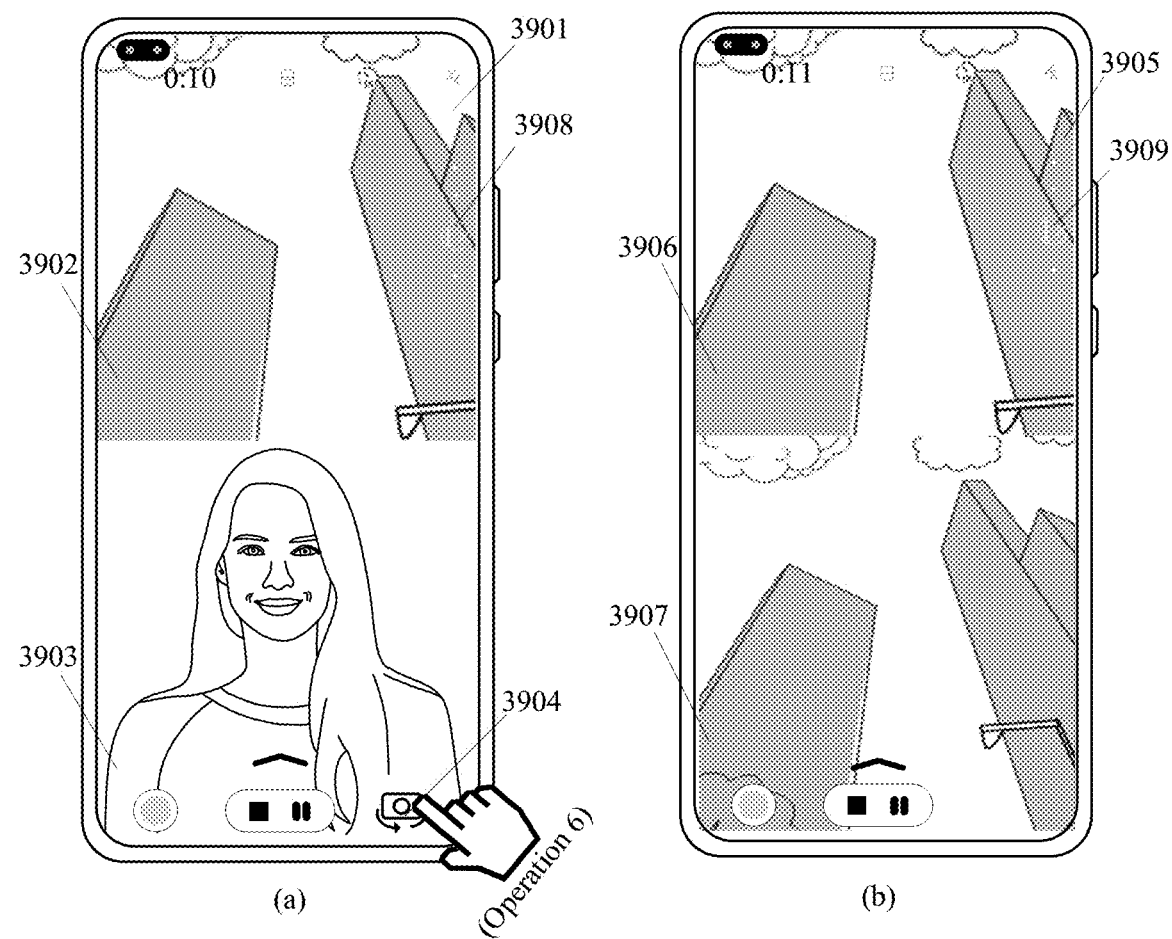
FIG. 39 is another schematic diagram of a view-finding interface for dual-lens video recording in a portrait form according to an embodiment of this application.

For example, on the view-finding interface of the front-rear dual-lens mode, the control e may be a control e 3908 shown in (a) of FIG. 39. On the view-finding interface of the rear-rear dual-lens mode, the control e may be a control e 3909 shown in (b) of FIG. 39. It should be noted that, the forms of the control e 3908 and the control e 3909 are exemplary, and are not limited thereto in actual implementation. For example, the control e may alternatively be a plurality of option buttons corresponding to a plurality of rear cameras. In another example, the control e may also be an adjustment button.

The mobile phone can receive the user's operation 7 on the control e. The operation 7 may be a sliding operation, a click/tap operation, or a long press operation. In response to the operation 7, the mobile phone can switch a current rear camera m to a rear camera n, and display a view-finding interface i after switching. The view-finding interface i includes a preview image acquired by the rear camera n.

Case 1 is used as an example. It is assumed that the recording mode 1 is the front-rear dual-lens mode, the interface a is a view-finding interface of the front-rear dual-lens mode. The camera 1 may be the rear main camera, and the camera 2 may be the front camera. The operation 7 is a sliding operation on the control e. The interface a may be an interface a4001 shown in (a) of FIG. 40. The interface a4001 includes a preview image 4002 acquired by the rear main camera and a preview image 4003 acquired by the front camera. The interface a4001 further includes a control e 4004, and the control e 4004 is configured to trigger the mobile phone to perform zoom adjustment. In response to the user's sliding operation on the control e 4002, the mobile phone can display an interface i 4005 shown in (b) of FIG. 40. The interface i 4005 is also a view-finding interface of the front-rear dual-lens mode, but the camera 1 is switched to a rear 2× wide-angle camera. In other words, the interface i 4005 includes a preview image 4007 acquired by the rear 2× wide-angle camera and a preview image 4008 acquired by the front camera. It should be understood that, the interfaces b to g in Cases 1 to 3 are based on the same principle, and will not be repeated herein.

Figure 40:
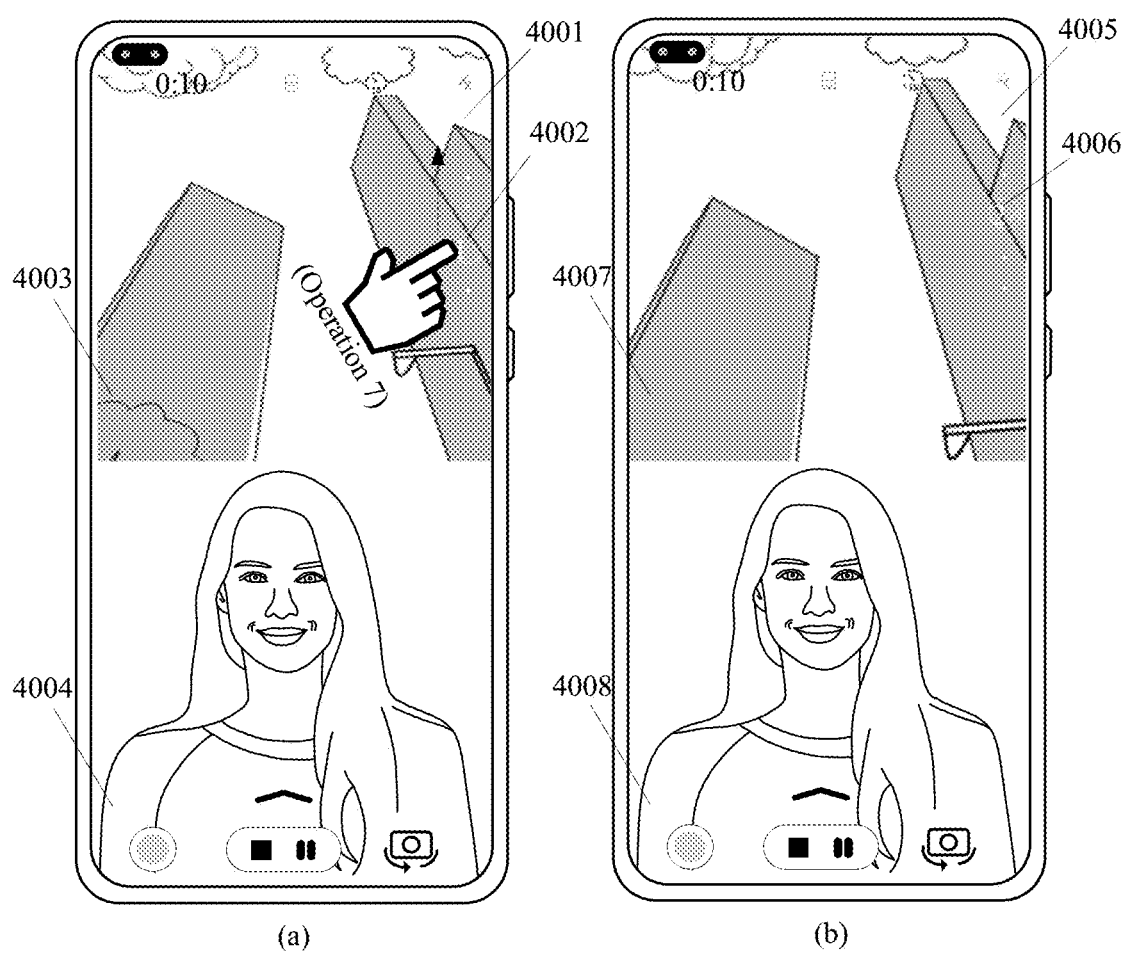
FIG. 40 is another schematic diagram of a view-finding interface for dual-lens video recording in a portrait form according to an embodiment of this application.

In some embodiments, in a case that the operation 7 is a sliding operation, the mobile phone can determine the rear camera after switching according to the displacement of the sliding operation. For example, if the control e 4002 shown in (a) of FIG. 40 is slid upward from the position of 1 times (such as "1×") focal length, the displacement is positive, and the displacement is negative when the control is slid downward. During sliding upward, a greater displacement indicates that a wide-angle camera with a larger magnification is switched to. During sliding downward, a telephoto camera is switched to.

Furthermore, because the rear camera of the mobile phone is limited, when the mobile phone detects that the displacement of the sliding operation exceeds a preset displacement value, the camera is no longer switched, but digital zooming is performed. Optical zoom refers to zooming in or zooming out the preview image acquired by the rear camera, and displaying the processed image on the view-finding interface. In other words, in response to the operation 7, the mobile phone needs to determine whether the displacement of the sliding operation is less than the preset displacement value. If the displacement is less than the preset displacement value, the current rear camera m is switched to the rear camera n according to the displacement of the sliding operation. If the displacement is not less than the preset displacement value, the preview image acquired by the rear camera n is zoomed in or zoomed out according to the displacement of the sliding operation.

In some other embodiments, in a case that operation 7 is a long press operation, the mobile phone can determine the rear camera after switching according to the duration of the long press operation. Alternatively, in some other embodiments, in a case that operation 7 is a click/tap operation, the mobile phone can determine the rear camera after switching according to the clicked/tapped button. For example, the 2× zoom button is clicked/tapped, then the 2× rear wide-angle camera is switched to. The 4× zoom button is clicked/tapped, then the 4× rear wide-angle camera is switched to. The 0.5× zoom button is clicked/tapped, then the rear telephoto camera is switched to.

The control e can also be configured to indicate the rear camera currently adopted by the mobile phone. For example, "1×" in the control e 4002 shown in (a) of FIG. 40 may indicate that the rear camera currently adopted by the mobile phone is the rear main camera. "2×" in the control e 4006 shown in (b) of FIG. 40 may indicate that the rear camera currently adopted by the mobile phone is a rear 2× wide-angle camera.

Manner 2: Trigger the switching of the rear camera through finger zooming. For example, opening of fingers triggers switching to the rear wide-angle camera. A higher opening degree indicates that a rear wide-angle camera with a larger magnification is switched to. Pinching of fingers triggers switching to the telephoto camera.

It should be noted that, if there are a plurality of front cameras, the switching of the front cameras may alternatively be triggered through the control e or finger zooming.

In this embodiment of this application, in addition to the manner of triggering entry into dual-lens video recording through the multi-lens video recording tab (tab) in the camera application, a manner of triggering entry into dual-lens video recording through the control f of the view-finding interface of common video recording is further provided. The control f is displayed on the view-finding interface of common video recording, and the mobile phone can display the view-finding interface of dual-lens video recording in response to the user's operation 8 on the control f. The operation 8 may be a click/tap operation or a long press operation or the like. In this way, the function of dual-lens video recording can be integrated into common video recording. Therefore, the fusion degree of dual-lens video recording and common video recording can be improved.

In some embodiments, in response to the user's operation 8 on the control f, the mobile phone can display a plurality of mode options in the current view-finding interface, and the plurality of mode options usually only include the mode options for dual-lens video recording.

Figure 41A:
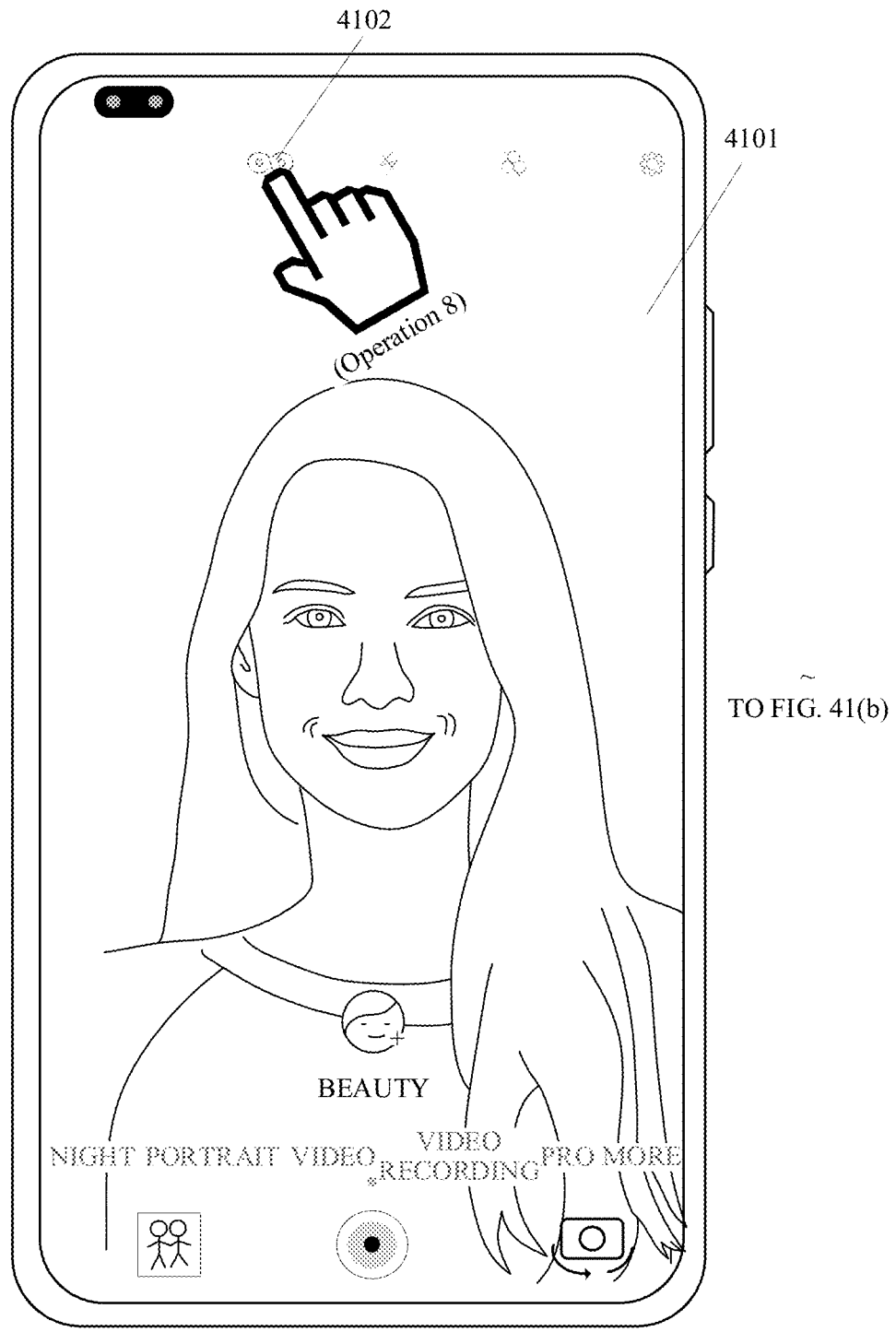
FIG. 41(a) and FIG. 41(b) are another schematic diagram of a view-finding interface for dual-lens video recording in a portrait form according to an embodiment of this application.
Figure 41B:
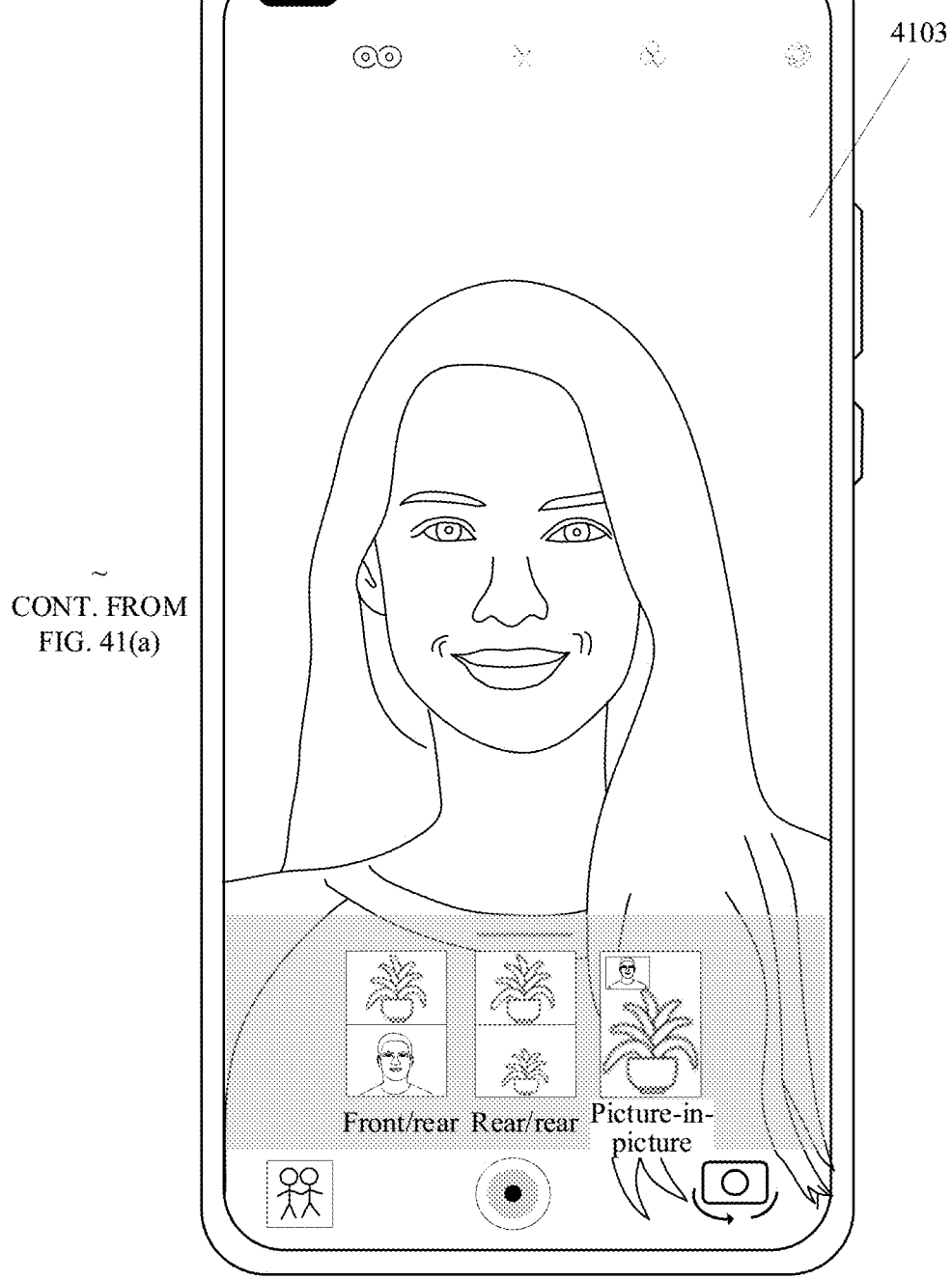

For example, the operation 8 is a click/tap operation on the control f After entering the common video recording function, the mobile phone displays the view-finding interface 4101 shown in FIG. 41(*a*). The view-finding interface 4101 is the view-finding interface before video recording starts. The view-finding interface 4101 includes a control f 4102. The control f 4102 is configured to trigger the mobile phone to enter dual-lens video recording. The mobile phone can receive the user's click/tap operation on the control f 4102. In response to the user's click/tap operation on the control f 4102, the mobile phone can display the view-finding interface 4103 shown in FIG. 41(*b*). The view-finding interface 4103 is the view-finding interface before video recording starts. The view-finding interface 4103 includes a plurality of mode options.

Subsequently, in response to the user's selection operation on one of the mode options, the mobile phone can enter the view-finding interface of dual-lens video recording, and display the view-finding interface corresponding to the recording mode. The process of entering dual-lens video recording from common video recording is similar to the foregoing process of switching from a recording mode of common video recording to a recording mode of dual-lens video recording. For details, reference may be made to the description of the relevant part above, and details are not described herein again. It should be noted that, there is a certain difference in the triggering manners of the two. Entering from common video recording to dual-lens video recording is triggered by an operating 8 on the control f, while switching from a recording mode of single-lens video recording to a recording mode of dual-lens video recording is triggered by an operation 1. In some embodiments, the operation 8 on the control f may also be referred to as an operation 1. In this case, the interface displayed by the mobile phone by enabling the common video recording function of the camera application can be regarded as the view-finding interface of the recording mode of the single-lens video recording. For example, the interface of the common video recording function is regarded as an interface a (also referred to as the first interface) in Case 2. Subsequently, switching recording modes can be started from this interface.

The above example is described based on entering dual-lens video recording before video recording. In actual implementation, dual-lens video recording can also be entered during video recording.

Figure 42A:
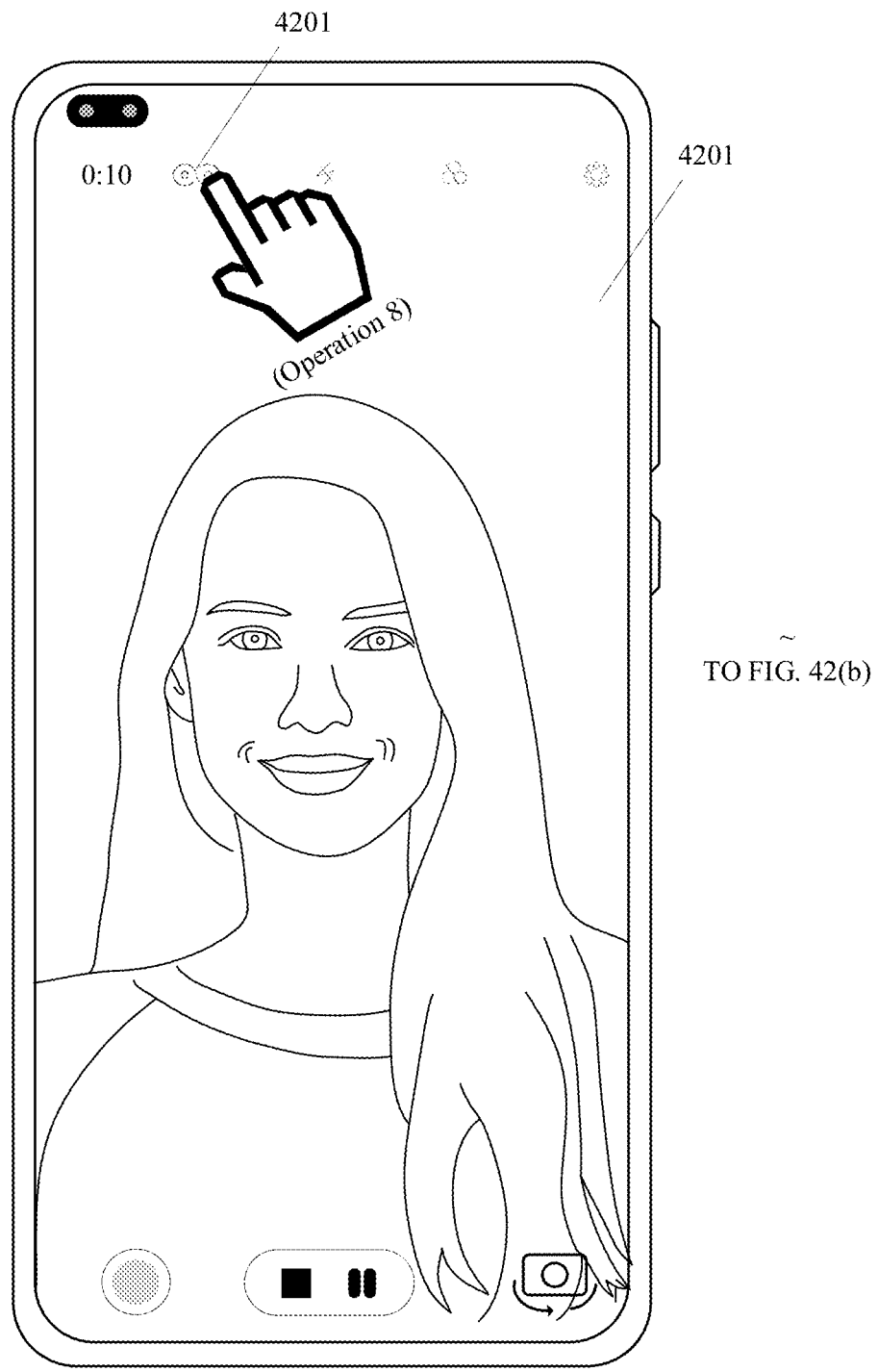
FIG. 42(a) and FIG. 42(b) are another schematic diagram of a view-finding interface for dual-lens video recording in a portrait form according to an embodiment of this application.
Figures 42A, 42B:
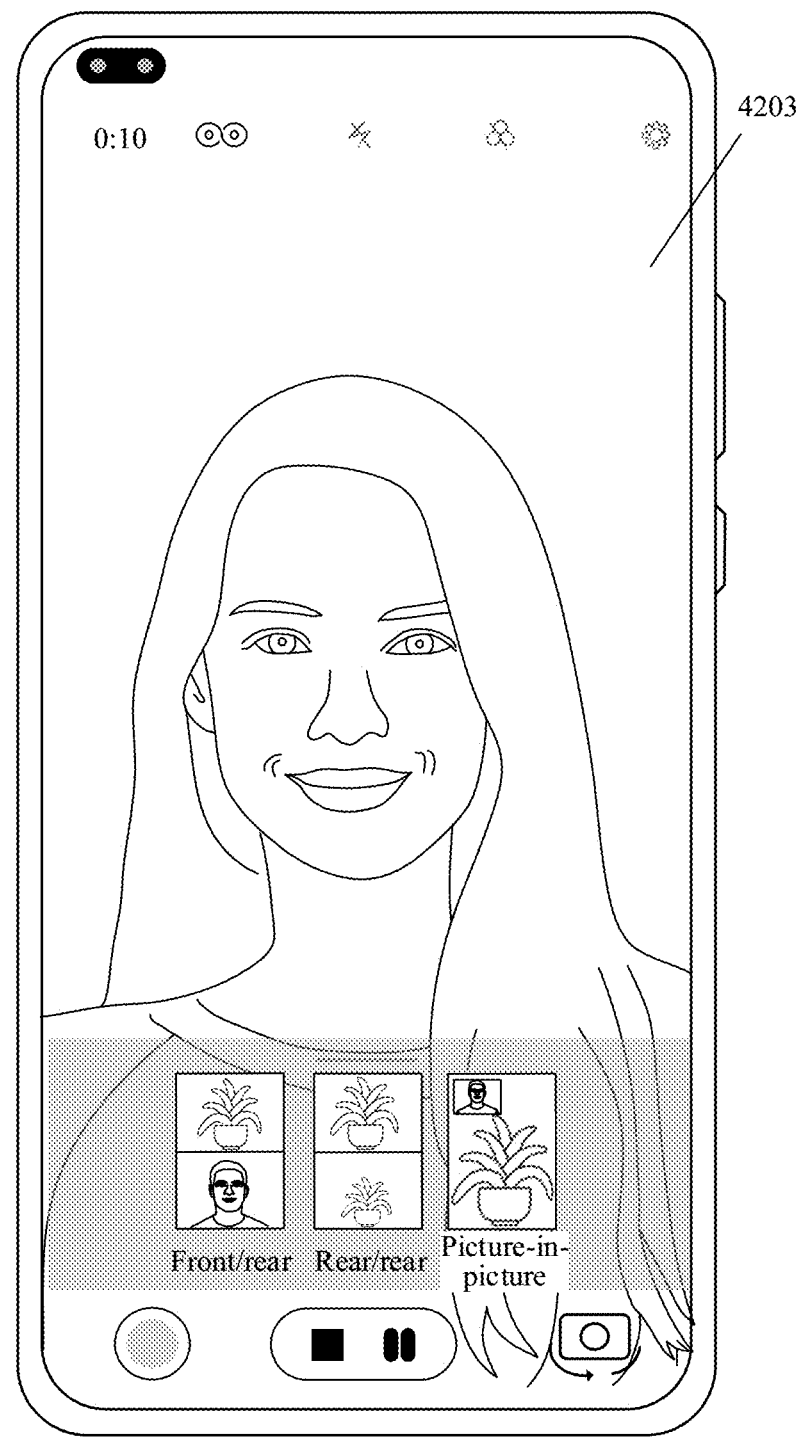

For example, the operation 8 is a click/tap operation on the control f After entering the common video recording function, the mobile phone displays the view-finding interface 4201 shown in FIG. 42(a). The view-finding interface 4201 is a view-finding interface for video recording being performed. The view-finding interface 4201 includes a control f 4202. The control f 4202 is configured to trigger the mobile phone to enter dual-lens video recording. The mobile phone can receive the user's click/tap operation on the control f 4202. In response to the user's click/tap operation on the control f 4202, the mobile phone can display the view-finding interface 4203 shown in FIG. 42(b). The view-finding interface 4203 is a view-finding interface for video recording being performed. The view-finding interface 4203 includes a plurality of mode options.

In addition, in some embodiments, in order to guide the user to trigger switching of the recording mode, after the user triggers the multi-lens video recording tab for the first time, the mobile phone will display prompt information to prompt to switch the recording mode. The key switching operation is mainly prompted. In this way, the experience of man-machine interaction can be improved.

Figure 43A:
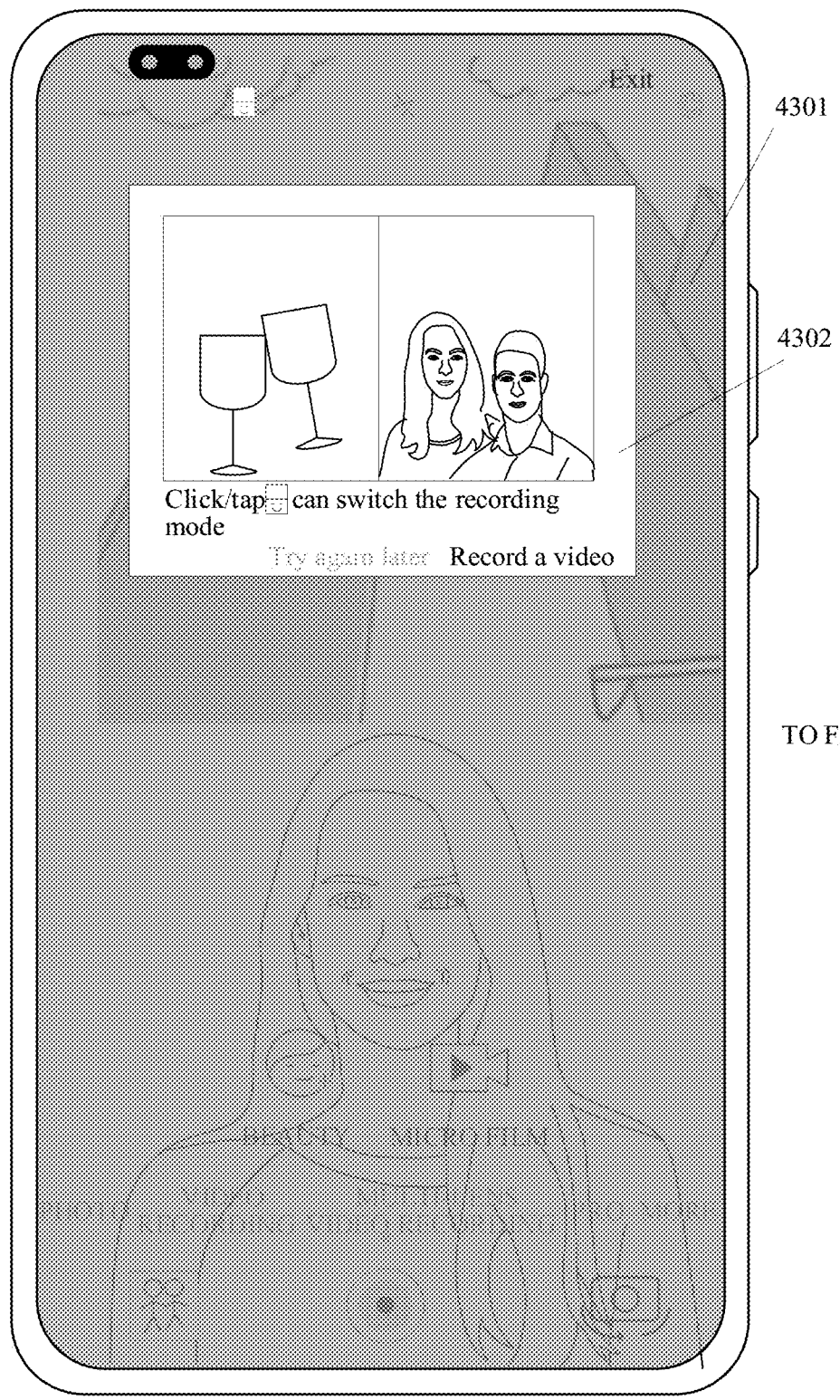
FIG. 43(a), FIG. 43(b), and FIG. 43(c) are another schematic diagram of a view-finding interface for dual-lens video recording in a portrait form according to an embodiment of this applications.

For example, the mobile phone displays the view-finding interface 4301 of the multi-lens video recording shown in FIG. 43(a) in response to the user's triggering on the multi-lens video recording tab for the first time. It should be noted that, in the guiding process for the first use, a strong reminder will be realized by adding a mask to the view-finding interface and displaying prompt information on the mask. The view-finding interface 4301 includes prompt information 4302, and the prompt information 4301 is used for prompting to trigger switching of the recording mode. The prompt information 4302 includes an effect video, a text prompt, and operation options. The effect video is used for indicating the effect of the video obtained through recording by switching the recording mode. The text prompt is used for prompting the entry that triggers the switching of the recording mode. For example, the text prompt information may be "click/tap (switch identifier) to switch the recording mode" shown in FIG. 43(a). The operation options further include a first option and a second option, the first option is used for triggering the exit of the guiding, and the second option is used for triggering the continuation of the guiding. For example, the first option may be the "try again later" button shown in FIG. 43(a), and the second option may be the "record a segment" button shown in FIG. 43(a), that is, the second option.

Figure 43B:
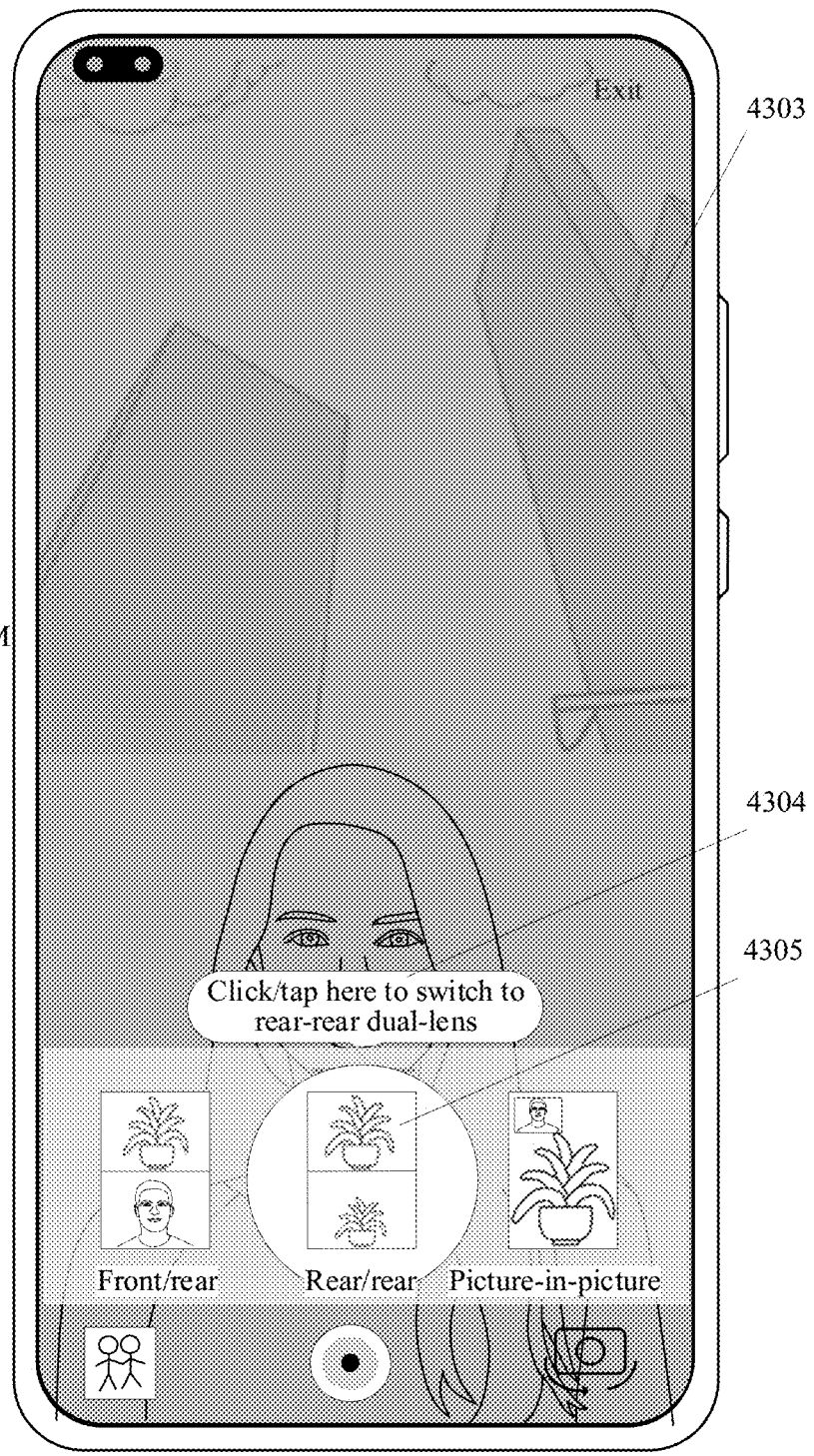

In response to the user's click/tap operation on the second option shown in FIG. 43(a), the mobile phone may display a view-finding interface 4303 for multi-lens video recording shown in FIG. 43(b). The view-finding interface 4303 includes prompt information 4304, and the prompt information 4304 is used to prompt the operation of selecting a recording mode. For example, the content of the prompt information 4304 may specifically be "Click/tap here to switch to rear-rear dual-lens". Moreover, on the view-finding interface 4303 of the multi-lens video recording, only the mode option to which the prompt information 4304 points is in an operable state, and can respond to the user's click/tap operation, for example, a mode option 4305 of the rear-rear dual-lens mode shown in FIG. 43(a).

Figure 43C:
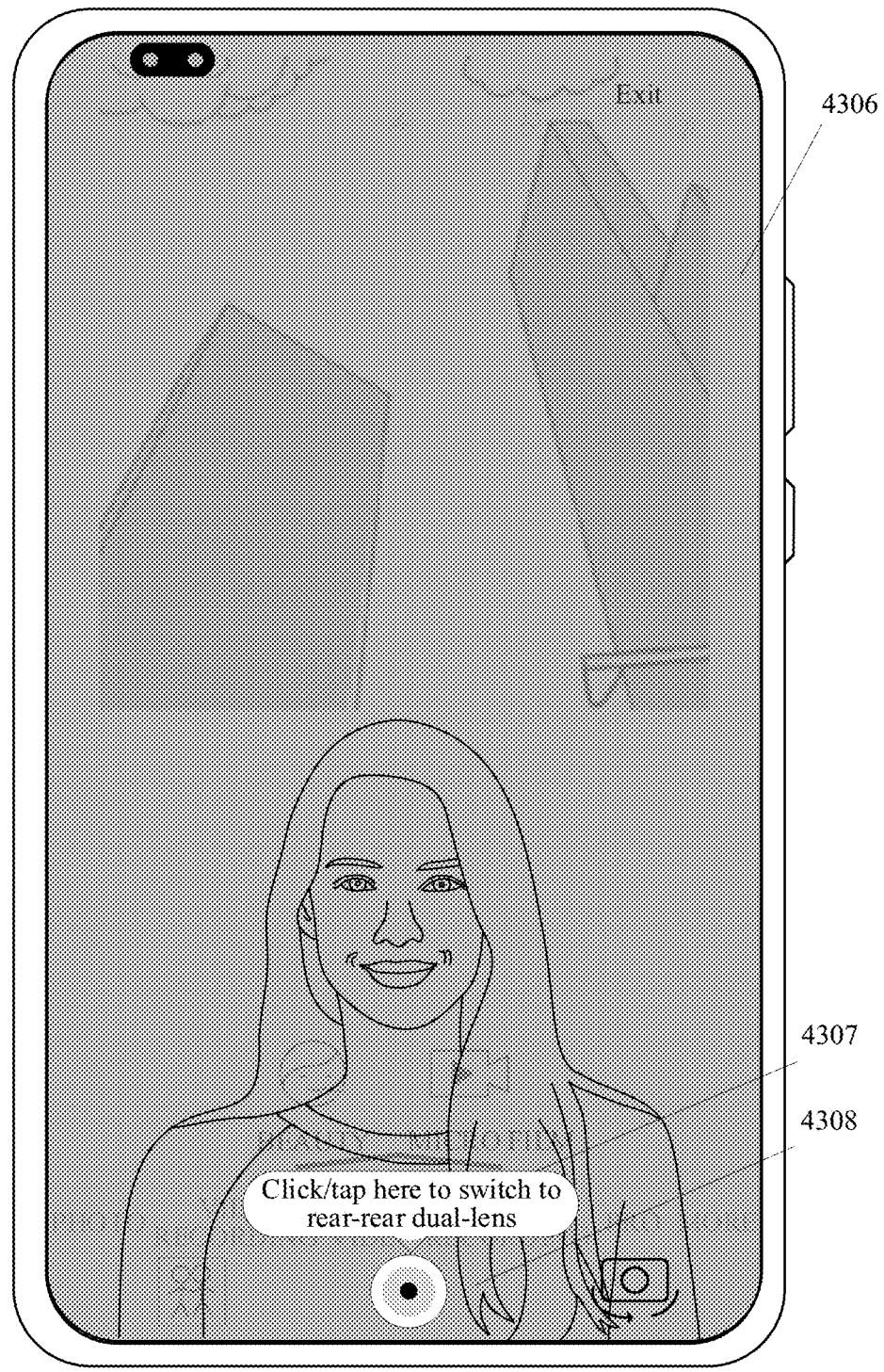

In response to the user's click/tap operation on the mode option 4305 shown in FIG. 43(b), the mobile phone may display a view-finding interface 4306 shown in FIG. 43(c). The view-finding interface 4306 includes prompt information 4307. The prompt information 4307 is used to prompt to trigger the start of video recording. For example, the content of the prompt information 4307 may specifically be "Click/tap here to switch to rear-rear dual-lens". Moreover, on the view-finding interface 4306, only the video recording start control to which the prompt information 4307 points is in an operable state, and can respond to the user's click/tap operation, for example, the video recording start control 4308 shown in FIG. 43(c).

Subsequently, the mobile phone can enter video recording in response to the user's click/tap operation on the video recording start control 4308. In the subsequent process, key switching operations can also be prompted, and examples will not be given herein.

It should be noted that, after the multi-lens video recording tab is triggered not for the first time, for example, if the function of switching the recording mode has not been used for a long time, the mobile phone may also prompt the user to switch the recording mode. However, different from the first prompt, for the non-first triggering of the multi-lens video recording tab, it is mainly a prompt for the operation steps other than the key switching operation. Therefore, the user experience can be improved.

Figure 44:
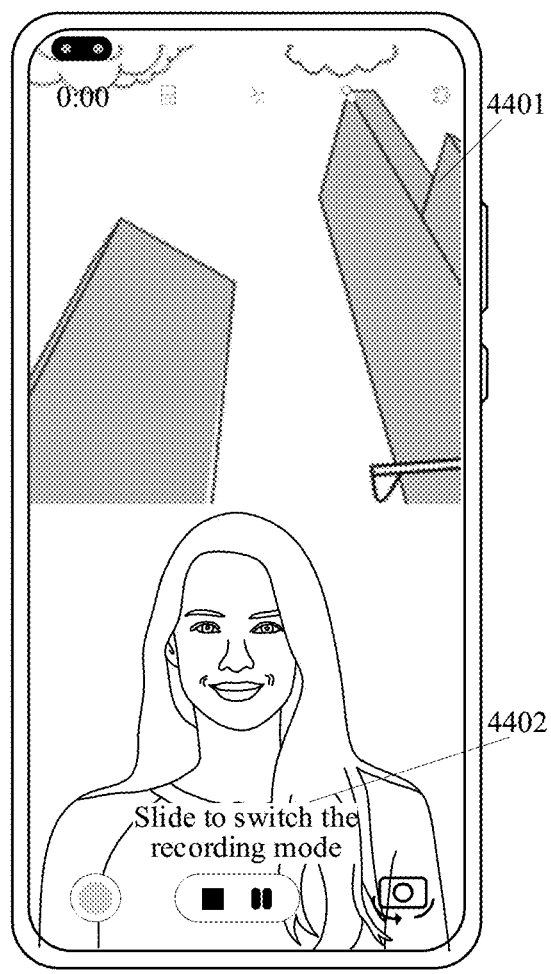
FIG. 44 is another schematic diagram of a view-finding interface for dual-lens video recording in a portrait form according to an embodiment of this application.

For example, the mobile phone may display the view-finding interface 4401 for video recording being performed shown in FIG. 44. The view-finding interface 4401 includes prompt information 4402. The prompt information 4402 is used to prompt the user to call out a plurality of mode options, for example, the specific time of the content of the prompt information "slide to switch the recording mode".

Some other embodiments of this application provide an electronic device. The electronic device may include: the foregoing plurality of cameras, a display screen (for example, a touch screen), a memory, and one or more processors. The display screen and the memory are coupled to the processor. The memory is configured to store computer program code, where the computer program code includes computer instructions. When the processor executes the computer instructions, the electronic device can execute various functions or steps executed by the mobile phone in the foregoing method embodiments. For a structure of the electronic device, reference may be made to the structure of the electronic device 500 shown in FIG. 5.

Figure 45:
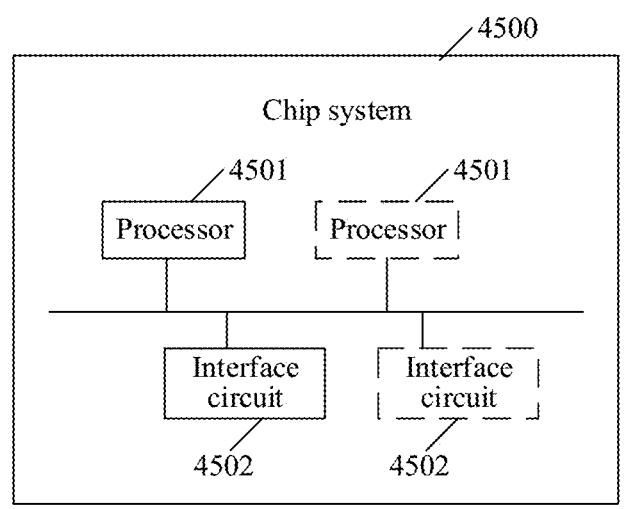
FIG. 45 is a schematic structural diagram of a chip system according to an embodiment of this application.

An embodiment of this application further provides a chip system. As shown in FIG. 45, the chip system 4500 includes at least one processor 4501 and at least one interface circuit 4502. The processor 4501 and the interface circuit 4502 may be interconnected by a line. In an example, the interface circuit 4502 may be configured to receive a signal from another apparatus (such as the memory of the electronic device). In another example, the interface circuit 4502 may be configured to transmit a signal to another apparatus (for example, the processor 4501). For example, the interface circuit 4502 may read an instruction stored in the memory and transmit the instruction to the processor 4501. The instruction, when executed by the processor 4501, may cause the electronic device to perform the steps in the foregoing embodiments. Certainly, the chip system may further include other discrete devices. This is not specifically limited in this embodiment of this application.

An embodiment of this application further provides a computer storage medium, the computer storage medium including computer instructions, the computer instructions, when run on the electronic device, causing the electronic device to perform various functions and steps performed by the mobile phone in the foregoing method embodiments.

An embodiment of this application further provides a computer program product, the computer program product, when running on a computer, causing the computer to perform the functions or steps performed by the mobile phone in the method embodiments.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an inner structure of an apparatus is divided into different functional modules to complete all or some of the functions described above.

In the several embodiments provided in this application, it should be understood that the disclosed apparatus and method may be implemented in other manners. For example, the described apparatus embodiment is merely exemplary. For example, the module or unit division is merely a logical function division and may be other division during actual implementations. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, a compact disc, or the like.

The foregoing content is only specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A video capturing method, applicable to an electronic device, and the method comprising:
    displaying, by the electronic device, a first interface, wherein the first interface is a view-finding interface for video recording by the electronic device, the first interface comprises a first preview image acquired by a first camera, and the first preview image is displayed on the first interface in a full screen layout;
    displaying, by the electronic device in response to a first operation by a user on the first interface, a plurality of options on the first interface, wherein the plurality of options comprise a first option, and the first option is configured to indicate a first layout of a second preview image acquired by a second camera and a third preview image acquired by a third camera on the view-finding interface, wherein the first layout comprises a split-screen layout or a picture-in-picture layout; and
    displaying, by the electronic device in response to a selection operation by the user on the first option, a second interface, wherein the second interface is a view-finding interface for video recording by the electronic device, the second interface comprises the second preview image acquired by the second camera and the third preview image acquired by the third camera, and the second preview image and the third preview image are displayed on the second interface in the first layout, wherein
    the second camera is a front camera, and the third camera is a rear camera; or the second camera is a rear camera, and the third camera is a front camera; and
    the view-finding interface for video recording by the electronic device is a view-finding interface for video recording before the electronic device starts video recording; or the view-finding interface for video recording by the electronic device is a view-finding interface for video recording being performed by the electronic device.

2. The method according to claim 1, wherein after the displaying, by the electronic device in response to a selection operation by the user on the first option, a second interface, the method further comprises:
    displaying, by the electronic device in response to a first operation by the user on the second interface, the plurality of options on the second interface, wherein the plurality of options comprise a second option, and the second option is configured to indicate a second layout of a fourth preview image acquired by a fourth camera and a fifth preview image acquired by a fifth camera on the view-finding interface, wherein the second layout is a split-screen layout; and
    displaying, by the electronic device in response to a selection operation by the user on the second option, a third interface, wherein the third interface is a view-finding interface for video recording by the electronic device, the third interface comprises the fourth preview image acquired by the fourth camera and the fifth preview image acquired by the fifth camera, and the fourth preview image and the fifth preview image are displayed on the third interface in the second layout, wherein the fourth camera and the fifth camera are two different rear cameras.

3. The method according to claim 1, wherein after the displaying, by the electronic device in response to a selection operation by the user on the first option, a second interface, the method further comprises:

displaying, by the electronic device in response to a first operation by the user on the second interface, the plurality of options on the second interface, wherein the plurality of options comprise a third option, the third option is configured to indicate a third layout of a sixth preview image acquired by a sixth camera on the view-finding interface, and the third layout is a full screen layout; and displaying, by the electronic device in response to a selection operation by the user on the third option, a third interface, wherein the third interface is a view-finding interface for video recording by the electronic device, the third interface comprises the sixth preview image acquired by the sixth camera, and the sixth preview image is displayed on the third interface in the full screen layout.

4. The method according to claim 1, wherein before the displaying, by the electronic device, a first interface, the method further comprises:

displaying, by the electronic device, a fourth interface, wherein the fourth interface is a view-finding interface for video recording by the electronic device, the fourth interface comprises a seventh preview image acquired by a seventh camera and an eighth preview image acquired by an eighth camera, and the seventh preview image and the eighth preview image are displayed on the fourth interface in a fourth layout, wherein the fourth layout is a split-screen layout or a picture-in-picture layout; and displaying, by the electronic device in response to a first operation by the user on the fourth interface, the plurality of options on the fourth interface, wherein the plurality of options comprise a fourth option, the fourth option is configured to indicate a fifth layout of the first preview image acquired by the first camera on the view-finding interface, and the fifth layout is a full screen layout, wherein the seventh camera is a front camera, and the eighth camera is a rear camera; or the seventh camera is a rear camera, and the eighth camera is a front camera; and the displaying, by the electronic device, a first interface comprises:

displaying, by the electronic device in response to a selection operation by the user on the fourth option, the first interface.

5. The method according to claim 1, wherein before the displaying, by the electronic device, a first interface, the method further comprises:

displaying, by the electronic device, a fourth interface, wherein the fourth interface is a view-finding interface for video recording by the electronic device, the fourth interface comprises a ninth preview image acquired by a ninth camera and a tenth preview image acquired by a tenth camera, and the ninth preview image and the tenth preview image are displayed on the fourth interface in a sixth layout, wherein the sixth layout is a split-screen layout; and displaying, by the electronic device in response to a first operation by the user on the fourth interface, the plurality of options on the fourth interface, wherein the plurality of options comprise a fourth option, the fourth option is configured to indicate a fifth layout of the first preview image acquired by the first camera on the view-finding interface, and the fifth layout is a full screen layout, wherein the ninth camera and the tenth camera are two different rear cameras; and the displaying, by the electronic device, a first interface comprises:

displaying, by the electronic device in response to a selection operation by the user on the fourth option, the first interface.

6. The method according to claim 1, wherein the view-finding interface for video recording by the electronic device comprises a second control, and the first operation is a click/tap operation or a long press operation by the user on the second control; or the first operation is a first preset gesture inputted by the user on the view-finding interface for video recording by the electronic device.

7. The method according to claim 1, wherein the view-finding interface for video recording by the electronic device comprises a second control, and the method further comprises:

hiding, by the electronic device in response to a third operation by the user on the second control in a case that the plurality of options are displayed, the plurality of options; or hiding, by the electronic device in response to a second preset gesture inputted by the user on the view-finding interface for video recording by the electronic device in a case that the plurality of options are displayed, the plurality of options; or hiding, by the electronic device in a case that the plurality of options are displayed, the plurality of options if no operation by the user is received within a preset duration starting from displaying the plurality of options.

8. The method according to claim 1, wherein the view-finding interface for video recording by the electronic device further comprises a first identifier, and the first identifier is used for indicating a layout currently adopted by the electronic device.

9. The method according to claim 1, wherein in a case that the layout currently adopted by the electronic device is a full screen layout, the view-finding interface for video recording by the electronic device further comprises a third control, wherein the third control is configured to trigger the electronic device to switch between the front and rear cameras;

in a case that the layout currently adopted by the electronic device is a split-screen layout or a picture-in-picture layout, and preview cameras currently adopted by the electronic device comprise one front camera and one rear camera, the view-finding interface for video recording by the electronic device further comprises a fourth control, wherein the fourth control is configured to trigger the electronic device to switch between two front cameras or two rear cameras for video recording;

in a case that the preview cameras currently adopted by the electronic device comprise a rear camera, the view-finding interface for video recording by the electronic device further comprises a fifth control, wherein the fifth control is configured to trigger the electronic device to switch from the currently adopted rear camera to another rear camera comprised in the electronic device.

10. An electronic device, wherein the electronic device comprises a plurality of cameras, and the electronic device further comprises a display screen, a memory, and one or more processors; the plurality of cameras, the display screen, and the memory are coupled to the processors; and the memory is configured to store computer program code, the computer program code comprises computer instructions, and the computer instructions, when executed by the processors, cause the electronic device to perform following operations:

displaying, a first interface, wherein the first interface is a view-finding interface for video recording by the electronic device, the first interface comprises a first preview image acquired by a first camera, and the first preview image is displayed on the first interface in a full screen layout;

displaying, in response to a first operation by a user on the first interface, a plurality of options on the first interface, wherein the plurality of options comprise a first option, and the first option is configured to indicate a first layout of a second preview image acquired by a second camera and a third preview image acquired by a third camera on the view-finding interface, wherein the first layout comprises a split-screen layout or a picture-in-picture layout; and displaying, in response to a selection operation by the user on the first option, a second interface, wherein the second interface is a view-finding interface for video recording by the electronic device, the second interface comprises the second preview image acquired by the second camera and the third preview image acquired by the third camera, and the second preview image and the third preview image are displayed on the second interface in the first layout, wherein the second camera is a front camera, and the third camera is a rear camera; or the second camera is a rear camera, and the third camera is a front camera; and the view-finding interface for video recording by the electronic device is a view-finding interface for video recording before the electronic device starts video recording; or the view-finding interface for video recording by the electronic device is a view-finding interface for video recording being performed by the electronic device.

11. The electronic device according to claim 10, wherein after the displaying, by the electronic device in response to a selection operation by the user on the first option, a second interface, the operations further comprise:

displaying, by the electronic device in response to a first operation by the user on the second interface, the plurality of options on the second interface, wherein the plurality of options comprise a second option, and the second option is configured to indicate a second layout of a fourth preview image acquired by a fourth camera and a fifth preview image acquired by a fifth camera on the view-finding interface, wherein the second layout is a split-screen layout; and displaying, by the electronic device in response to a selection operation by the user on the second option, a third interface, wherein the third interface is a view-finding interface for video recording by the electronic device, the third interface comprises the fourth preview image acquired by the fourth camera and the fifth preview image acquired by the fifth camera, and the fourth preview image and the fifth preview image are displayed on the third interface in the second layout, wherein the fourth camera and the fifth camera are two different rear cameras.

12. The electronic device according to claim 10, wherein after the displaying, by the electronic device in response to a selection operation by the user on the first option, a second interface, the operations further comprise:

displaying, by the electronic device in response to a first operation by the user on the second interface, the plurality of options on the second interface, wherein the plurality of options comprise a third option, the third option is configured to indicate a third layout of a sixth preview image acquired by a sixth camera on the view-finding interface, and the third layout is a full screen layout; and displaying, by the electronic device in response to a selection operation by the user on the third option, a third interface, wherein the third interface is a view-finding interface for video recording by the electronic device, the third interface comprises the sixth preview image acquired by the sixth camera, and the sixth preview image is displayed on the third interface in the full screen layout.

13. The electronic device according to claim 10, wherein before the displaying, by the electronic device, a first interface, the operations further comprise:

displaying, by the electronic device, a fourth interface, wherein the fourth interface is a view-finding interface for video recording by the electronic device, the fourth interface comprises a seventh preview image acquired by a seventh camera and an eighth preview image acquired by an eighth camera, and the seventh preview image and the eighth preview image are displayed on the fourth interface in a fourth layout, wherein the fourth layout is a split-screen layout or a picture-in-picture layout; and displaying, by the electronic device in response to a first operation by the user on the fourth interface, the plurality of options on the fourth interface, wherein the plurality of options comprise a fourth option, the fourth option is configured to indicate a fifth layout of the first preview image acquired by the first camera on the view-finding interface, and the fifth layout is a full screen layout, wherein the seventh camera is a front camera, and the eighth camera is a rear camera; or the seventh camera is a rear camera, and the eighth camera is a front camera; and the displaying, by the electronic device, a first interface comprises:

displaying, by the electronic device in response to a selection operation by the user on the fourth option, the first interface.

14. The electronic device according to claim 10, wherein before the displaying, by the electronic device, a first interface, the operations further comprise:

displaying, by the electronic device, a fourth interface, wherein the fourth interface is a view-finding interface for video recording by the electronic device, the fourth interface comprises a ninth preview image acquired by a ninth camera and a tenth preview image acquired by a tenth camera, and the ninth preview image and the tenth preview image are displayed on the fourth interface in a sixth layout, wherein the sixth layout is a split-screen layout; and displaying, by the electronic device in response to a first operation by the user on the fourth interface, the plurality of options on the fourth interface, wherein the plurality of options comprise a fourth option, the fourth option is configured to indicate a fifth layout of the first preview image acquired by the first camera on the view-finding interface, and the fifth layout is a full screen layout, wherein the ninth camera and the tenth camera are two different rear cameras; and the displaying, by the electronic device, a first interface comprises:

displaying, by the electronic device in response to a selection operation by the user on the fourth option, the first interface.

15. The electronic device according to claim 10, wherein the view-finding interface for video recording by the electronic device comprises a second control, and the first operation is a click/tap operation or a long press operation by the user on the second control; or the first operation is a first preset gesture inputted by the user on the view-finding interface for video recording by the electronic device.

16. The electronic device according to claim 10, wherein the view-finding interface for video recording by the electronic device comprises a second control, and the operations further comprise:

hiding, by the electronic device in response to a third operation by the user on the second control in a case that the plurality of options are displayed, the plurality of options; or hiding, by the electronic device in response to a second preset gesture inputted by the user on the view-finding interface for video recording by the electronic device in a case that the plurality of options are displayed, the plurality of options; or hiding, by the electronic device in a case that the plurality of options are displayed, the plurality of options if no operation by the user is received within a preset duration starting from displaying the plurality of options.

17. The electronic device according to claim 10, wherein the view-finding interface for video recording by the electronic device further comprises a first identifier, and the first identifier is used for indicating a layout currently adopted by the electronic device.

18. The electronic device according to claim 10, wherein in a case that the layout currently adopted by the electronic device is a full screen layout, the view-finding interface for video recording by the electronic device further comprises a third control, wherein the third control is configured to trigger the electronic device to switch between the front and rear cameras;

in a case that the layout currently adopted by the electronic device is a split-screen layout or a picture-in-picture layout, and preview cameras currently adopted by the electronic device comprise one front camera and one rear camera, the view-finding interface for video recording by the electronic device further comprises a fourth control, wherein the fourth control is configured to trigger the electronic device to switch between two front cameras or two rear cameras for video recording;

in a case that the preview cameras currently adopted by the electronic device comprise a rear camera, the view-finding interface for video recording by the electronic device further comprises a fifth control, wherein the fifth control is configured to trigger the electronic device to switch from the currently adopted rear camera to another rear camera comprised in the electronic device.

19. The electronic device according to claim 10, wherein each option comprises an effect image of a layout indicated by the option.

20. A non-transitory computer-readable storage medium, storing instructions, the instructions, when run on an electronic device, causing the electronic device to perform following operations:

displaying, a first interface, wherein the first interface is a view-finding interface for video recording by the electronic device, the first interface comprises a first preview image acquired by a first camera, and the first preview image is displayed on the first interface in a full screen layout;

displaying, in response to a first operation by a user on the first interface, a plurality of options on the first interface, wherein the plurality of options comprise a first option, and the first option is configured to indicate a first layout of a second preview image acquired by a second camera and a third preview image acquired by a third camera on the view-finding interface, wherein the first layout comprises a split-screen layout or a picture-in-picture layout; and displaying, in response to a selection operation by the user on the first option, a second interface, wherein the second interface is a view-finding interface for video recording by the electronic device, the second interface comprises the second preview image acquired by the second camera and the third preview image acquired by the third camera, and the second preview image and the third preview image are displayed on the second interface in the first layout, wherein the second camera is a front camera, and the third camera is a rear camera; or the second camera is a rear camera, and the third camera is a front camera; and the view-finding interface for video recording by the electronic device is a view-finding interface for video recording before the electronic device starts video recording; or the view-finding interface for video recording by the electronic device is a view-finding interface for video recording being performed by the electronic device.

* * * * *